(12) United States Patent
Kim et al.

(10) Patent No.: US 12,452,788 B2
(45) Date of Patent: Oct. 21, 2025

(54) POWER SAVING IN NSTR ENVIRONMENT

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Sungjin Park, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 408 days.

(21) Appl. No.: 17/928,231

(22) PCT Filed: May 11, 2021

(86) PCT No.: PCT/KR2021/005885
§ 371 (c)(1),
(2) Date: Nov. 28, 2022

(87) PCT Pub. No.: WO2021/241918
PCT Pub. Date: Dec. 2, 2021

(65) Prior Publication Data
US 2023/0224814 A1    Jul. 13, 2023

(30) Foreign Application Priority Data

May 29, 2020   (KR) .................. 10-2020-0065247

(51) Int. Cl.
*H04W 52/02*   (2009.01)
*H04W 76/15*   (2018.01)
*H04W 84/12*   (2009.01)

(52) U.S. Cl.
CPC ........ *H04W 52/0235* (2013.01); *H04W 76/15* (2018.02); *H04W 84/12* (2013.01)

(58) Field of Classification Search
CPC ............. H04W 52/02; H04W 52/0216; H04W 52/0229; H04W 52/0235; H04W 52/028;
(Continued)

(56) References Cited

U.S. PATENT DOCUMENTS

2019/0335454 A1   10/2019 Huang et al.
2020/0163141 A1   5/2020 Hsu et al.
(Continued)

OTHER PUBLICATIONS

Namyeong Kim et al., "Power saving considering non-AP MLD without STR capability", IEEE 802.11-20/0037r1, May 20, 2020, see pp. 2 and 6-10.
(Continued)

*Primary Examiner* — Robert J Lopata
(74) *Attorney, Agent, or Firm* — BRYAN CAVE LEIGHTON PAISNER LLP

(57) ABSTRACT

In a wireless local area network system, a transmission MLD may comprise a first station (STA) and a second STA, wherein the first STA operates on a first link and the second STA operates on a second link. The transmission MLD may transmit, to a reception MLD, capability information regarding whether power saving is supported. The power saving may be performed by one method among first to third power saving methods. The transmission MLD may transmit, to the reception MLD, a control frame comprising method information regarding which method among the first to third power saving methods is to be used.

8 Claims, 49 Drawing Sheets

(a)

(b)

(58) Field of Classification Search
CPC ..... H04W 74/08; H04W 76/15; H04W 84/12; Y02D 30/70
USPC ......................................................... 370/329
See application file for complete search history.

(56) References Cited

U.S. PATENT DOCUMENTS

| | | | |
|---|---|---|---|
| 2021/0058868 A1* | 2/2021 | Cariou | H04W 52/0206 |
| 2021/0211871 A1* | 7/2021 | Chu | H04W 12/06 |
| 2022/0132423 A1* | 4/2022 | Fang | H04W 76/15 |
| 2023/0040910 A1* | 2/2023 | Hwang | H04W 74/0808 |
| 2023/0062989 A1* | 3/2023 | Kim | H04W 52/02 |
| 2023/0083503 A1* | 3/2023 | Han | H04W 74/0816 370/328 |
| 2023/0083599 A1* | 3/2023 | Kim | H04W 52/0216 370/311 |
| 2023/0179686 A1* | 6/2023 | Kim | H04W 76/20 370/329 |

OTHER PUBLICATIONS

Liwen Chu et al., "Multiple Link Power Save", IEEE 802.11-19/1857r1, Jan. 9, 2020, see p. 4.

Alexander Min et al., "Multi-link power save operation", IEEE 802.11-19/1544r5, Jan. 16, 2020, see pp. 5-7 and 10-12.

\* cited by examiner

FIG. 1
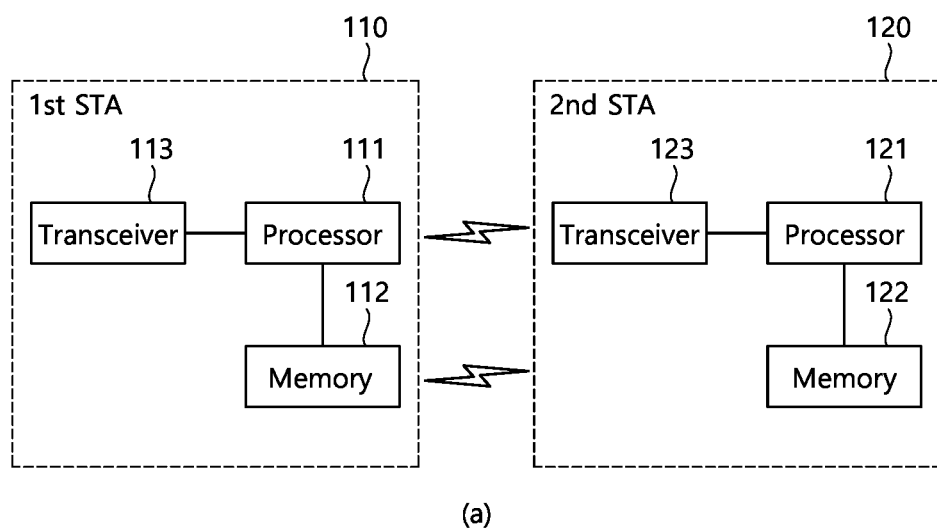
(a)
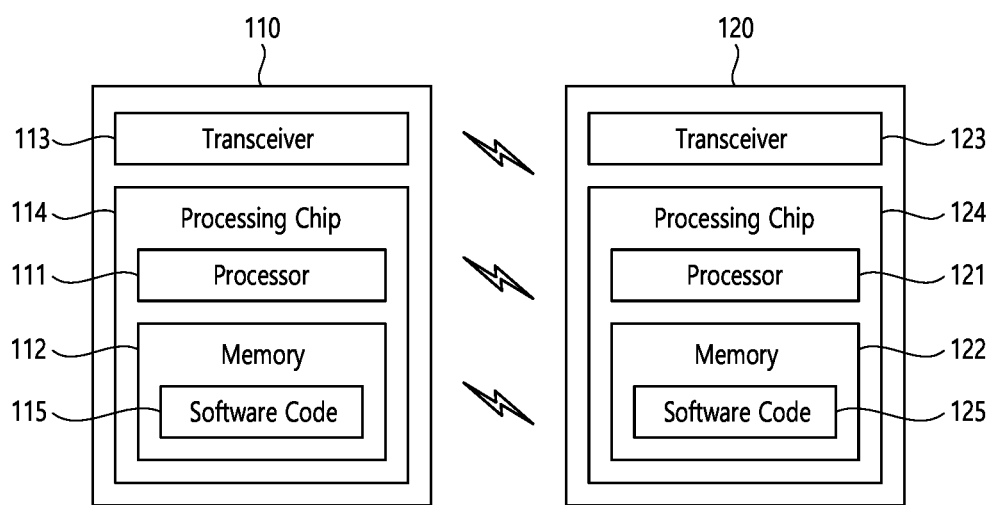
(b)

FIG. 2
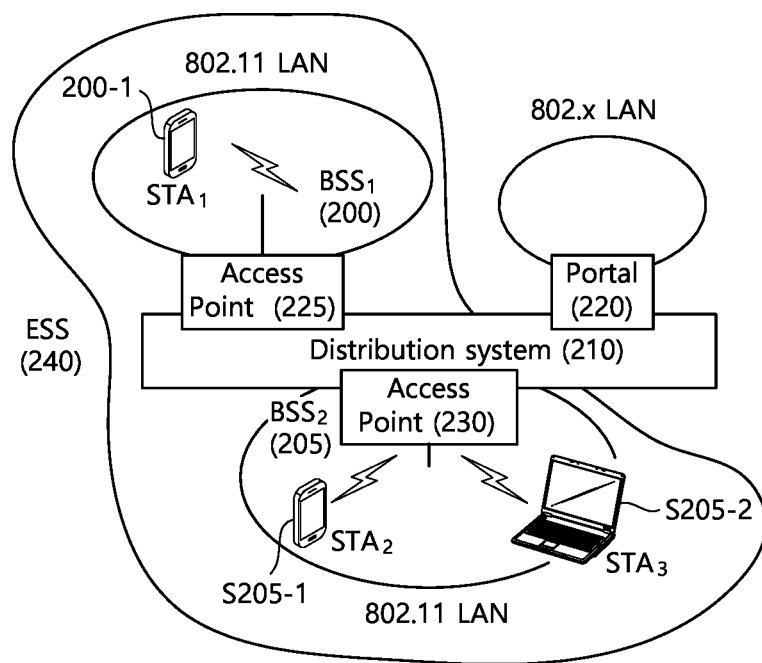
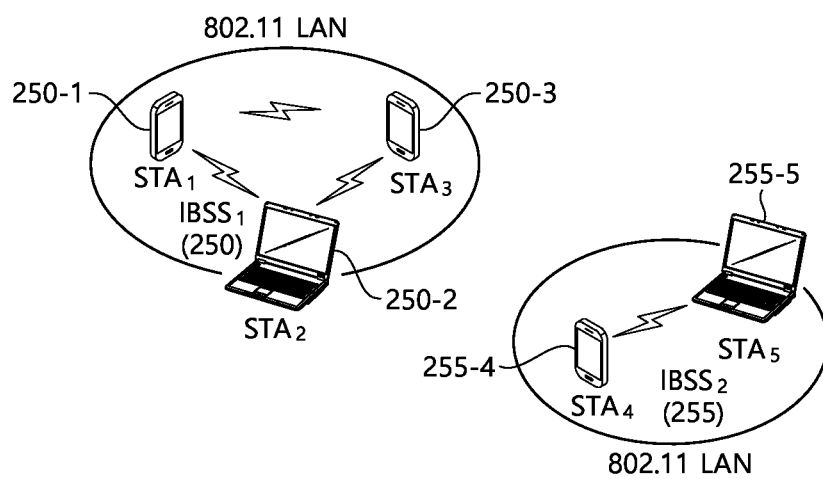

FIG. 31

| Non-STR PSM mode | SMBI | SOMC | Duration TXOP | UL TX/DL RX Support | UL TX Support | DL RX Support | STR Capability |

POWER SAVING IN NSTR ENVIRONMENT

CROSS REFERENCE TO RELATED APPLICATIONS

This application is the National Stage filing under 35 U.S.C. 371 of International Application No. PCT/KR2021/005885, filed on May 11, 2021, which claims the benefit of and priority to Korean Patent Application No. 10-2020-0065247, filed on May 29, 2020, which is hereby incorporated by reference herein in its entirety.

TECHNICAL FIELD

The present specification relates to a method of performing power saving by a non-simultaneous transmission and reception (NSTR) MLD in a wireless local area network (WLAN) system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

According to various embodiments, in a wireless local area network (WLAN) system the transmitting MLD may include a first station (STA) and a second STA, the first STA may operate on a first link, and the second STA may operate on a second link. The transmitting MLD may transmit, to a receiving MLD, capability information regarding whether power saving is supported. The power saving may be performed by one method among first to third power-saving methods. The transmitting MLD may transmit, to the receiving MLD, a control frame including method information regarding which method among the first to third power-saving methods is to be used.

According to an example of the present specification, a non-AP MLD that does not support STR capability can reduce unnecessary power consumption that occurs during data transmission/reception. If it is necessary to reduce power consumption through the implementation of a power-saving method, instead of reducing the throughput, power saving may be performed, and a balance between throughput and power saving may be achieved.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 31 shows an example of a PSM control field.

DETAILED DESCRIPTION

Figure 3:
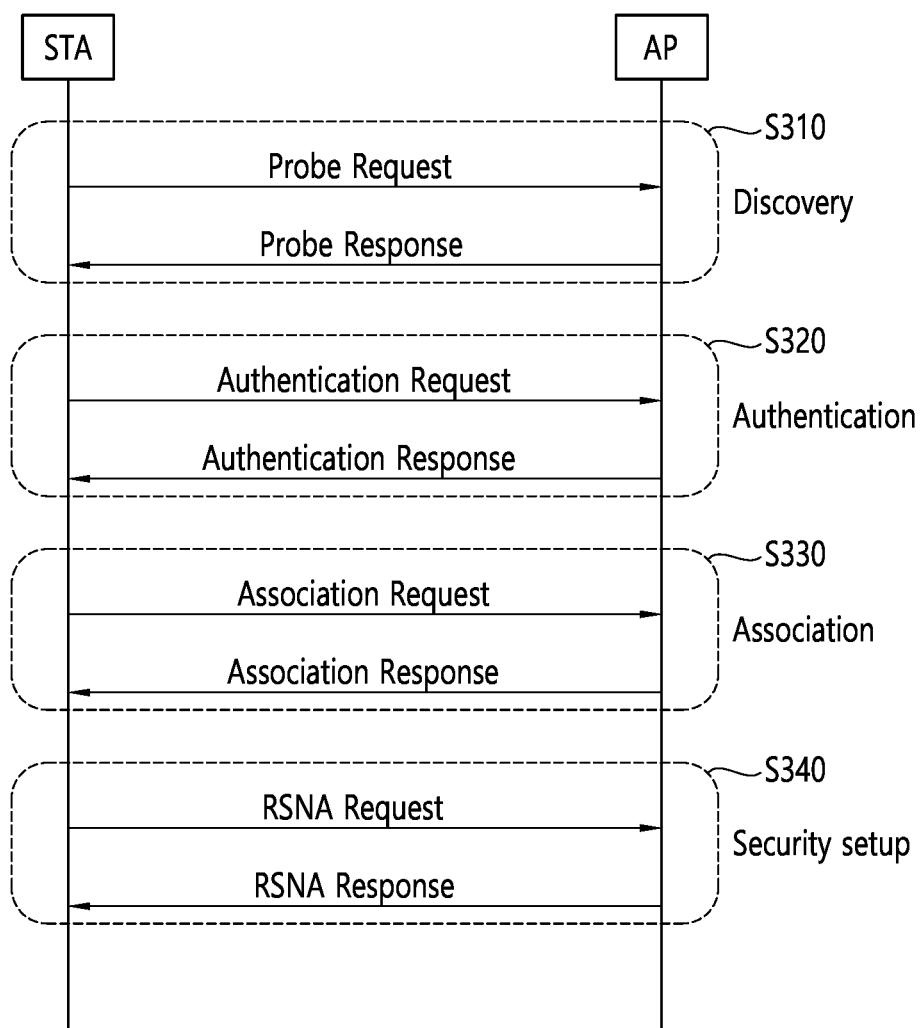
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Hereinafter, the PPDU transmitted/received by the STA of the present specification will be described.

Figure 4:
FIG. 4 illustrates an example of a PPDU used in the present specification.

FIG. 4 illustrates an example of a PPDU used in the present specification.

The PPDU of FIG. 4 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 4 may indicate the entirety or part of a PPDU type used in the EHT system. For example, the example of FIG. 4 may be used for both of a single-user (SU) mode and a multi-user (MU) mode. In other words, the PPDU of FIG. 4 may be a PPDU for one receiving STA or a plurality of receiving STAs. When the PPDU of FIG. 4 is used for a trigger-based (TB) mode, the EHT-SIG of FIG. 4 may be omitted. In other words, a STA which has received a trigger frame for uplink-MU (UL-MU) may transmit the PPDU in which the EHT-SIG is omitted in the example of FIG. 4.

In FIG. 4, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 4 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 4, the L-LTE and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 4. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 4. The PPDU of FIG. 4 may be used to transmit/receive frames of various types. For example, the PPDU of FIG. 4 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 4 may be used for a management frame. An example of the management frame may include a beacon frame, a (re-)association request frame, a (re-)association response frame, a probe request frame, and a probe response frame. For example, the PPDU of FIG. 4 may be used for a data frame. For example, the PPDU of FIG. 4 may be used to simultaneously transmit at least two or more of the control frame, the management frame, and the data frame.

Figure 5:
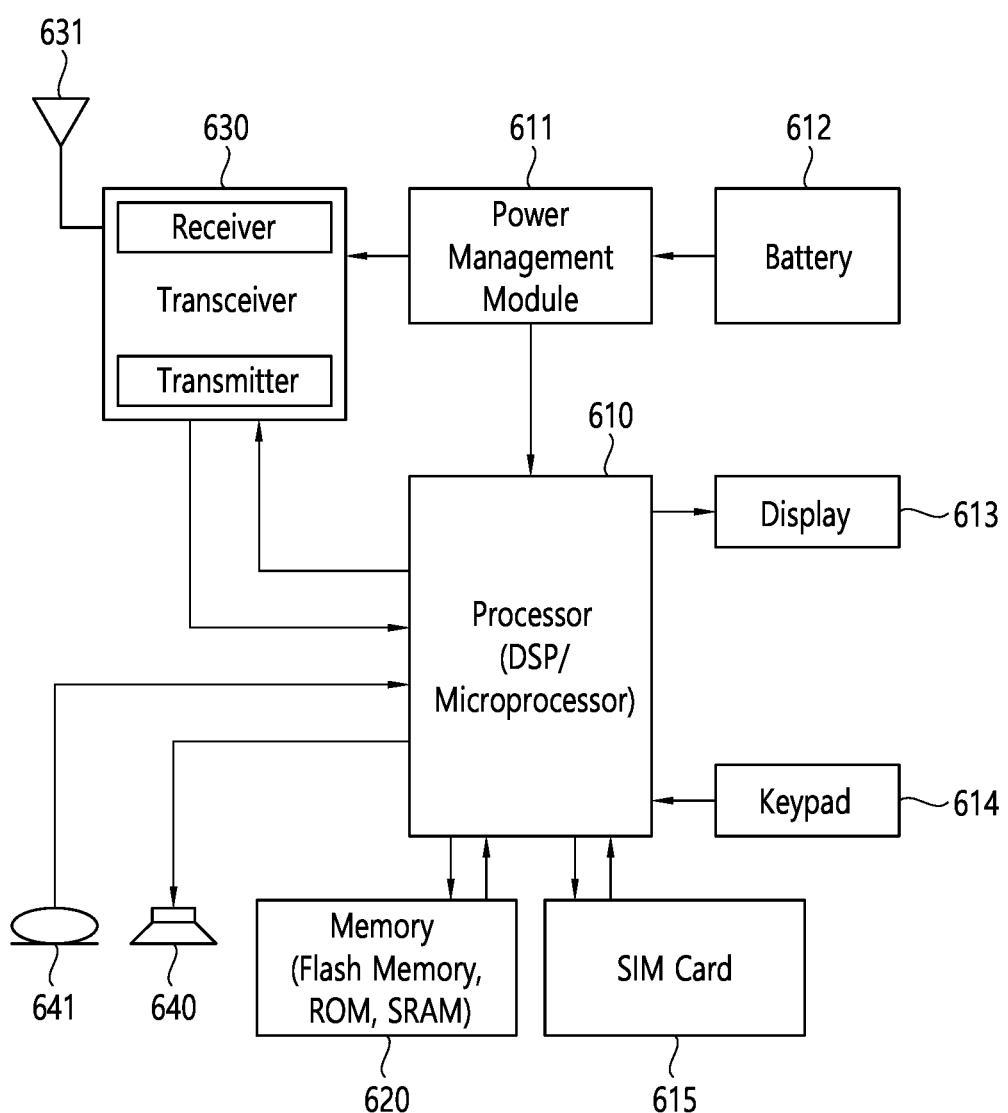
FIG. 5 illustrates an example of a modified transmission device and/or receiving device of the present specification.

FIG. 5 illustrates an example of a modified transmission device and/or receiving device of the present specification.

Each device/STA of the sub-figure (a)/(b) of FIG. 1 may be modified as shown in FIG. 5. A transceiver 630 of FIG. 5 may be identical to the transceivers 113 and 123 of FIG. 1. The transceiver 630 of FIG. 5 may include a receiver and a transmitter.

A processor 610 of FIG. 5 may be identical to the processors 111 and 121 of FIG. 1. Alternatively, the processor 610 of FIG. 5 may be identical to the processing chips 114 and 124 of FIG. 1.

A memory 620 of FIG. 5 may be identical to the memories 112 and 122 of FIG. 1. Alternatively, the memory 620 of FIG. 5 may be a separate external memory different from the memories 112 and 122 of FIG. 1.

Referring to FIG. 5, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 5, a speaker 640 may output a result related to a sound processed by the processor 610. A microphone 641 may receive an input related to a sound to be used by the processor 610.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown, the 5 GHz band, and the 6 GHz band (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink links. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

In the following specification, MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

According to an embodiment, an AP MLD or a non-AP MLD may be configured in a structure having a plurality of links. In other words, the non-AP MLD may support a plurality of links. The non-AP MLD may include a plurality of STAs. A plurality of STAs may have a link for each STA.

MLD and STR Capability

The 802.11be standard (hereinafter, the EHT standard) may support a multi-link. Here, the multi-link may include multiple bands. That is, the multi-link may mean links included in several frequency bands, or may mean a plurality of links included in one frequency band.

The EHT standard may support Simultaneous TX/RX (STR) Channel access according to Link capability in a multi-link support environment. A device supporting a multi-link may be defined as a Non-AP/AP Multi-Link Device (MLD). STR Capability may mean that data (or signals) can be transmitted/received simultaneously in multiple links. That is, an MLD supporting STR capability (hereinafter, STR MLD) may receive data through one link when data transmission occurs on another link.

On the other hand, MLDs that do not support STR capability (hereinafter, non-STR MLDs) cannot simultaneously transmit and receive data (or signals) because data collision may occur due to interference. For example, when a non-STR MLD receives data (or a signal) from one link, it does not attempt transmission to another link to avoid interference. If data (or signal) transmission and reception occur simultaneously in both links, data (or signal) collision may occur.

In other words, the STR MLD may simultaneously perform signal transmission and signal reception in a multi-link, respectively. Non-STR MLD cannot simultaneously transmit and receive signals in a multi-link. While transmitting a signal in the first link among a multi-link, an STA that does not support the STR operation cannot receive a signal in a link different from the first link, but could transmit a signal. In addition, while receiving a signal in the first link among the multi-link, an STA that does not support the STR operation cannot transmit a signal in a link different from the first link, but could receive a signal.

Hereinafter, examples in which collision may occur in the non-STR MLD may be described with reference to FIGS. 6 and 7.

Figure 6:
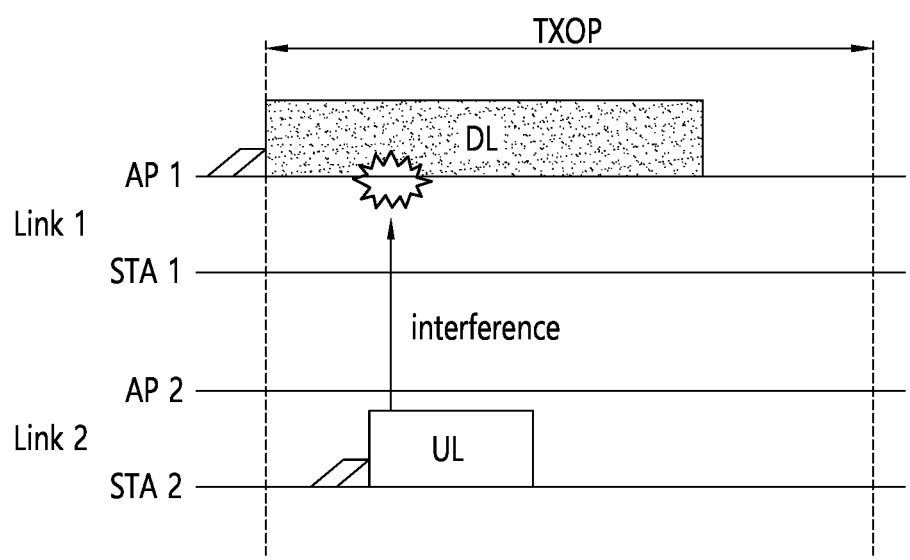
FIG. 6 shows an example in which a collision may occur in a non-STR MLD.

FIG. 6 shows an example in which a collision may occur in a non-STR MLD.

Referring to FIG. 6, the AP MLD may include AP 1 operating in a first link and AP 2 operating in a second link. The non-AP MLD may include STA 1 operating in the first link and STA 2 operating in the second link. At least one of an AP MLD and a non-AP MLD may not support STR capability. The AP MLD may transmit a DL signal through AP 1. When the non-AP MLD transmits a UL signal through STA 2 while the non-AP MLD is receiving the DL signal through STA 1, a collision may occur.

Figure 7:
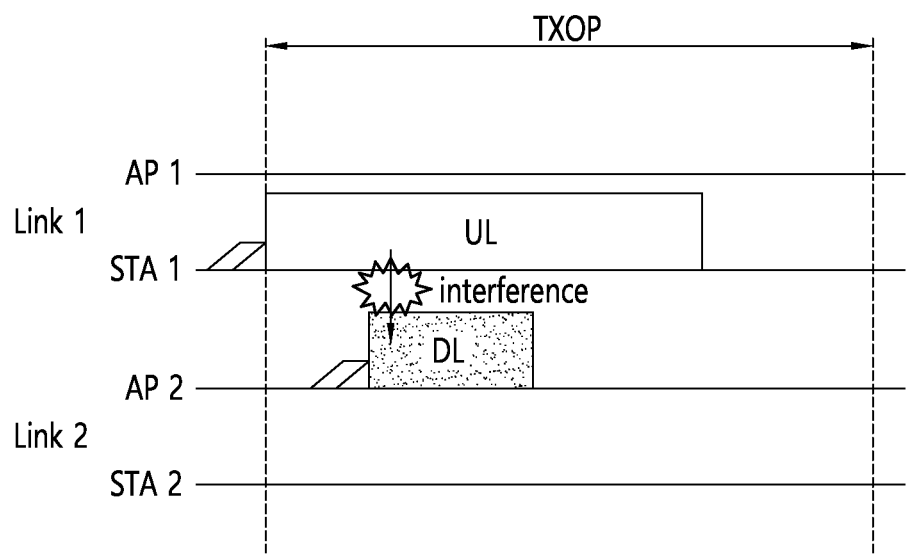
FIG. 7 shows another example in which a collision may occur in a non-STR MLD.

FIG. 7 shows another example in which a collision may occur in a non-STR MLD.

Figure 12:
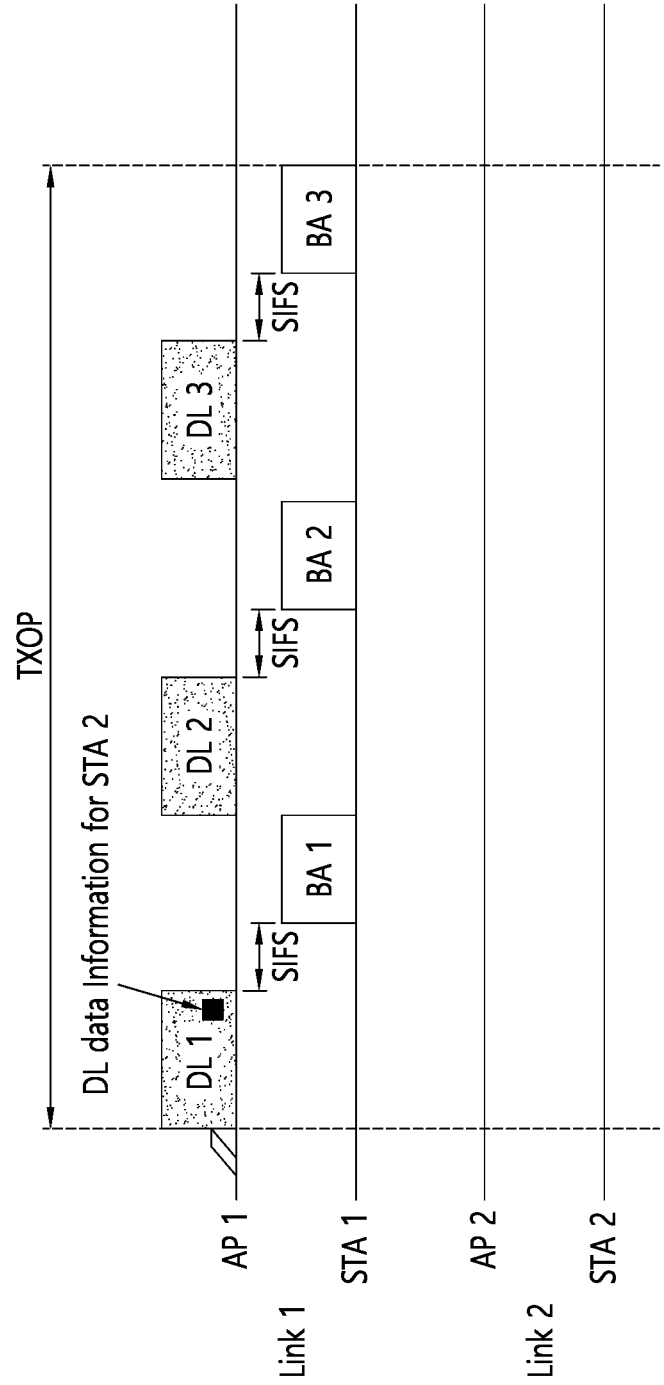
FIG. 12 shows another example of the operation of a non-AP MLD and an AP MLD.

Referring to FIG. 7, an AP MLD and a non-AP MLD may correspond to the AP MLD and the non-AP MLD of FIG. 12, respectively. The non-AP MLD may transmit a UL signal through STA 1. When the AP MLD transmits the DL signal through AP 2, while transmitting the UL signal, a collision may occur.

Referring to FIGS. 6 and 7, when either one of the AP MLD or the non-AP MLD does not support STR capability, there may be restrictions on TX/RX operation. Due to the restrictions of the non-STR MLD operation, a specific section in which a link is not used (for example, a section in which neither TX/RX occurs) may occur. A specific section in which the link is not used may cause unnecessary power consumption in the non-AP MLD.

Therefore, in the following specification, a power reduction method in consideration of the characteristics of a non-STR MLD that does not support simultaneous transmission/reception may be proposed. Additionally, an embodiment regarding NAV sharing applicable when only some STAs of the MLD enter the doze state may be proposed.

Specifically, when the MLD supports STR Capability in an environment where AP Multi-Link Device (MLD) and Non-AP MLD are connected by a plurality of links (or multi-links), transmission/reception of data (or signal) may occur simultaneously within the same TXOP. However, when any one of AP MLD and non-AP MLD is a non-STR device, if data (or signal) is simultaneously transmitted/received within the same TXOP, data (or signal) may be corrupted by interference. Accordingly, hereinafter, a power reduction technique for non-AP MLDs in consideration of the characteristics of such non-STR MLDs may be proposed.

1. Power-Saving Mechanism Considering Non-STR Capability

In the following specification, for the convenience of description, it is described that the MLD (or the processor of the MLD) controls at least one STA, but is not limited thereto. As described above, the at least one STA may transmit/receive a signal independently regardless of the MLD.

An AP MLD and a non-AP MLD may be connected by a plurality of links. Hereinafter, for the convenience of description, technical features of the AP MLD and the non-AP MLD may be described through the structures of the two links, which are the most basic structures, of the AP MLD and the non-AP MLD. In addition, by assuming that the non-AP MLD is a non-STR MLD that does not support STR capability, technical features regarding the AP MLD and the non-AP MLD may be described.

Figure 8:
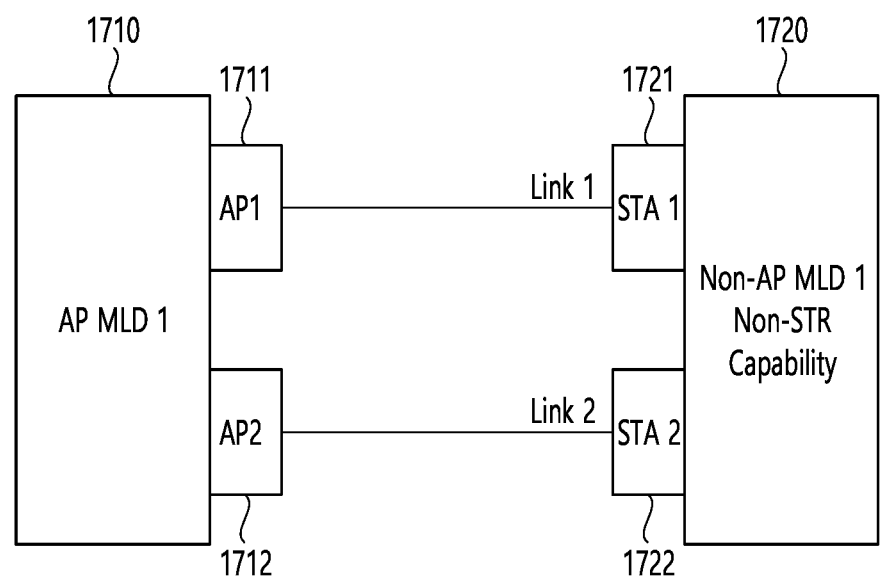
FIG. 8 shows the basic structures of an AP MLD and a non-AP MLD.

FIG. 8 shows the basic structures of an AP MLD and a non-AP MLD.

Referring to FIG. 8, AP MLD 1710 may include AP 1 1711 and AP 2 1712. The non-AP MLD 1720 may include STA 1 1721 and STA 2 1722. AP 1 1711 and STA 1 1721 may operate in link 1. Also, AP 1 1711 and STA 1 1721 may be connected through link 1. AP 2 1712 and STA 2 1722 may operate on link 2. Also, AP 2 1712 and STA 2 1722 may be connected through link 2. The non-AP MLD 1720 may not support STR Capability. That is, the non-AP MLD 1720 may be a non-STR MLD.

The structures of the AP MLD and the non-AP MLD described in the following specification may correspond to the structures of the AP MLD 1710 and the non-AP MLD 1720 of FIG. 8.

In addition, in the EHT standard, in order to reduce power consumption, a link may be divided into an anchored link or a non-anchored link. The anchored link or the non-anchored link can be called variously. For example, the anchored link may be called a primary link. The non-anchored link may be called a secondary link.

According to an embodiment, the AP MLD supporting multi-link can be managed by designating each link as an anchored link or a non-anchored link. AP MLD may support one or more Links among a plurality of Links as the anchored link. The non-AP MLD can be used by selecting one or more of its own anchored links from the Anchored Link List (the list of anchored links supported by the AP MLD).

For example, the anchored link may be used for non-data frame exchange (for example, Beacon and Management frame) as well as frame exchange for synchronization. Also, a non-anchored link can be used only for data frame exchange.

The non-AP MLD can perform monitoring (or monitor) only the anchored link to receive the Beacon and Management frame during the idle period. Therefore, in the case of a non-AP MLD, it must be connected to at least one anchored link to receive a beacon and a management frame. The one or more anchored links should always maintain the enabled state. In contrast, the non-anchored links can only be used for data frame exchange. Therefore, the STA corresponding to the non-anchored link (or the STA connected to the non-anchored link) may enter a doze during the idle period when the channel/link is not used. This has the effect of reducing power consumption.

As described above, when the non-AP MLD is a non-STR MLD, when the non-AP MLD receives DL from the AP MLD or transmits UL to the AP MLD through a specific link, it may cause interference to a link other than the specific link. Also, in order to prevent data collision due to the interference, a section in which the link is not used for a specific period may occur. A specific example thereof may be described with reference to FIGS. 9 and 10.

Figure 9:
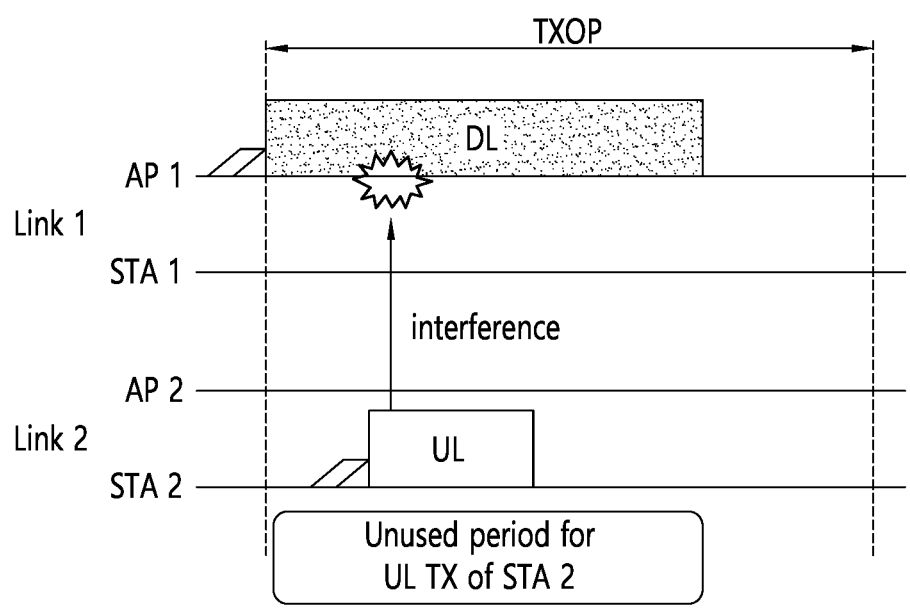
FIG. 9 shows an example of a section in which a link is not used in a non-AP MLD.

FIG. 9 shows an example of a section in which a link is not used in a non-AP MLD.

Referring to FIG. 9, the AP MLD may transmit a DL PPDU through AP 1. When the non-AP MLD transmits the UL PPDU through STA 2, while the DL PPDU is being received, collision (or interference) may occur.

In other words, AP 1 of the AP MLD may transmit a DL PPDU. If STA 2 transmits a UL PPDU, while STA 1 is receiving the DL PPDU, a collision between the DL PPDU and the UL PPDU may occur.

Therefore, when STA 1 of the non-AP MLD receives a DL PPDU through Link 1, STA 2 should not attempt to transmit the UL PPDU to avoid interference until the DL PPDU reception is finished. That is, STA 2 cannot use the link 2 for UL PPDU transmission, until the reception of the DL PPDU by STA 1 is finished.

Figure 10:
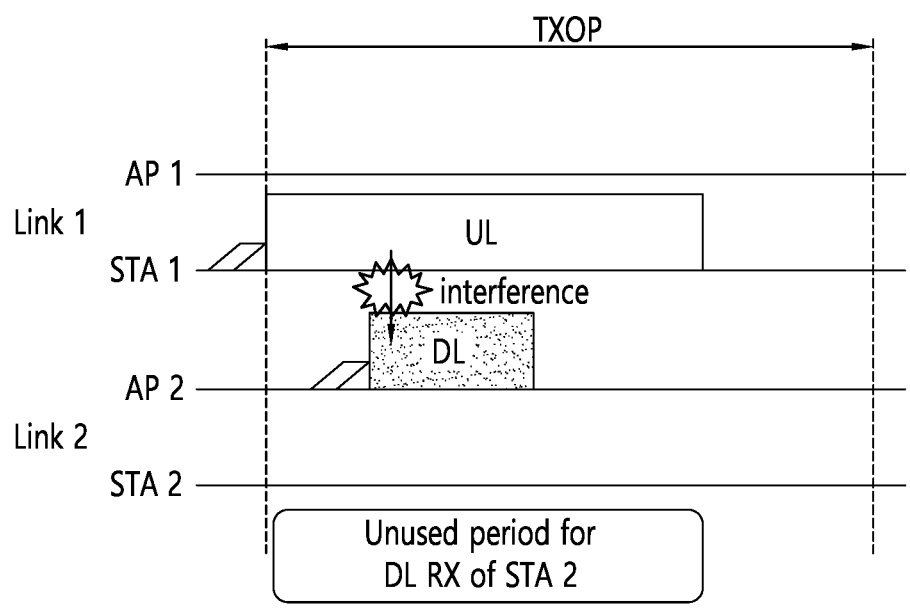
FIG. 10 shows another example of a section in which a link is not used in a non-AP MLD.

FIG. 10 shows another example of a section in which a link is not used in a non-AP MLD.

Referring to FIG. 10, an AP MLD and a non-AP MLD may correspond to the AP MLD and the non-AP MLD of FIG. 8, respectively. The non-AP MLD may transmit a UL PPDU through STA 1. When the AP MLD transmits the DL PPDU through AP 2, while transmitting the UL PPDU, collision (or interference) may occur.

In other words, STA 1 may transmit a UL PPDU through link 1. While STA 1 is transmitting a UL PPDU, when AP 2 transmits a DL PPDU through link 2, collision (or interference) between the UL PPDU and the DL PPDU may occur.

Therefore, when STA 1 of non-AP MLD 1 transmits a UL PPDU through Link 1, AP 2 should not attempt to transmit a DL PPDU to avoid interference until the UL PPDU transmission is finished. That is, STA 2 cannot use Link 2 for DL reception until the UL PPDU of STA 1 ends.

Referring to FIGS. 9 and 10, a specific interval that cannot be used for UL transmission or DL reception may occur due to the characteristics of the non-STR MLD. Accordingly, in the specific period, based on whether STA 2 transmits/receives data, STA 2 may enter a doze state to reduce power.

Hereinafter, in the case of receiving a DL (or DL PPDU) through the first link and transmitting a UL (or UL PPDU) through the first link, various embodiments in which an STA (for example, STA 2) enters a doze state to reduce power may be described. In addition, the AP MLD and the non-AP MLD may be configured based on the structure shown in FIG. 8.

Hereinafter, when the non-AP MLD receives DL data (or DL PPDU) from the AP MLD, a power-saving mechanism may be described.

In an environment where an AP MLD (Multi-Link Device) and a Non-AP MLD are connected by multiple links (or a multi-link), if MLD supports STR Capability, data (or signal) transmission/reception can occur simultaneously within the same TXOP. However, if either the AP MLD or the non-AP MLD is a non-STR MLD (or a non-STR device), data (or signal) transmission/reception cannot occur simultaneously in the same TXOP. Considering these characteristics, the MLD device can reduce unnecessary power consumption.

Hereinafter, due to the non-STR capability of the Non-AP MLD, a power-saving mechanism is proposed to reduce power consumption by allowing an STA operating in the link to enter the doze during the period when the link is not used. For explanation, the proposed scheme is defined as a non-STR Power-saving mechanism (PSM). In this specification, it is assumed that FIG. 8 is a basic structure. A case in which the AP MLD supports non-STR capability could be considered according to future technology development.

In this specification, two types of non-STR PSMs are largely proposed. The first is a capability-based non-STR PSM and the second is an indication-based non-STR PSM.

Capability-based non-STR PSM may be performed after AP MLD and non-AP MLD complete capability negotiation for non-STR PSM support during or after multi-link setup. The indication-based non-STR PSM is an extension of the capability-based non-STR PSM, and it is a method to further increase link throughput by indicating the presence or absence of a buffered unit (BU) of another link (that is, a link in which other STAs included in the MLD including the STA of the transport link operate) in a frame transmitted by the MLD and transmitting it.

In this specification, the basic operation of the non-STR non-AP MLD according to the proposed method is described, and the detailed operation is described by dividing it into a DL reception case and a UL transmission case. The non-STR PSM proposed in this specification is based on an operation after agreeing on whether to support the capability through capability negotiation between the AP MDL and the non-AP MLD. The capability negotiation process for PSM will be described in detail later in Section 3.1.

1) The Basic Operation of the Capability-Based Non-STR PSM is as Follows.

When a DL frame is received by one STA of the Non-STR Non-AP MLD and another STA included in the same non-AP MLD does not receive the DL frame, the other STA may enter the doze state until the reception of the DL frame is finished.

Alternatively, when one STA of the non-STR non-AP MLD transmits the UL frame and another STA of the same non-AP MLD does not transmit the UL frame, the other STA may enter the doze state until the UL frame transmission is finished.

In the case of UL frame transmission, since the non-AP MLD can know to which STA (that is, Link) to transmit the UL frame, STAs that do not perform transmission can enter the doze. However, when the non-AP MLD receives the DL frame, it cannot know in advance whether the frame will be transmitted to itself or not. Accordingly, in the case of DL reception, two optional actions that non-AP MLD can select depending on the situation are proposed as follows.

The first option (option 1) is a method of entering doze, when the STA of the non-AP MLD receives the DL PPDU, if the non-AP MLD STA checks the STA ID field value of the PHY Header of the SU/MU PPDU or the RA value of the MAC Header of the SU/MU PPDU, and it is not the PPDU transmitted to itself. For example, when the non-AP MLD receives a DL frame through some links, the STA decodes the DL frame. If it is a frame addressed to itself, the STA may keep in the awake state. If it is not a frame addressed to itself, it may determine that there is no frame to be transmitted to itself and may enter doze.

For example, if the sending MLD sends data to a non-STR MLD, there may be many cases where data is transmitted simultaneously through links in a non-STR relationship, so that the STA included in the receiving MLD may enter the doze state when receiving only the PPDU transmitted to another STA included in the receiving MLD.

Currently, 11be discusses including STA ID information in the PHY header. If STA ID information is included in the PHY header, since the STA decodes only the PHY part during the operation of option 1 above, it is possible to reduce the decoding time for determining whether the frame is transmitted to itself or not. Thus, more power consumption can be reduced, when the STA enters Doze.

The second option (option 2) is a simplified method compared to the first option in which, if the STA of the non-AP MLD knows that another STA of the same non-AP MLD receives the DL frame if there is not a received frame for itself, the STA of the non-AP MLD enters the doze state without separate frame decoding. This method basically assumes that the non-AP MLD supports the information-sharing capability. For example, when STA 1 of non-AP MLD receives a DL frame, STA 1 informs STA 2 that it is in the middle of receiving a DL frame. If STA 2 also has a frame received by itself, STA 2 may keep in the awake state, otherwise, it may enter the doze state. However, when STA 2 has a received frame, STA 2 maintains the awake state and, as in the first option, after decoding the frame and checking whether the frame is transmitted to itself, if it is not a frame transmitted to itself, it can enter the doze state. Since this method may cause throughput loss compared to the first option, performance degradation may occur. However, in terms of power saving, more power consumption can be reduced, so which option to use can be selected according to the capability of non-AP MLD or various situations. For example, if the non-AP MLD is a constrained device that supports only the minimum power, the second option method that can reduce more power will be preferred. A device that supports sufficient power and expects throughput improvement may prefer the first option method.

Also, when the Non-AP MLD selects one of the two options mentioned above, the transmission method capability (Synchronous or Asynchronous) supported by the AP may be considered. As described above, according to the second option method, when the STA of the non-AP MLD detects that another STA of the same non-AP MLD receives the DL frame, the STA of the non-AP MLD may enter doze if the frame transmitted to itself is not detected. In other words, when another STA receives a DL frame, whether or not there is a DL frame to be transmitted to itself is more certain when AP MLD supports the synchronous transmission method. That is, if the AP MLD supports the synchronous transmission method, which always transmits in synchronization, when the STA of the non-AP MLD detects that a DL frame has been received by another STA, but there is no frame transmitted to itself, since it is determined that there is no frame to be transmitted during the DL frame reception period and it is possible to enter Doze, it may be appropriate to use the second option in order to further reduce power consumption. On the other hand, if AP MLD supports the asynchronous transmission method, since the DL frame can be transmitted to the non-AP MLD at any time, it may be more suitable to use the first option. Non-AP MLD can select various detailed options in non-STR PSM operation according to the situation. In this case, the capability of AP MLD described above can be considered.

2) the Basic Operation of the Following Indication-Based Non-STR PSM is as Below.

In a frame transmitted by the MLD, an indication indicating the presence or absence of buffer data of other STAs is included in the transmission method.

When AP MLD transmits a DL frame to a non-STR non-AP MLD, the AP MLD may include an indication indicating the presence or absence of buffer data of other STAs (that is, another link) of the same non-AP MLD in the DL frame (for example, DL data or DL BA, etc.) and may transmit it. Based on the indication, the STA of the non-AP MLD may maintain or change the power state of its own link. For example, when the STA of the non-AP MLD is in the awake state, when receiving a DL frame from the AP MLD, if the indication indicates that there is buffer data for itself (for example, buffered traffic for STA 2=1), the STA may maintain the awake state. For example, when the STA of the non-AP MLD is in the awake state, when DL frame is received from AP MLD, and if the indication indicates that there is no buffer data for itself (for example, buffered traffic for STA 2=0), the STA may enter the doze state until the reception of the DL frame is finished. On the other hand, when the STA of the non-AP MLD is in the doze state, if the non-AP MLD (that is, another STA of the non-AP MLD including the STA) receives a DL frame from the AP MLD, and the indication indicates that there is buffer data for the STA, the STA may transition to the awake state. If the indication indicates that there is no buffer data for the STA, the STA may maintain the existing doze state. At this time, information on the presence or absence of buffer data of the STA receiving the DL frame in the indication information may be omitted. That is, the indication information may include only information related to the presence or absence of buffer data of other STAs included in the corresponding MLD.

In this indication method, compared to the above-mentioned capability-based non-STR PSM method, overhead for the indication required to indicate the presence or absence of buffer data for each STA of the non-AP MLD may occur. However, if there is buffer data to be transmitted by the AP MLD, a relatively small throughput loss will occur because the STA that has entered the doze can be awake through the indication.

If indication information indicating the presence or absence of a buffer for the other STA of the non-AP MLD is put in the PHY header, since the STA can obtain information faster and enter the doze faster, more power saving will be achieved. Therefore, in the present disclosure, a new field for including indication information indicating the presence or absence of buffer data for each STA of the non-AP MLD currently connected to the AP MLD in the PHY Header is defined. The name may be changed later.

BU Indication for STA: Indication information for indicating the presence or absence of BU data for each STA of a non-AP MLD connected to the current AP MLD. The partial virtual bitmap field structure of the existing traffic indication map (TIM) element may be used as it is, or a separate new bitmap or field could be defined.

A field indicating an indication of BU buffer data for each STA may be included in the PHY Header. For example, the indication for buffer data may be applied to a design other than the non-STR PSM proposed in this specification. When the STA receives the TIM, it takes time to decode the TIM element. However, if this information is included in the PHY Header, after decoding only the PHY Header, the STA may determine whether to enter the doze state more quickly by checking whether there is BU data to be transmitted to the STA. As a result, this allows non-AP MLDs to enter the doze state faster and save more power.

Therefore, when the non-AP MLD performs capability negotiation for the proposed non-STR PSM with the AP MLD during or after multi-link setup, it is also possible to select whether to use a capability-based non-STR PSM or an indication-based non-STR PSM. Information on elements or fields required for this will be described in detail in Section 3.

The basic operation and detailed options of the non-STR PSM proposed in this specification have been described above. Afterward, when the non-AP MLD agrees to whether to activate the non-STR PSM of the non-AP MLD and detailed options for the operation method through the capability negotiation with the AP MLD, the operation will be described by dividing the DL RX or UL TX case of the non-AP MLD.

1-1. Power-Saving Mechanism when Sending DL PPDU

When the non-STR non-AP MLD receives DL data from the AP MLD, an example of operations of the non-AP MLD and the AP MLD may be described with reference to FIG. 11.

Figure 11:
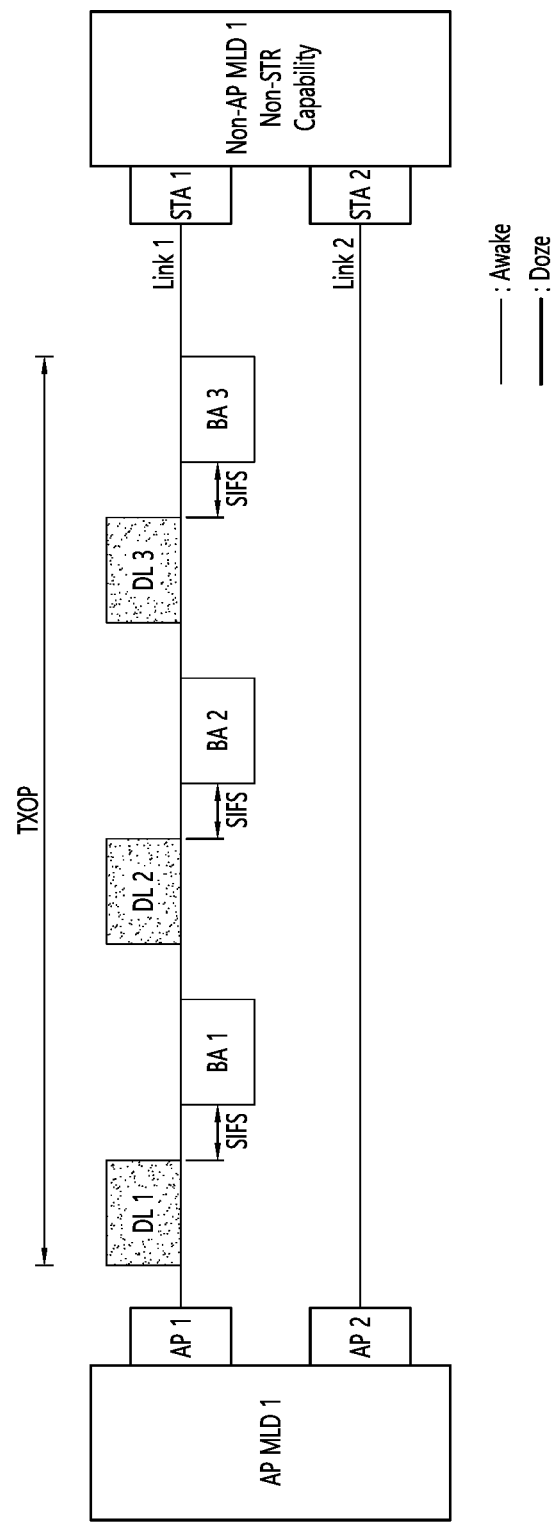
FIG. 11 shows an example of the operation of a non-AP MLD and an AP MLD.

FIG. 11 shows an example of the operation of a non-AP MLD and an AP MLD.

Referring to FIG. 11, non-AP MLD 1 and AP MLD 1 may have the structures of non-AP MLD 1 and AP MLD 1 of FIG. 8. The non-AP MLD 1 may be a non-STR capability device (or a non-STR MLD) that does not support STR capability.

STA 1 of Non-AP MLD 1 may receive a DL PPDU (or DL signal) from AP 1 through Link 1. Until the DL PPDU reception is finished, the STA 2 cannot transmit a UL PPDU (or UL signal) to avoid interference. STA 2 may only perform reception of a DL PPDU.

According to an embodiment, DL data transmission to STA 2 of AP 2 may not occur during the same DL TXOP period. In this case, from the standpoint of STA 2, a period in which neither UL data transmission nor DL data reception occurs until the end of DL PPDU transmission occurs. During this period, STA 2 may enter a doze state (or a power-saving state, a sleep state, or an Unavailable state for Other Links) to reduce power.

A situation in which the aforementioned AP 2 is considered that DL data transmission does not occur with respect to the STA 2 is as follows.

i) The first example of a situation in which the AP 2 considers that DL data transmission does not occur to the STA 2 is a case in which the AP 2 has no DL data to transmit to the STA 2.

ii) The second example of a situation in which the AP 2 considers that DL data transmission does not occur to the STA 2 is a case in which the AP 2 has DL data to transmit to the STA 2 but cannot transmit it because the channel is in a busy state.

In the above two cases, STA 2 may determine that it is impossible to receive DL data and enter a doze state to reduce power. To this end, the AP MLD needs to indicate/inform this information to the non-AP MLD in the DL data. This is the above-mentioned indication-based non-STR PSM operation.

That is, in order to enter the doze state for power reduction in STA 2, it should be noted that the DL PPDU is not transmitted through Link 2 during the TXOP period. Accordingly, when AP 1 transmits a DL PPDU to STA 1, Link 2 may also transmit information on whether to transmit a DL PPDU. Specifically, when AP 1 transmits a DL PPDU to STA 1, it may indicate (or inform) that DL data transmission to STA 2 of AP 2 does not occur during the same TXOP period. An embodiment related thereto may be described with reference to FIG. 12.

FIG. 12 shows another example of the operation of a non-AP MLD and an AP MLD.

Referring to FIG. 12, when DL frame (for example, DL 1, DL 2, DL3) transmission occurs only in some links (for example, Link 1) in TXOP, AP MLD 1 may transmit information on whether or not DL data is received by an STA (for example, STA 2) connected to Link 2 (for example, traffic indicator information (or TIM information included in the beacon of link 2)) in the DL frame. STA 1 may check information on whether or not there is a data buffer for STA 2 based on the information on whether or not the DL data is received.

For example, a new field may be defined to display/transmit information on whether or not the DL data is received. For another example, an existing TIM element may be reused to display/transmit information on whether or not the DL data is received.

For example, the information on whether or not the DL data is received may be included in the DL frame. Information on the information on whether DL data is received or not included in the DL frame may be omitted in the case of an STA that does not have content/item to indicate. If the information on whether DL data is received or not is omitted, STA 2 may determine that there is no data buffered therein.

For example, only DL transmission for STA 1 may occur within the same TXOP. In this case, AP MLD 1 (for example, AP 1) may transmit information indicating that only DL transmission for STA 1 will occur in the DL frame. In this case, the non-AP MLD 1 receiving the DL frame through Link 1 can confirm that there is no DL data transmitted to the STA 2 within the same TXOP period (or DL TXOP period) based on the above information. Accordingly, based on the information, STA 2 may enter a doze state.

At this time, if the non-AP MLD 1 has received an indication indicating that there is buffered data in STA 2, it may maintain the awake state without entering the doze state. Thereafter, when the back off of AP 2 becomes 0, the AP 2 may transmit the buffered DL frame to the STA 2. However, AP 2 may schedule (for example, end alignment, etc.) a DL frame transmitted to STA 1 to prevent inter-link interference that may occur due to the non-STR capability of the non-AP MLD.

Hereinafter, various embodiments regarding a section in which STA 2 enters a doze state may be described.

Hereinafter, for the convenience of the description, at least one STA that receives the DL frame may be described as a first STA. Also, for the convenience of the description, STAs distinguished from the first STA that do not receive the DL frame may be described as the second STA.

The First Embodiment

According to the first embodiment, the Non-AP MLD may receive a DL frame from the AP MLD through at least one STA. The first STA may check the TXOP field information included in the PHY header of the DL frame and/or the Duration field included in the MAC header. At this time, if DL and UL transmission does not occur through the second STA (or the link to which the second STA is connected) during the TXOP period/interval, the non-AP MLD may change the state of the second STA to the doze state. As the second STA enters the doze state (or the Power-saving state, the sleep state, or the Unavailable state for Other Links) during the TXOP period, there is the effect that power consumption can be reduced. Thereafter, the second STA that has entered the doze state may change the state to the awake state after the TXOP duration ends.

Figure 13:
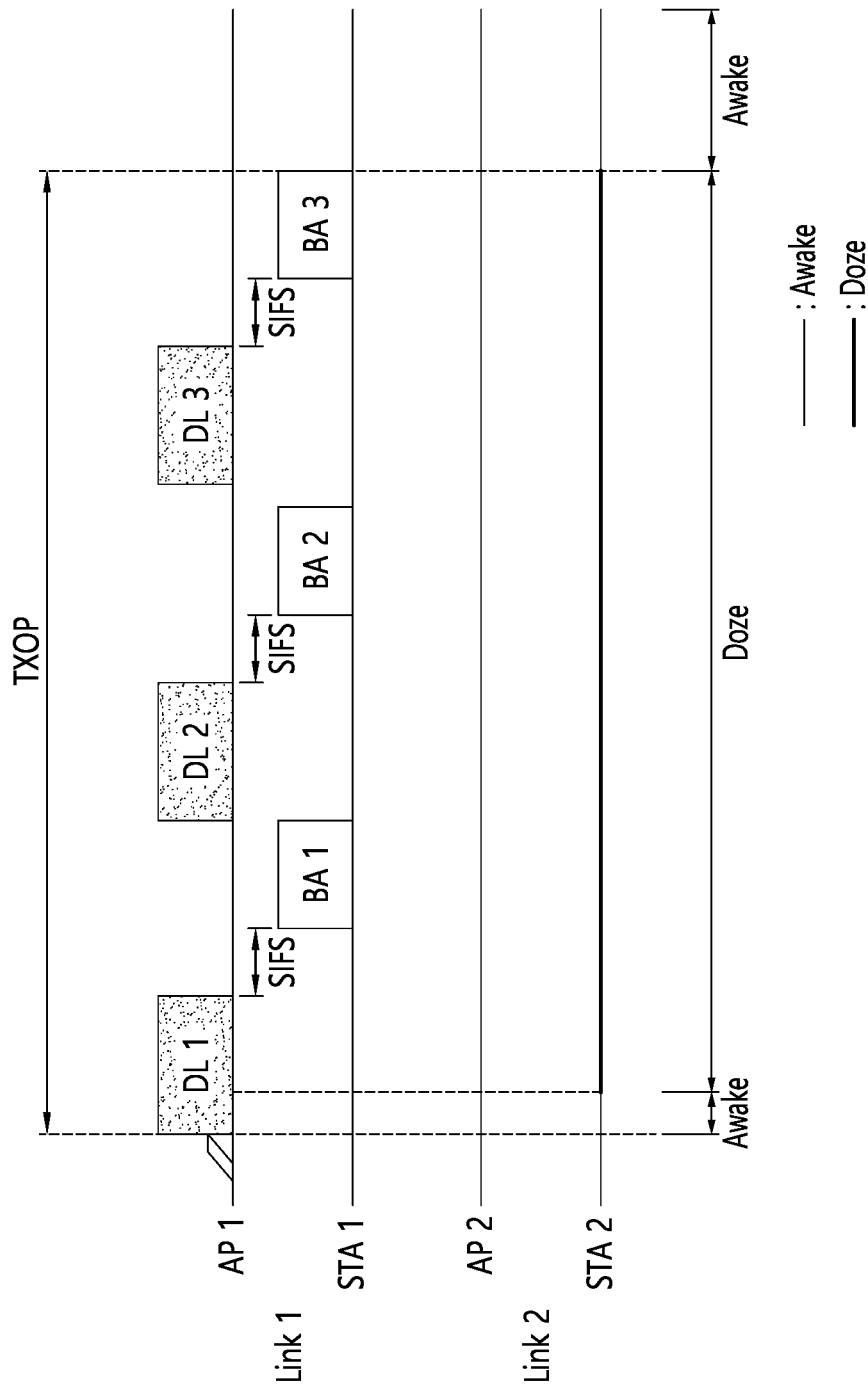
FIG. 13 shows another example of the operation of a non-AP MLD and an AP MLD.

FIG. 13 shows another example of the operation of a non-AP MLD and an AP MLD.

Referring to FIG. 13, STA 1 may be an example of the above-described first STA. STA 2 may be an example of the above-described second STA. AP MLD 1 (for example, AP 1) may acquire a TXOP from Link 1.

AP 1 may transmit DL 1 to non-AP MLD 1 (for example, STA 1) within the TXOP. DL 1 may include information on whether to transmit a DL frame through link 2. In other words, DL 1 may include information about data buffered in AP 2.

STA 1 may receive DL 1. STA 1 may acquire information on whether to transmit a DL frame through link 2 together. The non-AP MLD 1 may confirm that a DL frame through link 2 will not be transmitted based on DL 1. In other words, the non-AP MLD 1 may confirm that there is no data buffered in the AP 2 based on the DL 1.

Accordingly, the non-AP MLD 1 may change the state of the STA 2 from the awake state to the doze state based on the DL 1. In other words, STA 2 may enter a doze state based on DL 1.

For example, in the case of a capability-based non-STR PSM method, the time at which STA 2 enters the doze state may be a time at which the non-AP MLD 1 (for example, STA 1) recognize data transmitted to itself through a DL frame (for example, DL 1). For example, the time at which STA 2 enters the doze state may be the time at which non-AP MLD 1 (for example, STA 1) checks the STAID field value of the PHY Header of the SU/MU PPDU or the RA value of the MAC Header of the SU/MU PPDU.

For example, in the case of the indication-based non-STR PSM method, the time at which STA 2 enters the doze state may be the time at which non-AP MLD 1 recognizes that there is no DL frame (for example, DL 1) transmitted to STA 2 within the same DL TXOP period. For example, the time at which STA 2 enters the doze state may be the time at which DL frame presence or absence indication information for STA 2 in the DL frame of STA 1 is checked.

For another example, the time point at which STA 2 enters the doze state may be the time point at which the DL frame is transmitted.

According to an embodiment, the non-AP MLD 1 may change the state of the STA 2 from the doze state to the awake state when the TXOP is terminated. In other words, STA 2 may enter the awake state at the time the TXOP ends.

The Second Embodiment

Hereinafter, for the convenience of the description, at least one STA that receives the DL frame may be described as a first STA. Also, for the convenience of the description, STAs distinguished from the first STA that do not receive the DL frame may be described as the second STA.

According to the second embodiment, the non-AP MLD may set/change the state of the second STA to the Doze state until the end of receiving the DL frame. In other words, the second STA may maintain the doze state until the first STA finishes receiving the DL frame. According to the second embodiment, there is the effect of reducing power consumption.

In the first embodiment, during DL TXOP (TXOP in which a DL frame is transmitted), the non-AP MLD sets the second STA to the doze state. Unlike the first embodiment, the second embodiment may set/change the state of the second STA to the doze state until the DL frame reception ends. Compared with the first embodiment, the second embodiment has the effect of increasing link utilization. However, compared to the first embodiment, the transmission opportunity (for example, channel access) increases, but power efficiency may decrease.

Specifically, when the first STA receives the DL frame, it may be considered that DL and UL transmission does not occur in the second STA. For example, the first STA may confirm that DL and UL transmission does not occur through the link connected to the second STA based on the DL frame. Accordingly, the second STA may enter the doze state until the end of receiving the DL frame. The second STA may enter the awake state after the reception of the DL frame is finished.

Figure 14:
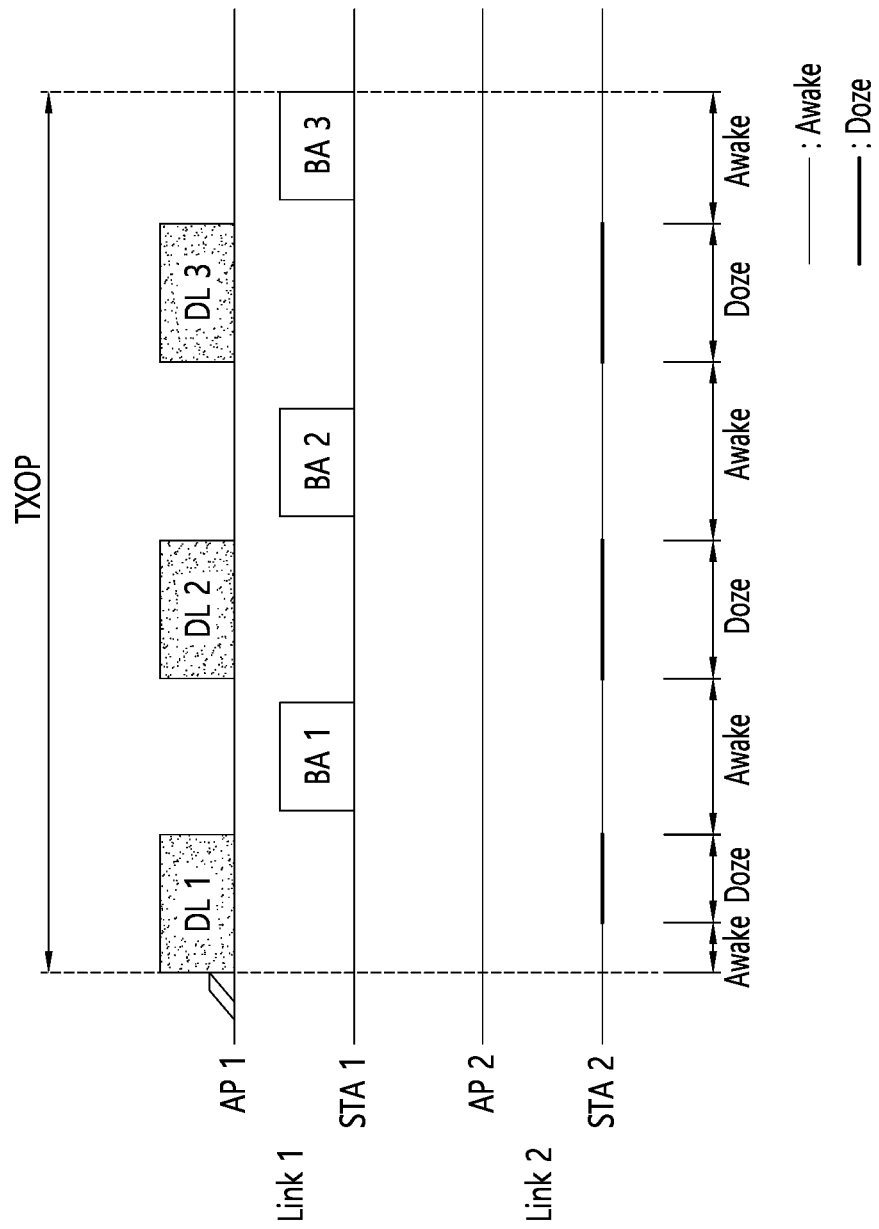
FIG. 14 shows another example of the operation of a non-AP MLD and an AP MLD.

FIG. 14 shows another example of the operation of a non-AP MLD and an AP MLD.

Referring to FIG. 14, STA 1 may be an example of the above-described first STA. STA 2 may be an example of the above-described second STA. A plurality of DL frames may be transmitted during the TXOP period. AP MLD 1 (for example, AP 1) may acquire a TXOP from Link 1.

AP 1 may transmit DL 1 to non-AP MLD 1 (for example, STA 1) within the TXOP. DL 1 may include information on whether to transmit a DL frame through link 2. In other words, DL 1 may include information about data buffered in AP 2.

STA 1 may receive DL 1. STA 1 may acquire information on whether to transmit a DL frame through link 2 together. The non-AP MLD 1 may confirm that a DL frame through link 2 will not be transmitted based on DL 1. In other words, the non-AP MLD 1 may confirm that there is no data buffered in the AP 2 based on the DL 1.

Accordingly, the non-AP MLD 1 may change the state of the STA 2 from the awake state to the doze state based on the DL 1. In other words, STA 2 may enter a doze state based on DL 1.

For example, in the case of a capability-based non-STR PSM method, the time when the STA 2 enters the doze state may be the time when the non-AP MLD 1 becomes aware of data transmitted to it through a DL frame (for example, DL 1). For example, the time at which STA 2 enters the doze state may be a time at which non-AP MLD 1 (for example, STA 1) checks the STAID field value of the PHY Header of the SU/MU PPDU or the RA value of the MAC Header of the SU/MU PPDU.

For example, in the case of the indication-based non-STR PSM method, the time at which STA 2 enters the doze state may be the time at which non-AP MLD 1 recognizes that there is no DL frame (for example, DL 1) transmitted to STA 2 within the same DL TXOP period. For example, the time at which STA 2 enters the doze state may be the time at which non-AP MLD 1 checks DL frame presence or absence indication information for STA 2 in a DL frame received from STA 1.

For another example, the time point at which STA 2 enters the doze state may be the time point at which DL 1 is transmitted.

According to an embodiment, the non-AP MLD 1 may change the state of the STA 2 from the doze state to the awake state when DL 1 ends. The non-AP MLD 1 may operate in the same manner as described above even when DL 2 and DL 3 are received.

When multiple DL frames (for example, DL 1, DL 2, and DL 3) are transmitted through Link 1 during the DL TXOP period, STA 1 may transmit each Block Ack (BA) for each DL frame to AP 1 through UL transmission.

During a period in which UL data transmission for BA occurs, UL transmission through STA 2 may occur. Accordingly, the non-AP MLD 1 may change the state of the STA 2 to the awake state at every DL frame reception end time. In other words, the STA 2 may change the state to the awake state every time the reception of the DL frame ends. That is, STA 2 may transmit a UL frame during BA transmission from STA 1.

Therefore, according to the second embodiment, there is the effect of increasing link utilization. However, according to the second embodiment, the transmission opportunity (for example, channel access) increases, but power efficiency could decrease.

The Third Embodiment

Hereinafter, for the convenience of the description, at least one STA that receives the DL frame may be described as a first STA. Also, for the convenience of the description, STAs distinguished from the first STA that do not receive the DL frame may be described as the second STA.

According to the third embodiment, when multiple DL frames are transmitted during the same TXOP, the non-AP MLD may set/change the state of the second STA to the doze state until the end of the nth DL frame. 'n' may mean the total number of DL frames transmitted by the AP MLD (for example, AP 1). The n-th DL frame may be changed according to the number of frames. That is, the n-th DL frame may mean the last transmitted frame. According to the third embodiment, there is the effect of reducing power consumption.

Specifically, when the first STA receives the DL frame, it may be considered that DL and UL transmission does not occur in the second STA (or the link in which the second STA operates). For example, the first STA may confirm that DL and UL transmission does not occur through a link connected to the second STA based on the DL frame. Accordingly, the second STA may enter the doze state until the time at which the n-th DL frame reception is terminated. The second STA may enter the awake state after receiving the n-th DL frame. Information on the n-th DL frame may be transmitted while being included in the first transmitted DL frame or may be transmitted while being included in the last transmitted n-th DL frame. Accordingly, after entering the doze state, the second STA may change the state to the awake state at the end of receiving the nth DL frame.

Figure 15:
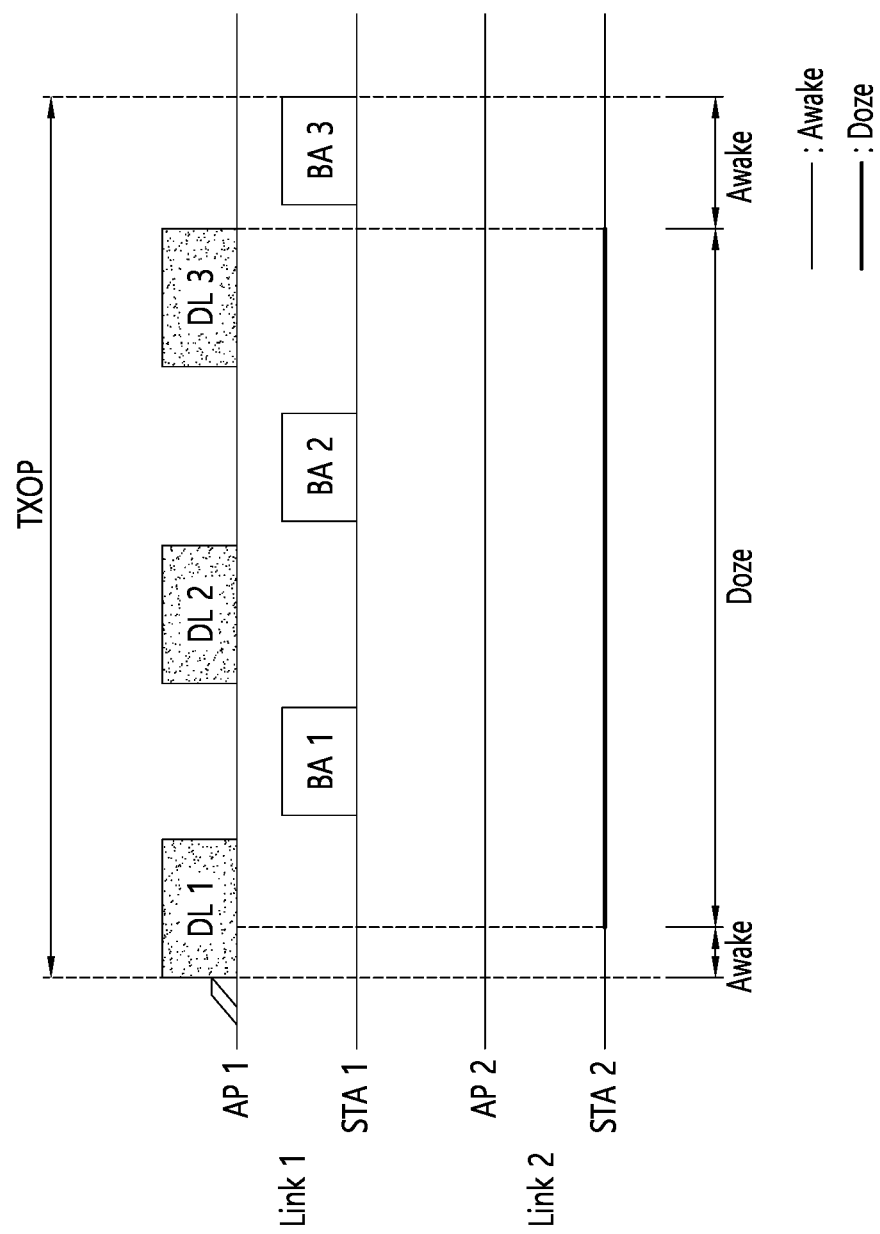
FIG. 15 shows another example of the operation of a non-AP MLD and an AP MLD.

FIG. 15 shows another example of the operation of a non-AP MLD and an AP MLD.

Referring to FIG. 15, STA 1 may be an example of the above-described first STA. STA 2 may be an example of the above-described second STA. AP MLD 1 (for example, AP 1) may acquire a TXOP from Link 1.

For example, in the case of a capability-based non-STR PSM method, the time at which the STA 2 enters the doze state may be the time at which the non-AP MLD 1 becomes aware of data transmitted to itself through a DL frame (for example, DL 1). For example, the time at which the STA 2 enters the doze state may be the time at which the non-AP MLD 1 checks the STAID field value of the PHY Header of the SU/MU PPDU or the RA value of the MAC Header of the SU/MU PPDU.

For example, in the case of the indication-based non-STR PSM method, the time at which STA 2 enters the doze state may be the time at which non-AP MLD 1 recognizes that there is no DL frame (for example, DL 1) transmitted to STA 2 within the same DL TXOP period. For example, the time at which STA 2 enters the doze state may be the time at which non-AP MLD 1 checks DL frame presence or absence indication information for STA 2 in a DL frame received from STA 1.

For another example, the time point at which STA 2 enters the doze state may be the time point at which DL 1 transmission starts.

According to an embodiment, the non-AP MLD 1 may change the state of the STA 2 from the doze state to the awake state when DL 3 ends.

In this method as well, when the indication-based non-STR PSM method is used, and if buffer data occurs during the doze period of the STA, by transmitting the traffic indication information for STA 2 in the DL frame of STA 1, it is possible to awake the STA that has entered the doze.

The Fourth Embodiment

Hereinafter, for the convenience of the description, at least one STA that receives the DL frame may be described as a first STA. Also, for the convenience of the description, STAs distinguished from the first STA that do not receive the DL frame may be described as the second STA.

According to the fourth embodiment, the non-AP MLD may set/change the state of the second STA to the doze state until 'DL frame reception end time+SIFS+BA (or BACK/Block ACK) transmission time'. In other words, the non-AP MLD may set the state of the second STA to the doze state when receiving the DL frame. In response to the DL frame, the non-AP MLD may maintain the state of the second STA in the doze state until the BA transmission after the SIFS is completed. The second STA may enter the awake state after BA transmission is terminated. According to the fourth embodiment, there is the effect of reducing power consumption.

In the first embodiment, during DL TXOP (TXOP in which a DL frame is transmitted), the non-AP MLD sets the second STA to the doze state. Unlike the first embodiment, in the fourth embodiment, the state of the second STA may be set/changed to the doze state until the end of BA transmission.

Figure 16:
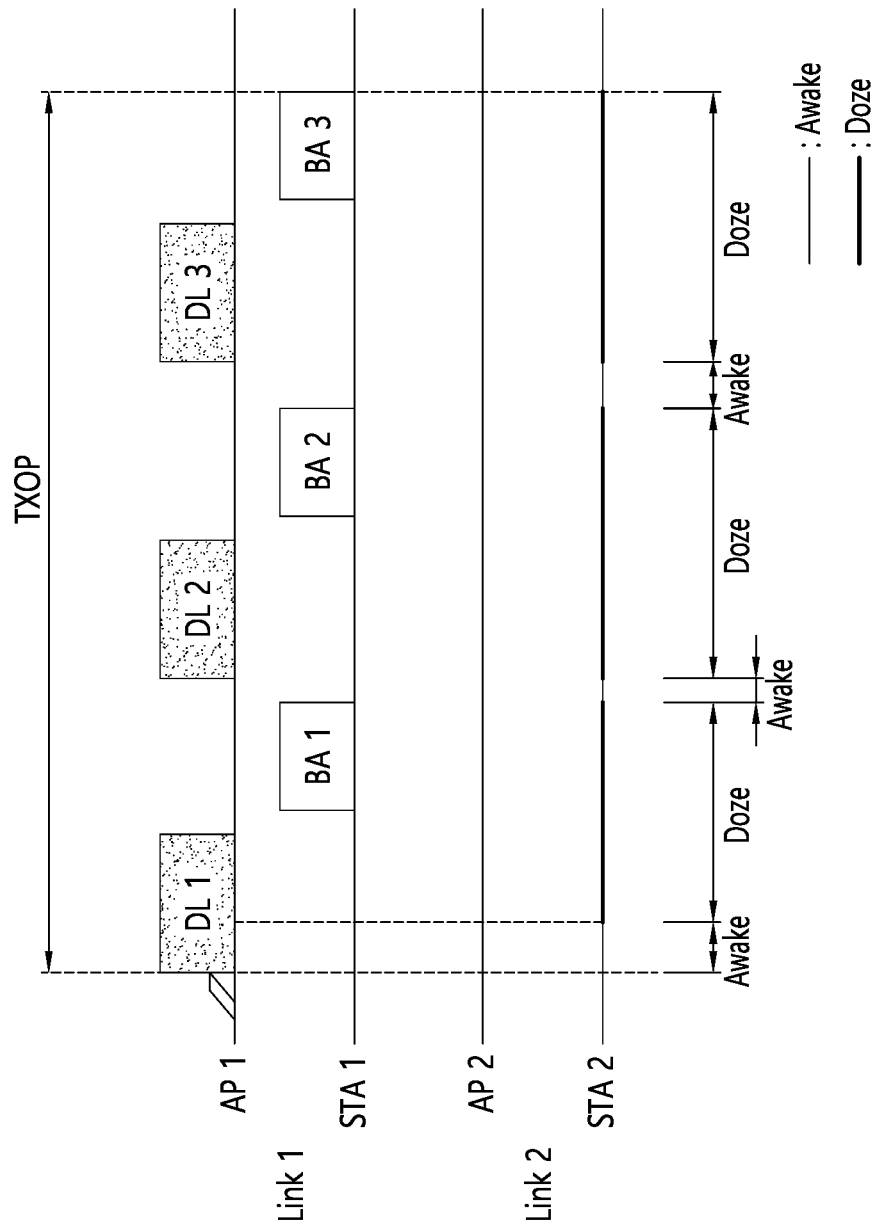
FIG. 16 shows another example of the operation of a non-AP MLD and an AP MLD.

FIG. 16 shows another example of the operation of a non-AP MLD and an AP MLD.

Referring to FIG. 16, STA 1 may be an example of the above-described first STA. STA 2 may be an example of the above-described second STA. A plurality of DL frames may be transmitted during the TXOP period. AP MLD 1 (for example, AP 1) may acquire a TXOP from Link 1.

The non-AP MLD 1 may change the state of the STA 2 from the awake state to the doze state based on the DL 1.

For example, in the case of a capability-based non-STR PSM method, the time at which the STA 2 enters the doze state may be the time at which the non-AP MLD 1 becomes aware of data transmitted to itself through a DL frame (for example, DL 1). For example, the time at which the STA 2 enters the doze state may be the time at which the non-AP MLD 1 checks the STAID field value of the PHY Header of the SU/MU PPDU or the RA value of the MAC Header of the SU/MU PPDU.

For another example, in the case of an indication-based non-STR PSM method, the time at which STA 2 enters the doze state may be the time at which non-AP MLD 1 recognizes that there is no DL frame (for example, DL 1) transmitted to STA 2 within the same DL TXOP period. For example, the time at which STA 2 enters the doze state may be the time at which non-AP MLD 1 checks DL frame presence or absence indication information for STA 2 in a DL frame received from STA 1.

For another example, the time point at which STA 2 enters the doze state may be the time point at which DL 1 is transmitted.

According to an embodiment, the non-AP MLD 1 may change the state of the STA 2 from the doze state to the awake state when the BA transmission is terminated. The non-AP MLD 1 may operate in the same manner as described above even when DL 2 and DL 3 are received.

1-2. Power-Saving Mechanism when Transmitting UL PPDU

Hereinafter, a power-saving mechanism for a case in which the non-AP MLD transmits UL data (or UL PPDU) to the AP MLD may be described. When the non-AP MLD transmits UL data (or UL PPDU) to the AP MLD, an example of operations of the non-AP MLD and the AP MLD may be described with reference to FIG. 17.

Figure 17:
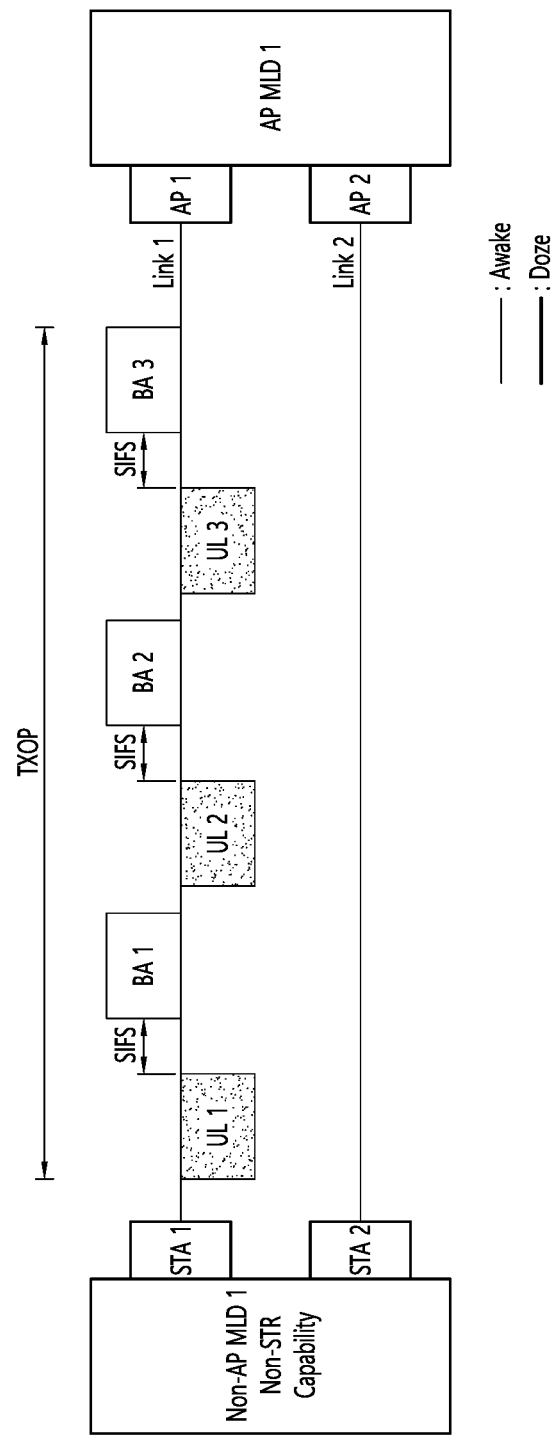
FIG. 17 shows another example of the operation of a non-AP MLD and an AP MLD.

FIG. 17 shows another example of the operation of a non-AP MLD and an AP MLD.

Referring to FIG. 17, non-AP MLD 1 and AP MLD 1 may have the structures of non-AP MLD 1 and AP MLD 1 of FIG. 8. Non-AP MLD 1 may be a non-STR capability device (or non-STR MLD) that does not support STR capability.

STA 1 of Non-AP MLD 1 may transmit a UL PPDU (or UL signal) to AP 1 through Link 1. Until the UL PPDU transmission is finished, AP 2 cannot transmit a second UL PPDU different from the UL PPDU (or a second UL signal different from the UL signal) to avoid interference. In other words, STA 2 cannot receive a DL PPDU (or a DL signal) to avoid interference until the UL PPDU transmission is finished. That is, STA 2 may only transmit the UL PPDU.

According to an embodiment, UL PPDU transmission from STA 2 to AP 2 may not occur during the same UL TXOP period. In this case, a period occurs in which neither UL PPDU transmission/DL PPDU reception occurs until UL PPDU transmission is finished from the standpoint of STA 2. During this period, STA 2 may enter a doze state (or a power-saving state, a sleep state, or an Unavailable state for Other Links) to reduce power.

Hereinafter, various embodiments regarding a section in which STA 2 enters a doze state may be described.

The Fifth Embodiment

Hereinafter, for the convenience of the description, at least one STA that transmits a UL frame may be described as a first STA. Also, for the convenience of the description, STAs distinguished from the first STA that do not transmit the UL frame may be described as the second STA.

According to the fifth embodiment, the second STA may enter the doze state during the TXOP period of the UL data frame (or UL PPDU). Accordingly, there is the effect of reducing power consumption.

Specifically, when the first STA transmits the UL frame, it may be considered that DL and UL transmissions do not occur in the second STA. In order to reduce power consumption, the second STA may enter the doze state by itself during the TXOP period of the UL data frame. The second STA may enter the doze state by itself when the first STA starts transmitting the UL frame.

In order to reduce power consumption, the second STA that has entered the doze state by itself may maintain the doze state until the transmission of UL data is finished (for example, TXOP Duration of UL data). However, when the first STA fails to transmit UL data, the non-AP MLD 1 may change the state of the STA 2 which has entered the doze state to the awake state. In addition, when operating in an indication-based non-STR PSM method, AP MLD may wake STA 2 by transmitting a traffic indication to STA 2 which has already entered the doze in a DL frame (for example, BA 1). The details of awake signaling will be further explained in Section 2.

Figure 18:
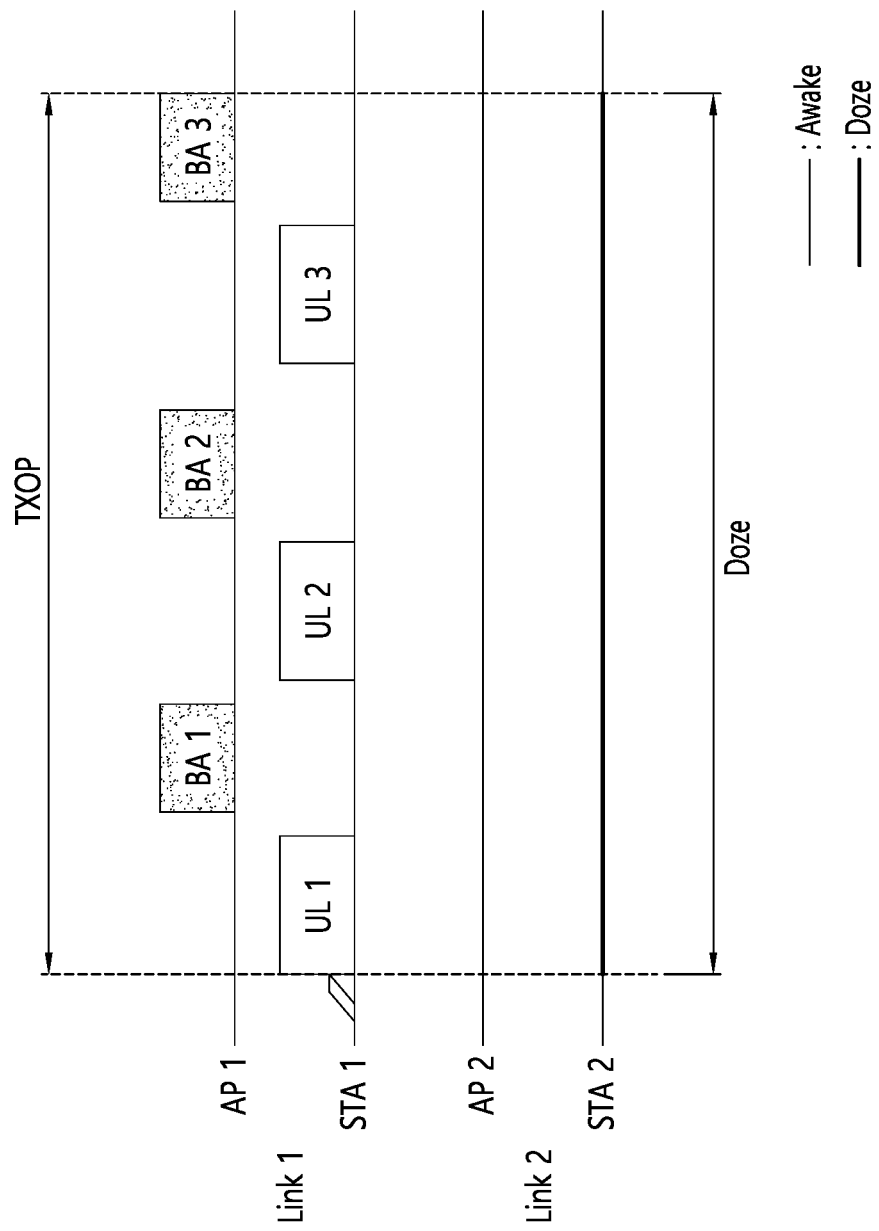
FIG. 18 shows another example of the operation of a non-AP MLD and an AP MLD.

FIG. 18 shows another example of the operation of a non-AP MLD and an AP MLD.

Referring to FIG. 18, STA 1 may be an example of the above-described first STA. STA 2 may be an example of the above-described second STA. A plurality of UL frames may be transmitted during the TXOP period. Non-AP MLD 1 (for example, STA 1) may acquire TXOP from Link 1.

STA 1 may transmit UL 1, UL 2, and UL 3 within the acquired TXOP. Non-AP MLD 1 can know that UL or DL data transmission does not occur in Link 2 during the TXOP. For example, non-AP MLD 1 may confirm that UL data transmission does not occur based on no data buffered in link 2. As another example, the non-AP MLD 1 may confirm that DL data transmission does not occur based on BA 1 received from the AP MLD 1 (for example, AP 1).

Accordingly, the non-AP MLD 1 may change the STA 2 from the awake state to the doze state during the TXOP. In other words, STA 2 may enter a doze state during the TXOP. For example, the time point at which STA 2 enters the doze state may be the time point at which UL frame transmission starts.

Although not shown, when STA 1 fails to transmit UL 1, non-AP MLD 1 may change the state of STA 2 from a doze state to an awake state. For example, when STA 1 does not receive BA 1, non-AP MLD 1 may change the state of STA 2 from a doze state to an awake state.

According to an embodiment, even when STA 2 enters the doze state, if UL data to be transmitted from STA 2 occurs, it may be changed to an awake state to attempt UL data transmission.

The Sixth Embodiment

Hereinafter, for the convenience of the description, at least one STA that transmits a UL frame may be described as a first STA. Also, for the convenience of the description, STAs distinguished from the first STA that do not transmit the UL frame may be described as the second STA.

According to the sixth embodiment, the non-AP MLD may set/change the state of the second STA to the doze state until the end of UL frame reception. According to the sixth embodiment, there is the effect of reducing power consumption.

In the fifth embodiment, the non-AP MLD sets the second STA to the doze state during UL TXOP (TXOP in which UL frames are transmitted). Unlike the fifth embodiment, the sixth embodiment may set/change the state of the second STA to the doze state until the end of UL frame transmission. Compared with the fifth embodiment, the sixth embodiment has the effect of increasing link utilization. However, compared to the fifth embodiment, the transmission opportunity (for example, channel access) increases, but power efficiency may decrease.

Specifically, when the first STA transmits the UL frame, it may be considered that DL and UL transmissions do not occur in the second STA. Accordingly, the second STA may enter the doze state until the end of UL frame transmission. The second STA may enter the awake state after the transmission of the UL frame is terminated.

A specific example of the sixth embodiment may be described with reference to FIG. 19.

Figure 19:
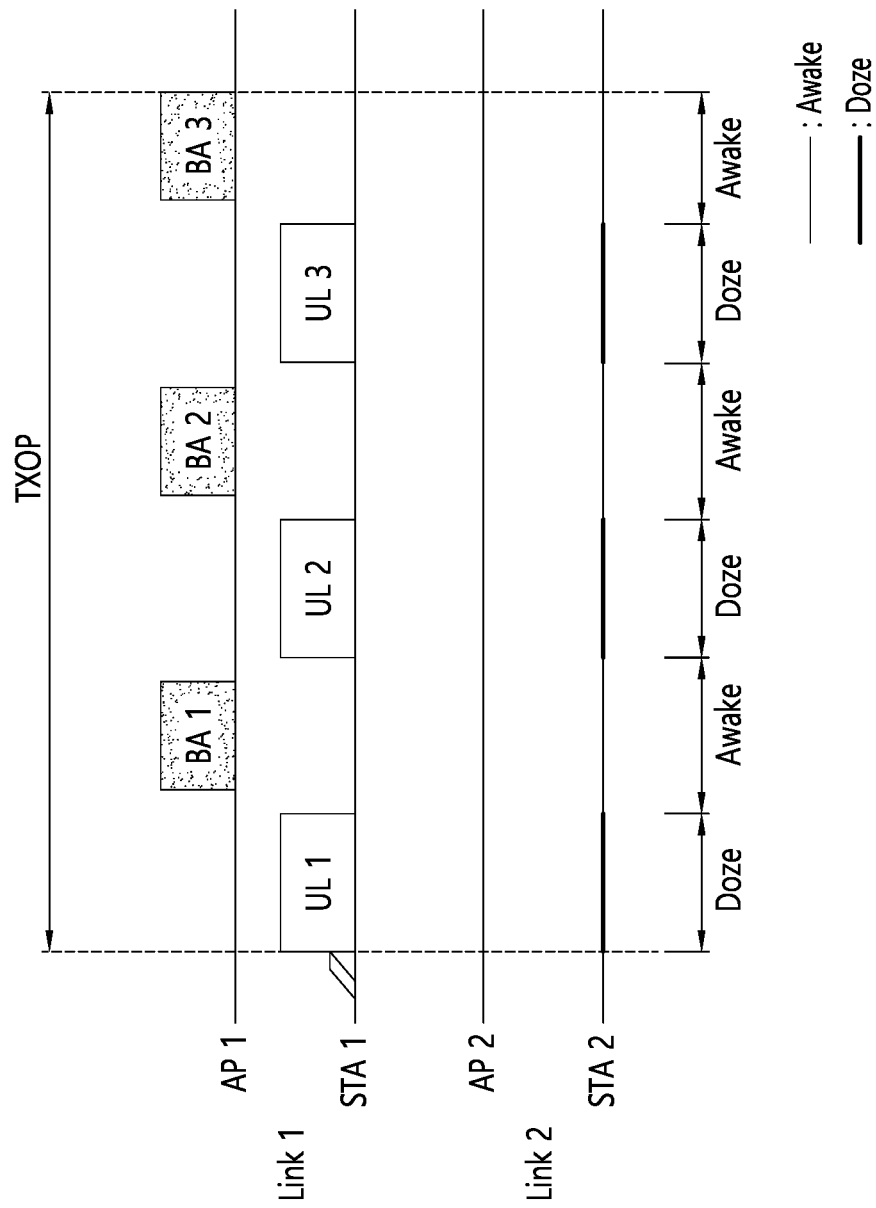
FIG. 19 shows another example of the operation of a non-AP MLD and an AP MLD.

FIG. 19 shows another example of the operation of a non-AP MLD and an AP MLD.

Referring to FIG. 19, STA 1 may be an example of the above-described first STA. STA 2 may be an example of the above-described second STA. A plurality of UL frames may be transmitted during the TXOP period. Non-AP MLD 1 (for example, STA 1) may acquire TXOP from Link 1.

STA 1 may transmit UL 1, UL 2, and UL 3 within the acquired TXOP. Non-AP MLD 1 can know that UL or DL data transmission does not occur in Link 2 during the transmission period of UL 1. For example, non-AP MLD 1 may confirm that UL data transmission does not occur based on no data buffered in link 2.

Accordingly, the non-AP MLD 1 may change the STA 2 from the awake state to the doze state during the transmission period of UL 1 (or the duration of UL 1). In other words, STA 2 may enter a doze state during the transmission period of UL 1. For example, the time point at which STA 2 enters the doze state may be the time point at which UL 1 transmission starts.

When a plurality of UL frames (for example, UL 1, UL 2, and UL 3) are transmitted through Link 1 during the UL TXOP period, STA 1 may receive each Block ACK (BA) for each UL frame from AP 1 through DL.

During a period in which DL data reception for BA occurs, the same DL data transmission may occur from AP 2. Accordingly, the STA 2 may change the state to the awake state at every DL frame reception end time. That is, STA 2 may receive a DL frame from AP 2 when receiving BA from STA 1.

Therefore, according to the sixth embodiment, there is the effect of increasing link utilization. However, according to the sixth embodiment, the transmission opportunity may increase, but power efficiency may decrease.

Although not shown, when STA 1 fails to transmit UL 1, non-AP MLD 1 may change the state of STA 2 from a doze state to an awake state. For example, when STA 1 does not receive BA 1, non-AP MLD 1 may change the state of STA 2 from a doze state to an awake state.

According to an embodiment, even when STA 2 enters the doze state, if UL data to be transmitted from STA 2 occurs, STA 2 may change to an awake state and attempt UL data transmission.

The Seventh Embodiment

Hereinafter, for the convenience of the description, at least one STA that transmits a UL frame may be described as a first STA. Also, for the convenience of the description, STAs distinguished from the first STA that do not transmit the UL frame may be described as the second STA.

According to the seventh embodiment, when multiple UL frames are transmitted during the same TXOP, the non-AP MLD may set/change the state of the second STA to the doze state until the end of the nth UL frame. 'n' may mean the total number of UL frames transmitted by the non-AP MLD (for example, STA 1). The n-th UL frame may be changed according to the number of frames. That is, the n-th UL frame may mean the last transmitted frame. According to the seventh embodiment, there is the effect of reducing power consumption.

Specifically, when the first STA transmits a UL frame, it may be considered that DL and UL transmission does not occur in the second STA (or the link in which the second STA operates). Accordingly, the second STA may enter the doze state until the time at which the n-th UL frame transmission is terminated. The second STA may enter the awake state after the n-th UL frame transmission ends. Information on the n-th DL frame may be transmitted while being included in the first transmitted DL frame or may be transmitted while being included in the last transmitted n-th DL frame. Accordingly, after entering the doze state, the second STA may change the state to the awake state at the end of transmission of the n-th DL frame.

Figure 20:
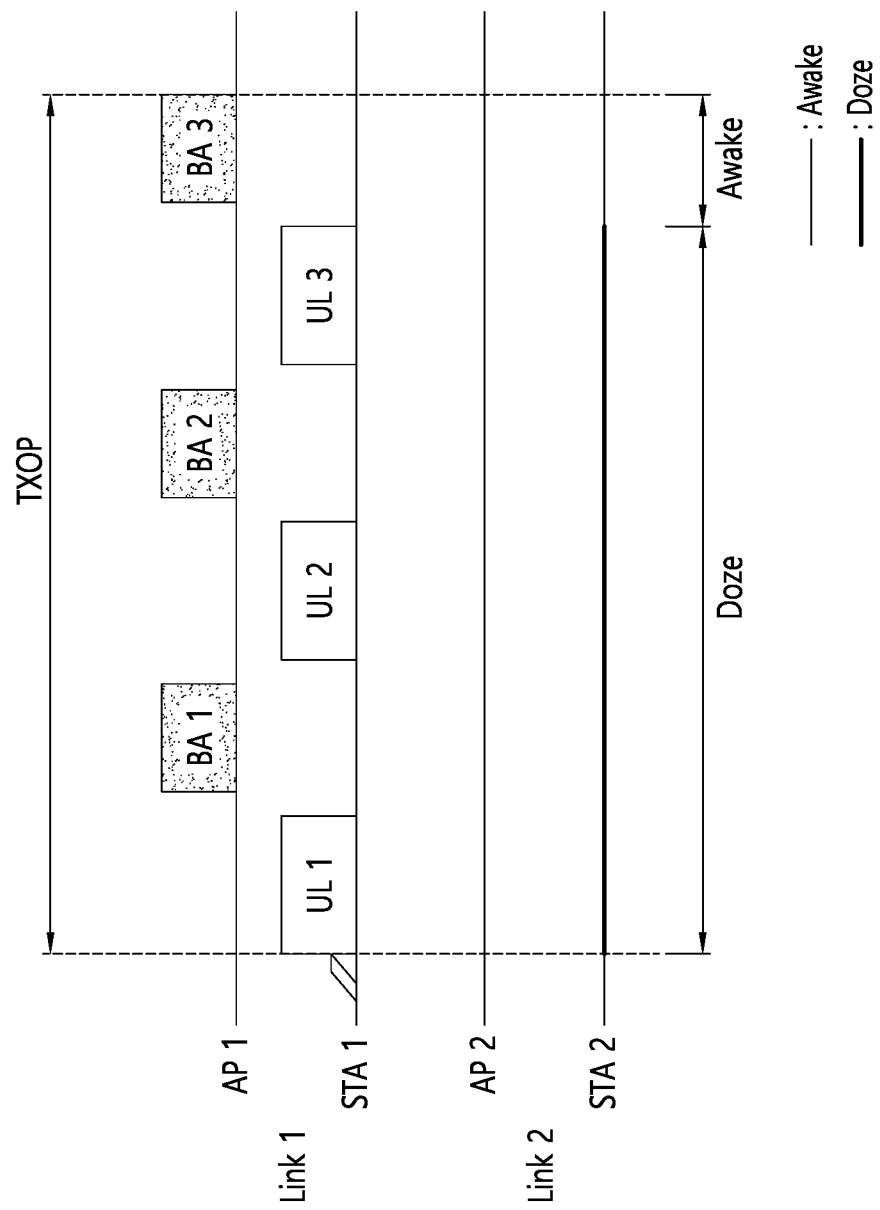
FIG. 20 shows another example of the operation of a non-AP MLD and an AP MLD.

FIG. 20 shows another example of the operation of a non-AP MLD and an AP MLD.

Referring to FIG. 20, STA 1 may be an example of the above-described first STA. STA 2 may be an example of the above-described second STA. A plurality of UL frames may be transmitted during the TXOP period. Non-AP MLD 1 (for example, STA 1) may acquire TXOP from Link 1.

STA 1 may transmit UL 1, UL 2, and UL 3 within the acquired TXOP. The non-AP MLD 1 may change the state of the STA 2 to the doze state until the end of the UL 3 transmission. In other words, STA 2 may maintain a doze state until the end of UL 3 transmission. For example, the time point at which STA 2 enters the doze state may be the time point at which UL 1 transmission starts. After entering the doze state, STA 2 may change the state from the doze state to the awake state at the UL 3 transmission endpoint. In this method as well, when the indication-based non-STR PSM method is used, If buffer data occurs during the doze period of the STA, by transmitting the traffic indication information for STA 2 in the DL BA or ACK frame of STA 1, it is possible to awake the STA that has entered the doze.

Although not shown, when STA 1 fails to transmit UL 1, non-AP MLD 1 may change the state of STA 2 from a doze state to an awake state. For example, when STA 1 does not receive BA 1, non-AP MLD 1 may change the state of STA 2 from a doze state to an awake state.

According to an embodiment, even when STA 2 enters the doze state, if UL data to be transmitted from STA 2 occurs, STA 2 may change to an awake state and attempt UL data transmission.

The Eighth Embodiment

Hereinafter, for the convenience of the description, at least one STA that transmits a UL frame may be described as a first STA. Also, for the convenience of the description, STAs distinguished from the first STA that do not transmit the UL frame may be described as the second STA.

According to the eighth embodiment, in addition to the duration of the UL frame, the non-AP MLD may set/change the state of the second STA to the doze state until UL frame reception end time+SIFS+BA transmission time. In other words, the non-AP MLD may set the state of the second STA to the doze state when transmitting the UL frame. In response to the UL frame, the non-AP MLD may maintain the state of the second STA in the doze state until the reception of the BA after SIFS is completed. The second STA may enter the awake state after the reception of the BA is terminated.

According to the eighth embodiment, there is the effect of reducing power consumption.

In the fifth embodiment, during DL TXOP (TXOP in which a DL frame is transmitted), the non-AP MLD sets the second STA to the doze state. Unlike the fifth embodiment, the eighth embodiment may set/change the state of the second STA to the doze state until the BA transmission ends.

Figure 21:
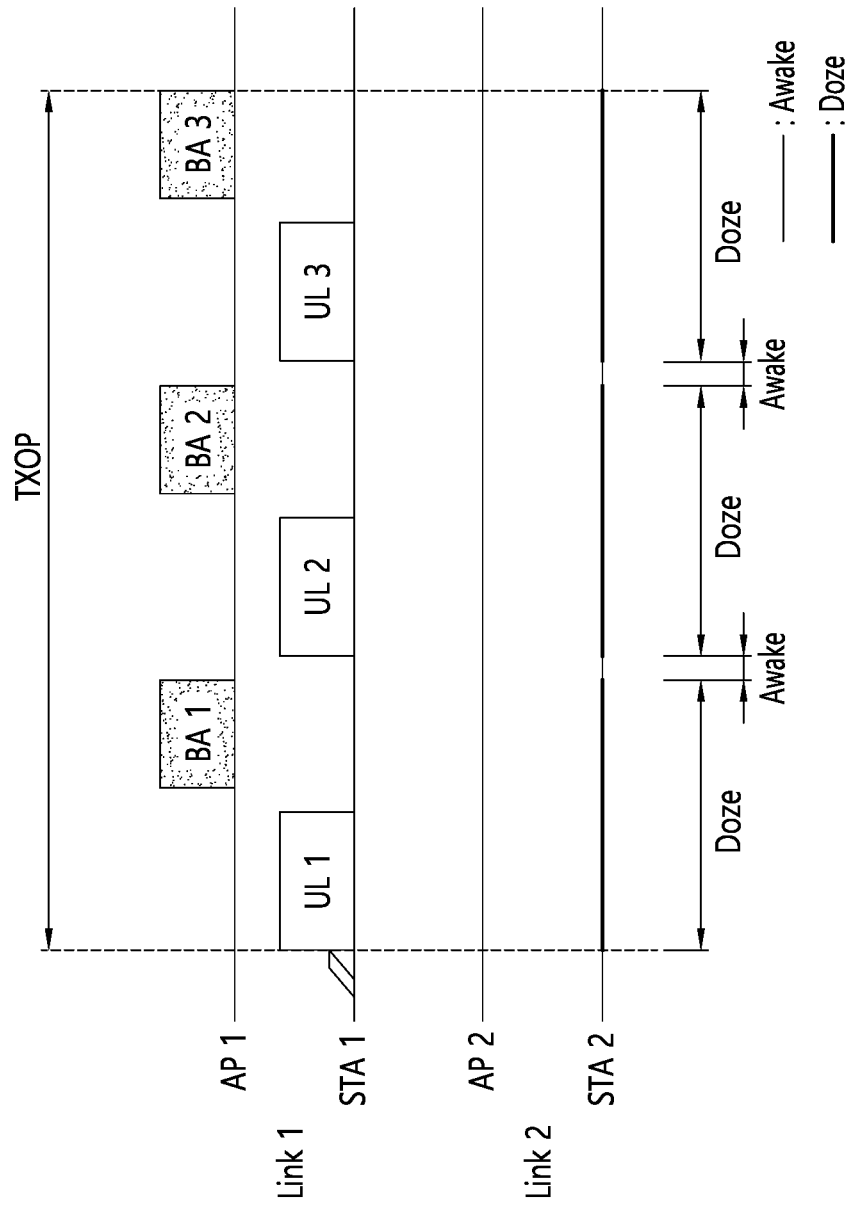
FIG. 21 shows another example of the operation of a non-AP MLD and an AP MLD.

FIG. 21 shows another example of the operation of a non-AP MLD and an AP MLD.

Referring to FIG. 21, STA 1 may be an example of the above-described first STA. STA 2 may be an example of the above-described second STA. A plurality of UL frames may be transmitted during the TXOP period. Non-AP MLD 1 (for example, STA 1) may acquire TXOP from Link 1.

The non-AP MLD 1 may change the state of the STA 2 from an awake state to a doze state based on UL 1.

For example, the time at which STA 2 enters the doze state may be the time at which UL 1 is transmitted.

According to an embodiment, the non-AP MLD 1 may change the state of the STA 2 from the doze state to the awake state when the BA transmission is terminated. The non-AP MLD 1 may operate in the same manner as described above even when DL 2 and DL 3 are received.

Although not shown, when STA 1 fails to transmit UL 1, non-AP MLD 1 may change the state of STA 2 from a doze state to an awake state. For example, when STA 1 does not receive BA 1, non-AP MLD 1 may change the state of STA 2 from a doze state to an awake state. In this method as well, if the indication-based non-STR PSM method is used, if buffer data occurs during the doze period of the STA, by transmitting the traffic indication information for STA 2 in the DL BA or ACK frame of STA 1, it is possible to awake the STA that has entered the doze.

According to an embodiment, even when STA 2 enters the doze state, if UL data to be transmitted from STA 2 occurs, STA 2 may change to an awake state and attempt UL data transmission.

Through the above-described embodiments, the non-AP MLD that does not support STR capability can reduce unnecessary power consumption.

2. Awake Signaling Proposal for Power-Saving Mechanism Considering Non-STR Capability In an example of the present specification, an indication-based non-STR PSM was proposed to improve the throughput performance of the non-STR PSM. Indication information indicating the presence or absence of a data buffer of the non-AP MLD may be included in a DL frame (for example, DL data or ACK frame, etc.) transmitted by the AP MLD, and the non-AP MLD may utilize the above information as awake signaling to awake an STA that has already entered doze.

2-1. Awake Signaling Method for Power Saving of Non-STR Non-AP MLD

The technique according to an example of the present specification may be divided into a case in which a non-AP MLD receives a DL using a partial link and a case in which a UL is transmitted using a partial link, and may include various embodiments in which the period during which the STA enters the doze state is changed for additional power reduction.

2-1-1. When Non-AP MLD Receives DL Data from AP MLD

When STA1 of Non-AP MLD 1 receives DL from AP 1 through Link 1, until DL PPDU reception is finished, STA 2 shall not transmit UL data to avoid interference, and can only receive DL data. Assuming that DL data transmission to STA 2 of AP 2 does not occur during the same DL TXOP period, a period in which neither UL data transmission nor DL data reception in STA 2 occurs until DL data transmission of AP 1 is completed may occur. During this period, STA 2 may enter a doze state (or a power-saving state, a sleep state, or an unavailable state for other links) to reduce power.

The above-mentioned situation in which the AP 2 considers that DL data transmission does not occur to the STA 2 may include the following situations.
  i) A case in which AP 2 does not have DL data to transmit to STA 2
  ii) A case in which AP 2 has DL data to transmit to STA 2, but is not able to transmit it because the channel is busy In the above two cases, the STA may determine that it is impossible to receive DL data and enter a doze state to reduce power. For this, the AP MLD may indicate such information to the non-AP MLD in the DL data, and the details are as follows.

When AP 1 transmits DL data to STA 1, in order to indicate that DL data transmission from AP 2 to STA 2 does not occur during the same DL TXOP or DL PPDU period, the following method may be used.

Figure 22:
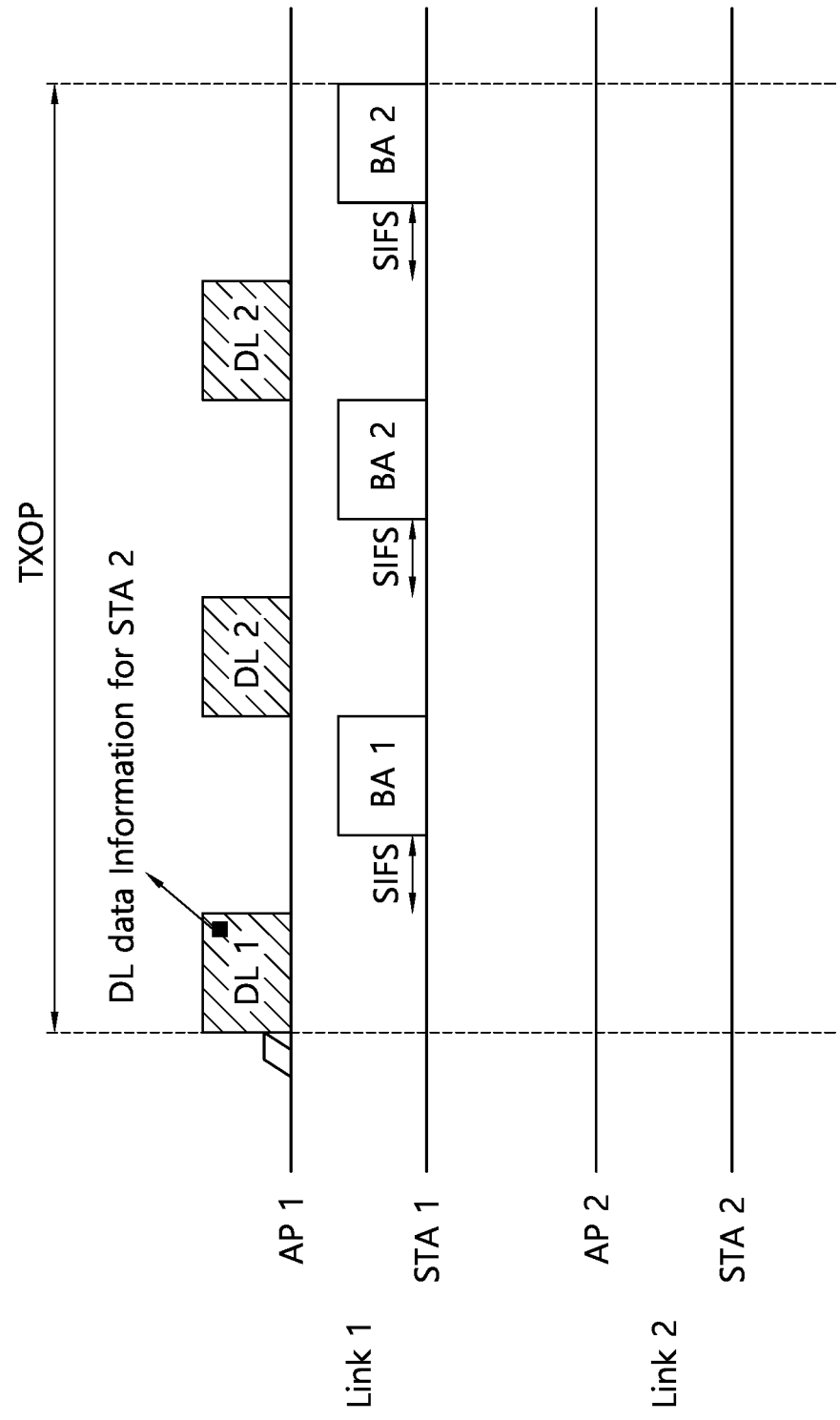
FIG. 22 is a diagram illustrating an embodiment of a method of transmitting information related to the presence or absence of DL data to be transmitted to another STA.

FIG. 22 is a diagram illustrating an embodiment of a method of transmitting information related to the presence or absence of DL data to be transmitted to another STA.

Referring to FIG. 22, if DL frame transmission occurs only in some links within TXOP, the AP MLD may transmit DL frame including DL data reception/non-reception information (for example, traffic indicator information) of other STAs. The STA MLD may check whether the current AP 2 has a data buffer for STA 2 through DL data reception status information included in the DL frame received from Link 1. In order to display this information, a new field may be defined or an existing TIM element may be reused.

The indication included in the DL frame may be skipped in the case of an STA that has no content to indicate. If the indication is omitted, the STA may determine that there is no buffered data for itself from the AP. For example, when only DL transmission for STA 1 occurs within the same TXOP and there is no DL data to be transmitted to STA 2, AP 1 may transmit this information by being included in the DL frame for STA 1. At this time, the non-AP MLD 1 that has received the DL frame through Link 1 can confirm that there is no DL data transmitted to STA 2 within the same DL TXOP period based on this information, and enter the doze state.

Figure 23:
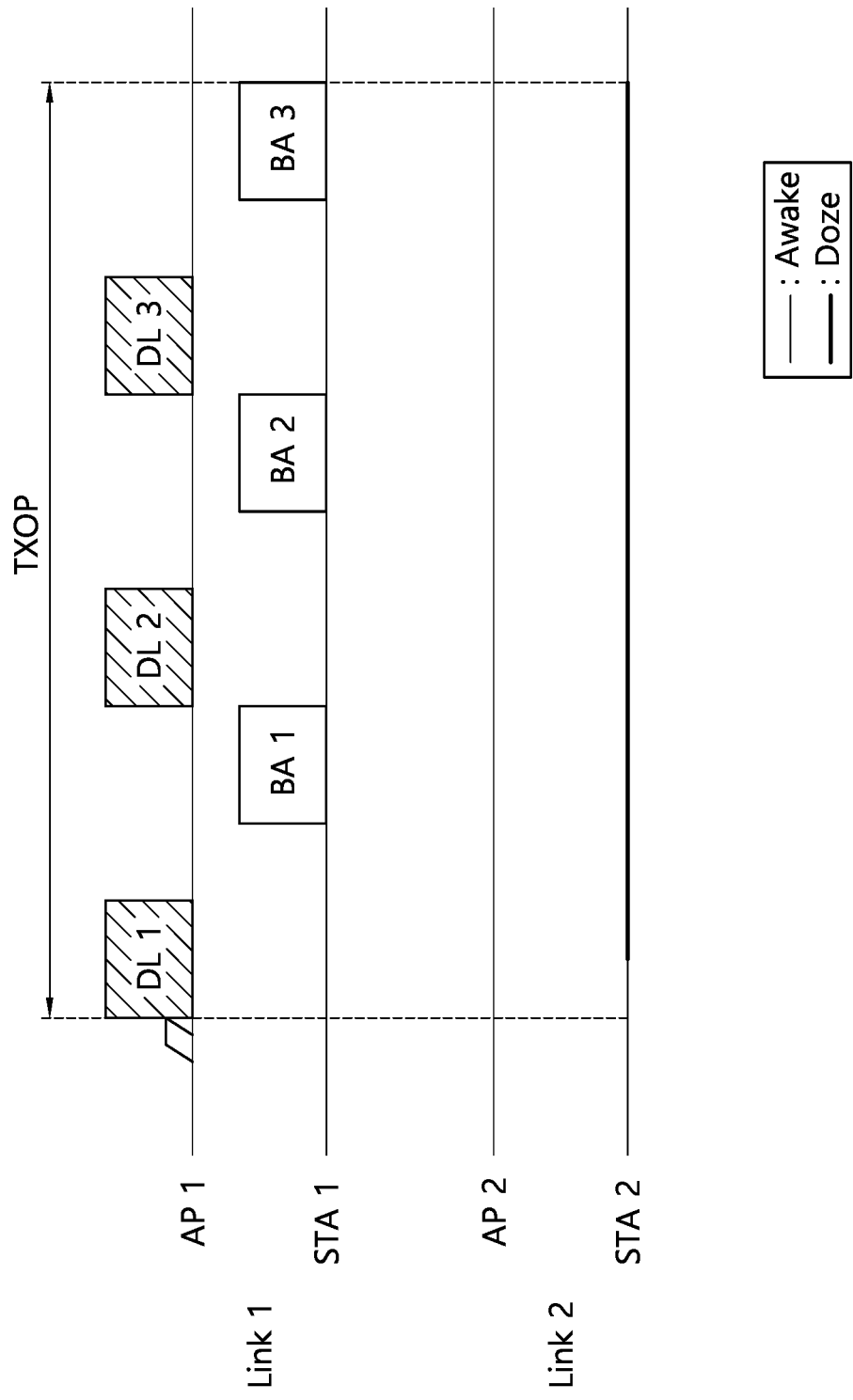
FIG. 23 is a diagram illustrating an embodiment in which STA 2 enters a doze state during DL TXOP.

When the Non-AP MLD, which is a Non-STR Capability device, receives a DL frame from the AP MLD through one or more STAs (for example, STA 1 or Link 1 in FIG. 22), if it is considered that DL and UL transmissions do not occur through other STAs (or other Links) during the corresponding TXOP period by using at least one of TXOP field information located in the PHY header of the corresponding DL frame or the Duration field located in the MAC header (for example, if it is confirmed that there is no DL frame for STA 2 within the same TXOP based on the DL frame of STA 1 as shown in FIG. 22), power consumption can be reduced, because other STAs of the non-AP MLD (STA 2 or Link 2 in FIG. 13) enter the doze state (or Power-saving state, sleep state, or Unavailable state for Other Links) during the DL TXOP period, as shown if FIG. 23.

FIG. 23 is a diagram illustrating an embodiment in which STA 2 enters a doze state during DL TXOP.

Referring to FIG. 23, the time at which STA 2 enters the doze state may be the time at which non-AP MLD 1 knows whether data is transmitted to itself through a DL frame (for example, the STAID field value of the PHY Header of the SU/MU PPDU or the RA value of the MAC Header of the SU/MU PPDU) or the time at which non-AP MLD 1 recognizes that there is no DL frame transmitted to STA 2 within the same DL TXOP period (for example, the time at which DL frame presence indication information for STA 2 in the DL frame of STA 1 is checked). However, the time to check whether data is transmitted to itself as described above may be changed according to future development technology. Thereafter, the STAs that have entered the doze state change to the awake state after the TXOP duration ends. In general, even if DL data to be transmitted to STA 2 occurs during the DL TXOP period, AP 2 buffers the data until the DL TXOP ends because STA 2 has already entered the doze state. However, depending on the situation, the DL data may be transmitted after selectively waking STA 2 during DL TXOP. For example, as shown in FIG. 7, it corresponds to the case in which AP 2 has no DL data for STA 2 when AP 1 transmits DL 1, but data to be transmitted occurs during DL TXOP or the case in which there is DL data for STA 2, however, since the channel state is busy, the transmission is not possible and it is buffered. In a case like this, if information for awake of STA 2 (for example, traffic indication information for STA 2) and timing information for awake (for example, DL 1 PPDU duration information or DL1+SIFS+BA1 information, etc.) are included in the DL frame and transmitted by AP 1, STA 2 wakes up at an appropriate timing to receive its DL data. Awake timing information can be omitted. If omitted, STA 2 may be awake at an appropriate timing in consideration of interference between links. An example of this is shown in FIG. 24.

Figure 24:
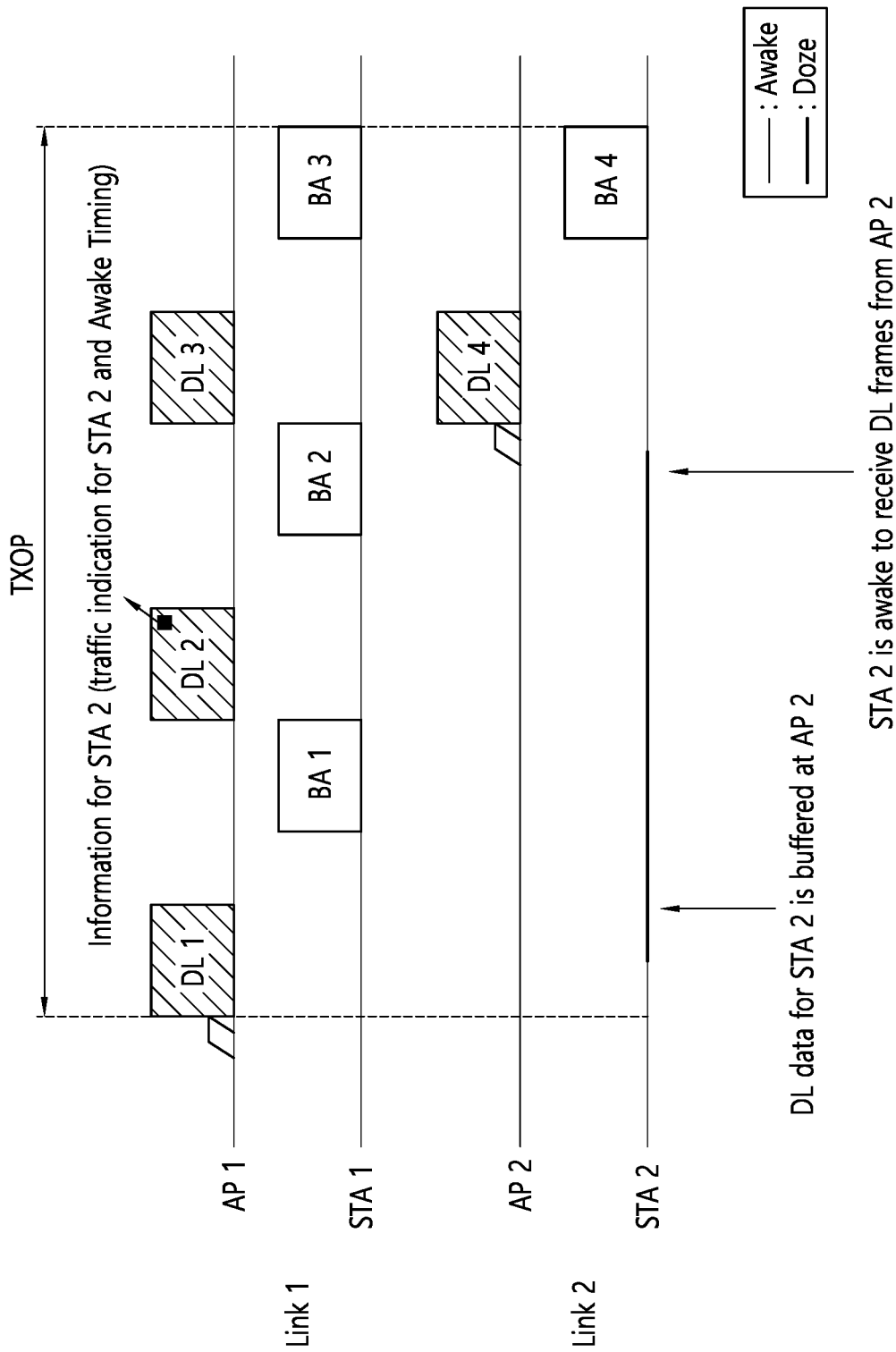
FIG. 24 is a diagram illustrating an embodiment of a method of waking STA 2 during DL TXOP.

FIG. 24 is a diagram illustrating an embodiment of a method of waking STA 2 during DL TXOP.

Referring to FIG. 24, STA 2 which does not receive DL data when AP 1 transmits DL 1 enters the doze state during DL TXOP based on the proposed non-STR PSM. However, if DL data to be transmitted from AP 2 to STA 2 occurs before AP 1 transmits DL 2, information about this (TIM and awake timing information for STA 2) may be included in the DL 2 frame and transmitted. Upon receiving this, non-AP MLD 1 wakes STA 2 according to the awake timing included in this information. However, the awake timing information may be omitted. If non-AP MLD 1 supports STR capability, since STA 2 can transmit/receive at the same time, there is no need to include separate wake time information and transmit it. In other words, the STA 2 which has received the awake information about itself may immediately awake and receive DL data from the AP 2.

However, if non-AP MLD does not support STR capability, AP 2 shall transmit DL in time during DL transmission of AP 1 to avoid data collision due to inter-link interference (that is, while STA1 is transmitting BA 2 UL transmission for DL 2 or BA 3 for DL 3, AP 2 shall not perform DL RX). In this case, if appropriate time information (for example, DL 2 PPDU duration+SIFS+BA2 time) for DL reception is transmitted to STA 2, more power consumption can be reduced. However, whether the AP 2 transmits DL data to the STA 2 may be determined according to the channel access situation of the AP 2 (for example, when the backoff count becomes 0).

Figure 25:
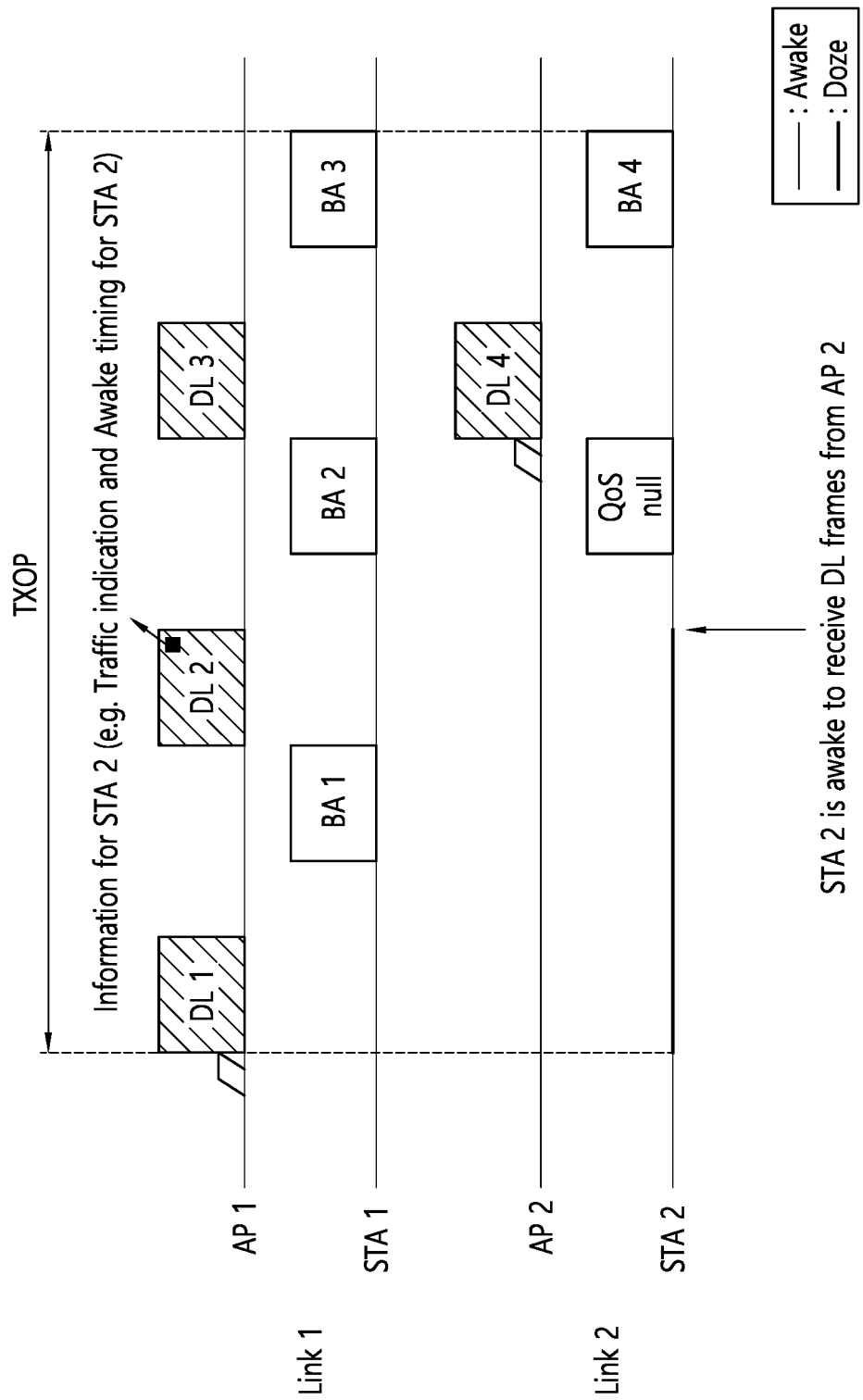
FIG. 25 is a diagram illustrating an embodiment of a method of waking STA 2 during DL TXOP.

FIG. 25 is a diagram illustrating an embodiment of a method of waking STA 2 during DL TXOP.

Referring to FIG. 25, AP 1 may provide DL 2 PPDU duration information as awake time information of STA 2. Upon receiving such awake information, STA 2 may immediately awake or may awake according to the DL 2 PPDU reception end time of STA 1. The awake STA 2 may transmit a frame for notifying the AP 2 that it has awakened according to the UL TX timing for ACK of STA 1 (for example, PS-Poll or QoS null frames). Alternatively, 'information that STA 2 has awakened' may be put into ACK or BA transmitted by STA 1. For example, when STA 2 in FIG. 15 awakes based on the indication of DL 2, information that STA 2 has awakened may be indicated on BA 2 of STA 1 as an indication, and may be transmitted to the AP MLD. In this case, overhead for UL data transmitted by STA 2 may be reduced. After confirming that STA 2 has awakened, AP 2 may start transmitting DL data to STA 2 during DL 3 frame transmission of AP 1. However, whether the AP 2 transmits DL data to the STA 2 may be determined according to the channel access situation of the AP 2 (for example, when the backoff count becomes 0). In the example of FIG. 15, the amount of reduced power consumption is reduced compared to the example of FIG. 14. However, it is possible to clearly inform the AP 2 that it has awakened.

2-1-2. When Non-AP MLD Transmits UL Data to AP MLD

In the case of explaining with FIG. 8, when STA 1 of Non-AP MLD 1 that does not support STR capability transmits UL data to AP 1 through Link 1, STA 2 without a UL frame to transmit may enter doze. However, if it is considered that DL data transmission from AP 2 to STA 2 does not occur during the same UL TXOP period, from the standpoint of STA 2, a period in which neither UL data transmission/DL data reception occurs during the UL TXOP period of STA 1 occurs. An example of this is shown in FIG. 26.

Figure 26:
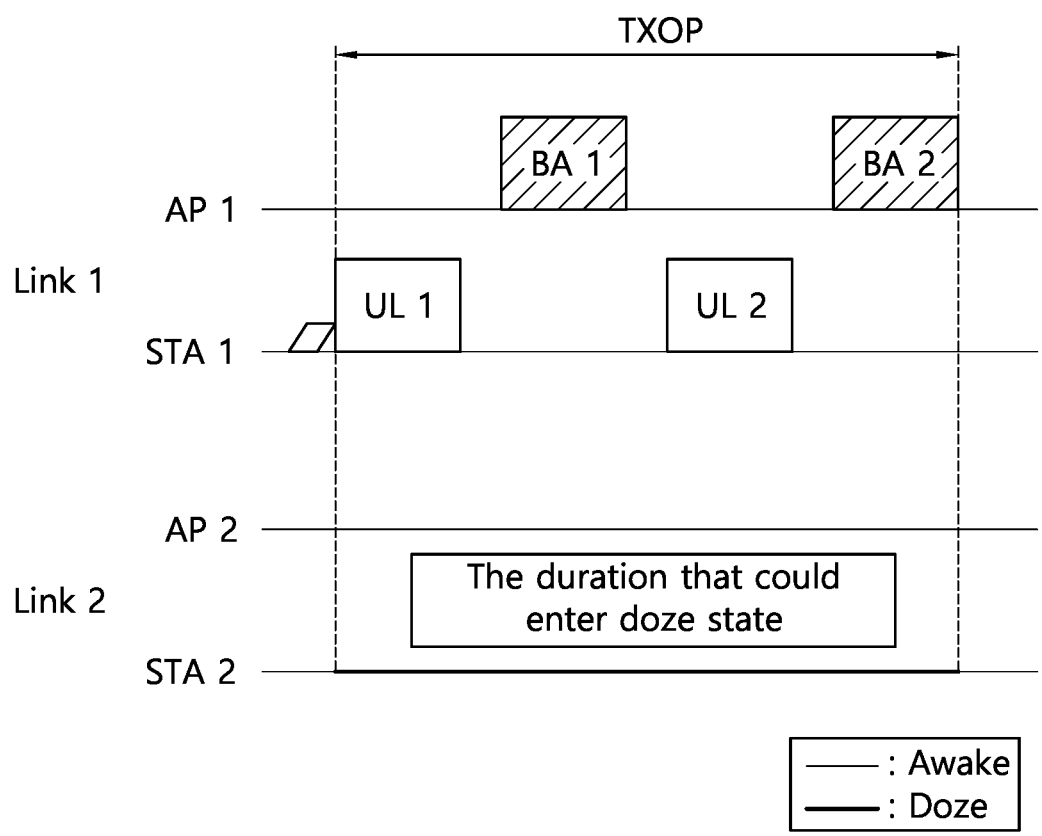
FIG. 26 is a diagram illustrating an embodiment of a method for STA 2 to enter a doze state during UL TXOP.

FIG. 26 is a diagram illustrating an embodiment of a method for STA 2 to enter a doze state during UL TXOP.

Referring to FIG. 26, when STA 1 starts UL TX transmission, STA 2 may enter the doze state when there is no UL frame to transmit. Afterward, when STA 1 receives BA 1 from AP 1, since the non-AP MLD does not support STR capability, STA 2 can only receive DL from AP 2 and shall not perform UL transmission. Therefore, when there is no UL data to transmit, STA 2 may maintain a doze state until the UL TXOP of STA 1 is terminated. While AP 1 transmits BA 1 or BA 2 to STA 1, AP 2 could also transmit DL to STA 2. However, it may be more practical for STA 2 to maintain a doze state during this period because the BA transmission period is short and DL transmission is not easy during that period. However, if UL transmission data occurs during the UL TXOP period of STA 1, STA 2 may awake itself and transmit it according to the timing at which STA 1 transmits UL data. In this case, in order to prevent link interference, STA 2 may not perform UL transmission in a period in which AP 1 transmits ACK or BA to STA 1.

However, if during the UL TXOP period of STA1, DL data for STA2 may be buffered by AP2. If this information is informed to STA 2, STA 2 may wake up before the end of the UL TXOP to receive this DL data.

For this, the AP may transmit by indicating buffered traffic information for STA 2 through ACK or BA transmitted by the AP. The contents thereof are shown in FIG. 27.

Figure 27:
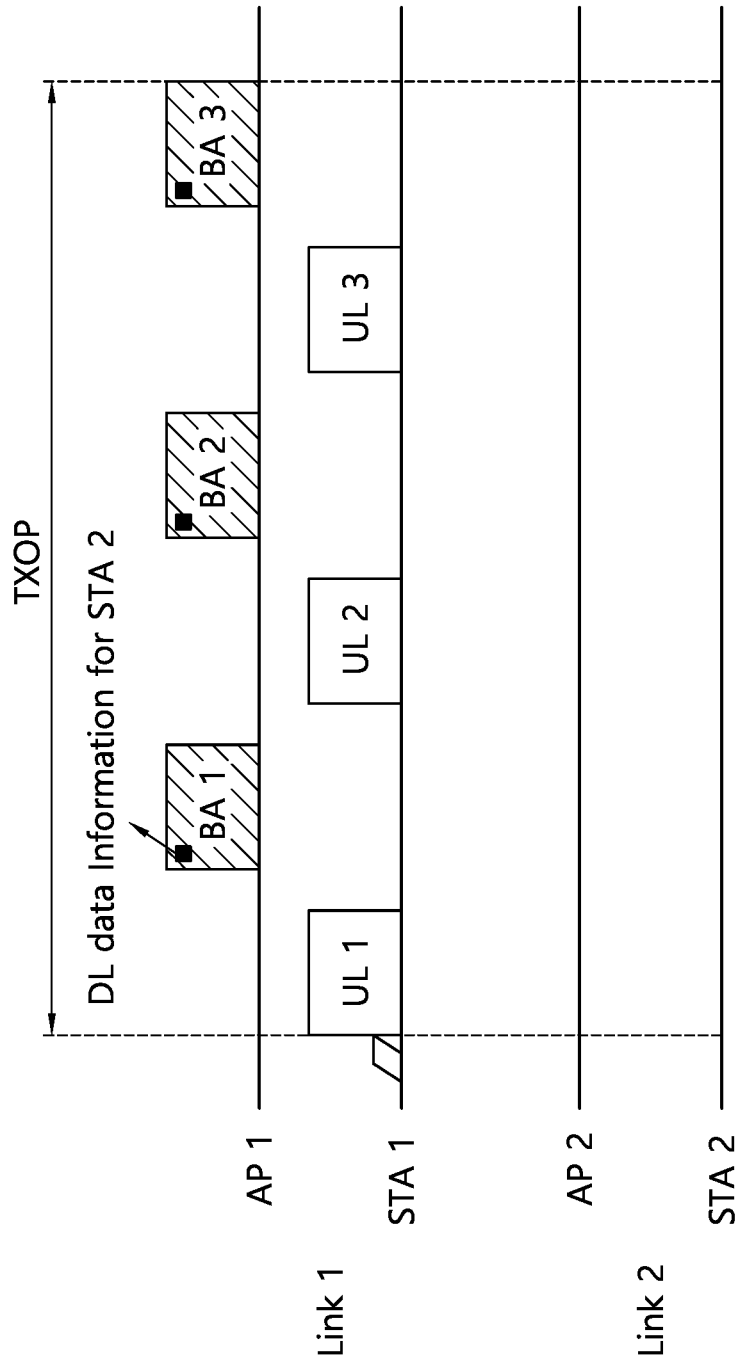
FIG. 27 is a diagram illustrating an embodiment of a method of transmitting information related to the presence or absence of DL data to be transmitted to another STA.

FIG. 27 is a diagram illustrating an embodiment of a method of transmitting information related to the presence or absence of DL data to be transmitted to another STA.

Referring to FIG. 27, the AP may indicate the presence or absence of a data buffer of an STA connected to another link in an ACK or BA frame. Indication included in this ACK frame may be skipped if there is no content to indicate to an STA connected to another link. For example, when there is no data buffered in STA 2, the indication may be omitted in BA 1.

Indication related to the presence or absence of DL data to be transmitted to another STA may be used as a signaling method for waking non-AP MLD operating as a power-saving mechanism. The AP may transmit DL data by waking the STA that has entered the doze state by notifying the awake timing along with the presence or absence of the DL data buffer of the STA. However, the awake timing information may be omitted.

Figure 28:
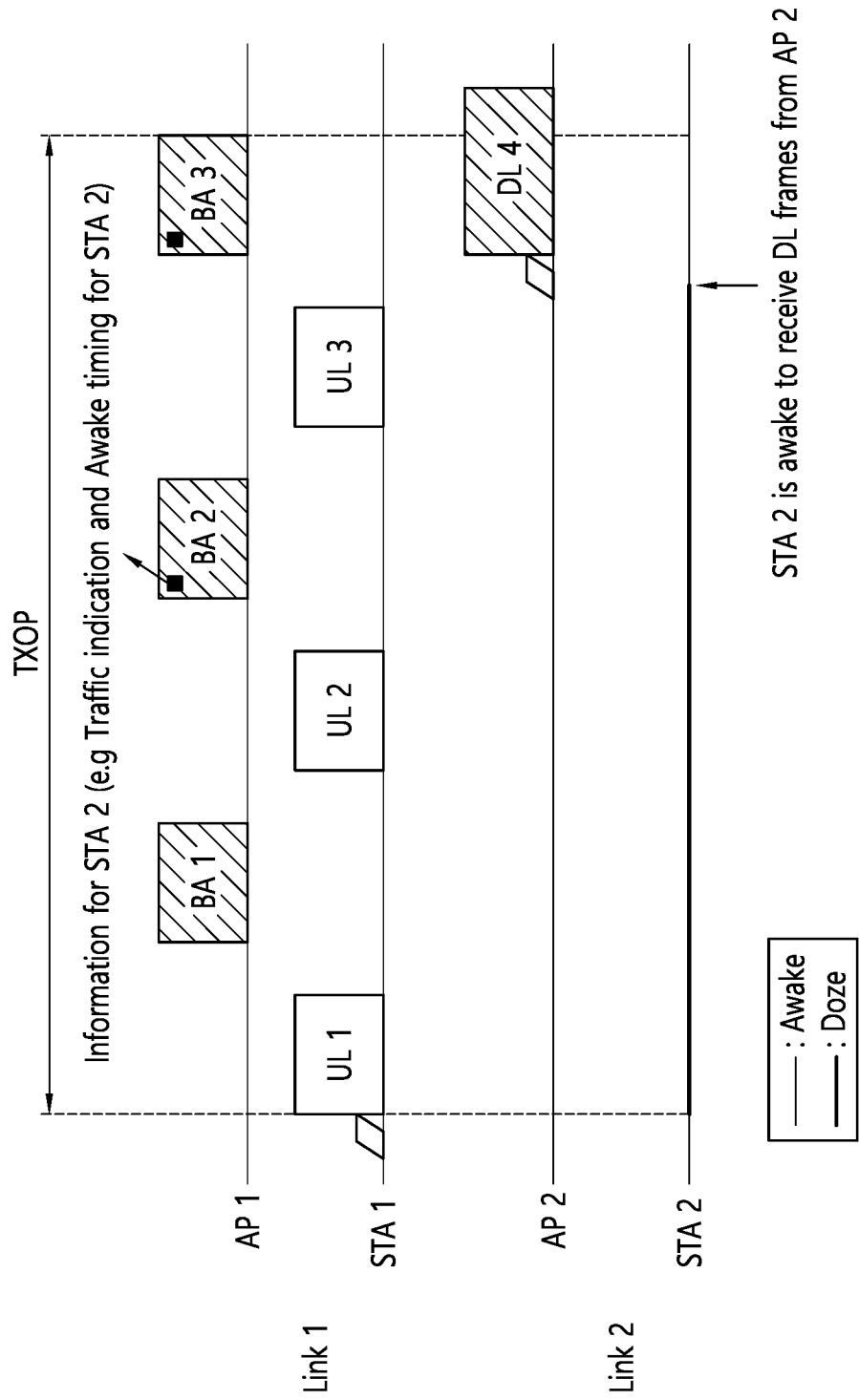
FIG. 28 is a diagram illustrating an embodiment of a method of waking STA 2 during UL TXOP.

An example of this is shown in FIG. 28.

FIG. 28 is a diagram illustrating an embodiment of a method of waking STA 2 during UL TXOP.

Referring to FIG. 28, when STA 1 starts transmitting UL data, STA 2 without UL data to transmit may enter a doze state (because non-AP MLD is non-STR capability, when STA 1 transmits UL, AP 2 does not transmit DL to STA 2 to avoid interference, so STA 2 may enter the doze state). At this time, if it is confirmed through BA 2 that there is buffer data for STA 2 in AP 2, STA 2 may awake according to the awake timing transmitted through BA 2 (for example, before starting BA 3 transmission of AP 1). The awake STA 2 may receive DL data from AP 1 after UL 3 transmission of STA 1.

If the STA wakes up through the above indication, it may notify the AP that it has awakened through a PS-Poll or QoS null frame. An example of this is shown in FIG. 29.

Figure 29:
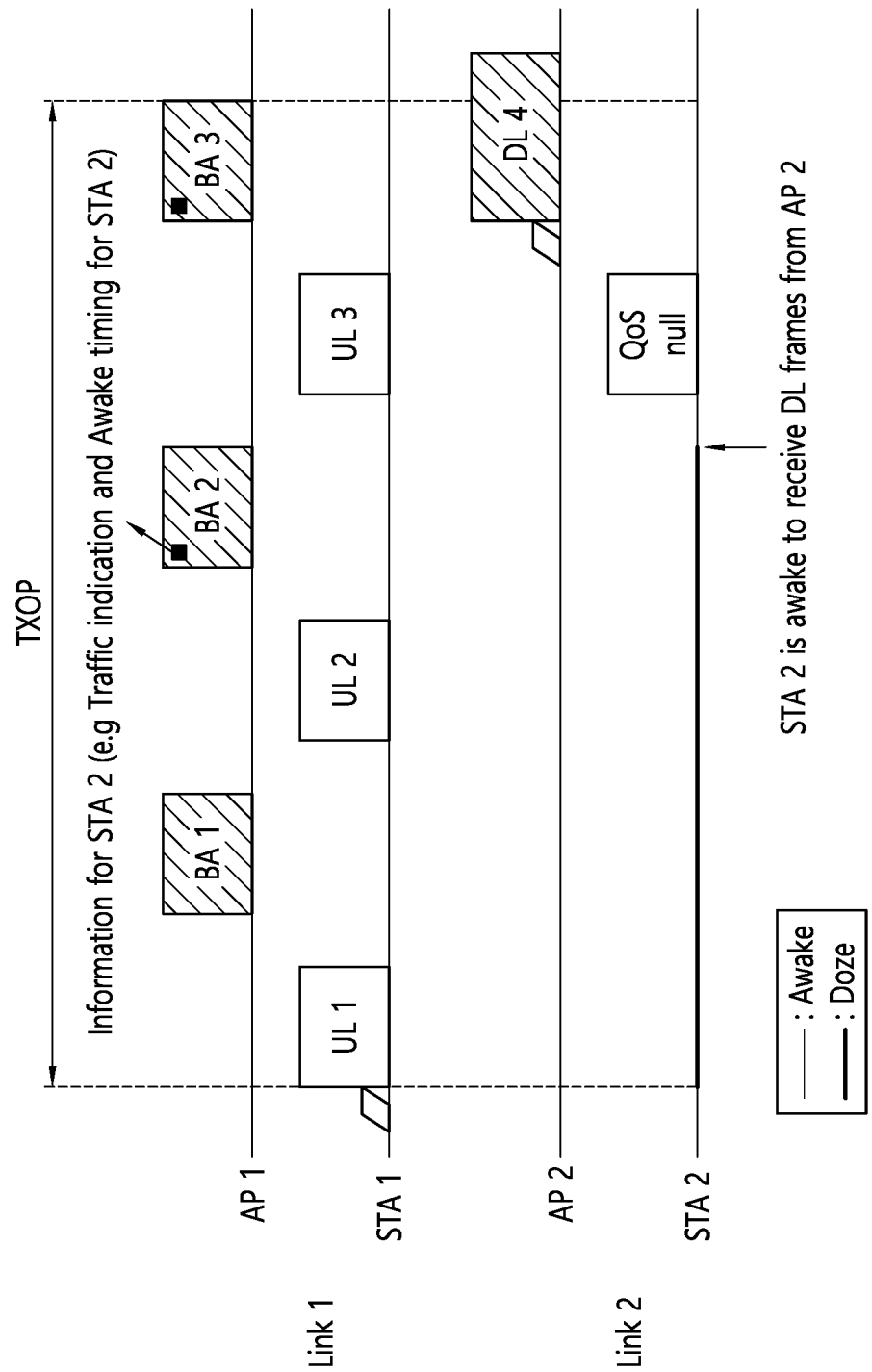
FIG. 29 is a diagram illustrating an embodiment of a method of waking STA 2 during UL TXOP.

FIG. 29 is a diagram illustrating an embodiment of a method of waking STA 2 during UL TXOP.

Referring to FIG. 29, STA 2 operates in the same manner as in FIG. 28, but after waking, transmits a QoS null frame to AP 2 as shown in FIG. 21 to notify that it has awaken. In this case, the QoS null frame or the PS-Poll frame may be transmitted during the UL TX period of STA 1 to avoid inter-link interference. Thereafter, the awake STA 2 may receive DL data from the AP 2 according to the BA reception timing of the STA 1. In this method, it is possible to inform the AP that STA 2 has awake more reliably than FIG. 20, but the awake time may be slightly increased. Alternatively, information indicating that it has awakened (for example, PS-Poll or QoS null frames, etc.) may be transmitted through a UL frame (for example, UL 3 of FIG. 21) transmitted by another STA (for example, STA 1 in FIG. 21). In this case, since there is no additional frame for notifying such information, overhead can be reduced.

The awake signaling method proposed above can be used during DL/UL TXOP to awake an STA that has entered to a doze state. However, in the case of non-AP MLD supporting non-STR capability, when STA transmits UL through one link, if the AP transmits DL through another link, a collision may occur. Therefore, the STA may receive DL data from the other link according to the timing at which the AP transmits the ACK or BA for the UL data of the STA in one link.

2-2. Doze Signaling Method for Power Saving of Non-STR Non-AP MLD

When an indication of whether buffer data for the STA of the non-AP MLD mentioned above is transmitted to the DL frame, this can also be used to switch the STA from the awake state to the doze state. This is the same as the operation of entering the doze if the STA has no data to be transmitted to it, like TIM information included in the beacon.

Figure 30:
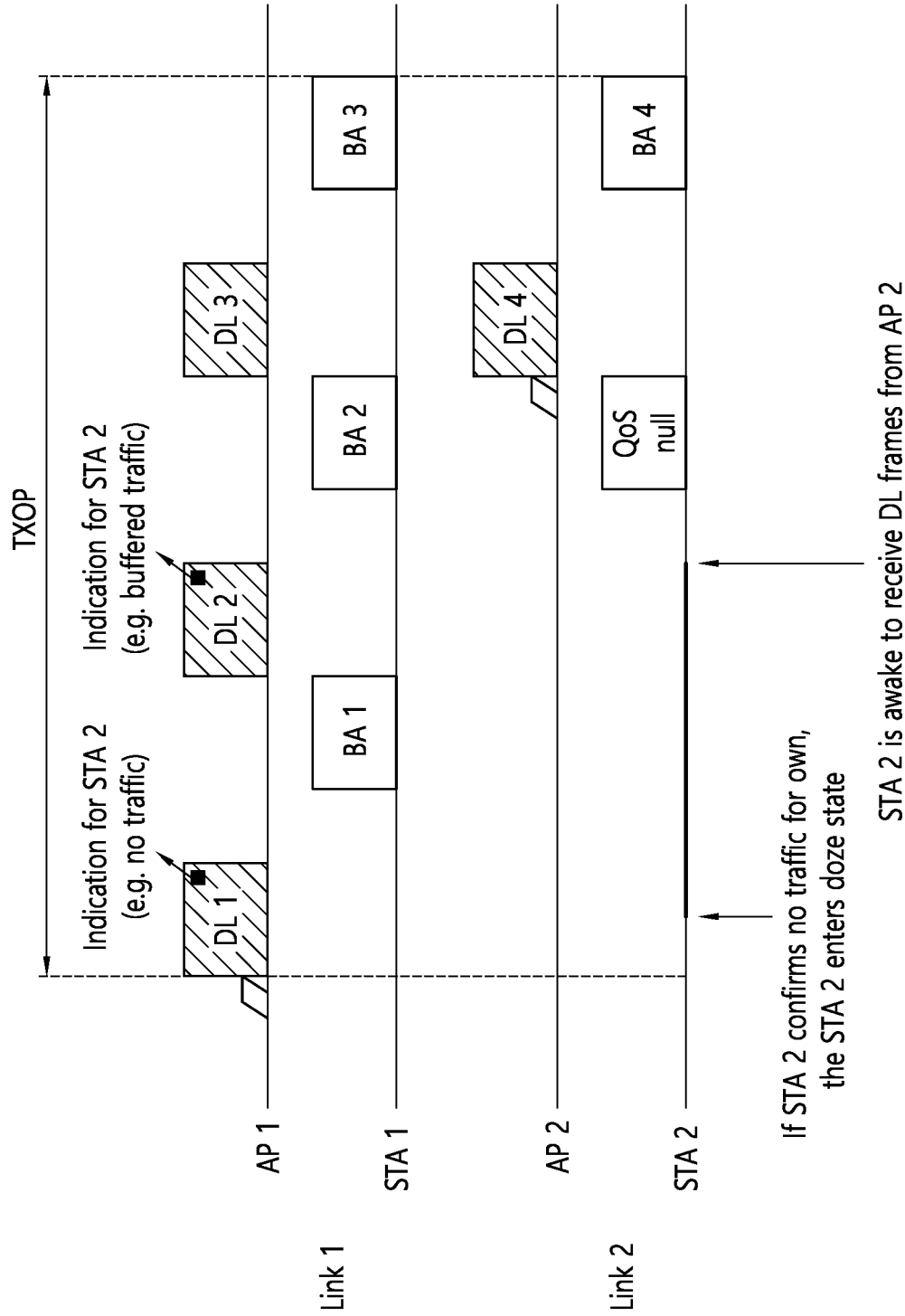
FIG. 30 is a diagram illustrating an embodiment of an indication-based non-STR PSM method.

FIG. 30 is a diagram illustrating an embodiment of an indication-based non-STR PSM method.

Referring to FIG. 30, when non-AP MLD in the awake state receives DL frame through Link 1, non-AP MLD recognizing that buffer data for STA 2 is not present in AP 2 from the indication information included in DL 1 may determine the Doze state transition for STA 2. At this time, STA 2 enters the doze state during the TXOP period acquired by AP 1. Afterward, if buffer data for STA 2 occurs in AP 2, AP 1 may indicate by including indication information for this in DL 2. Upon receiving this, STA 1 may inform STA 2 of this information to wake STA 2 in a doze state. Afterward, the awake STA 2 may transmit QoS null or PS-poll according to the BA 2 transmission timing of STA 1 in order to inform its awake state. In some cases, these QoS null or PS-Poll frames may be omitted. Alternatively, information on the awake of STA 2 may be put in BA 2 transmitted by STA 1 to inform AP 1. After recognizing that STA 2 has awakened, AP 2 may transmit a DL frame to STA 2 according to timing thereafter. In this operation, it is assumed that the MLD supports the information-sharing function.

3. Suggested Signaling Method to Support Non-STR PSM

According to one embodiment, basically, the indication (or whether there is an indication or not) for the non-STR PSM (i.e. Power-saving mechanism considering non-STR MLD) may be determined based on the presence or absence of a power management related element (for example, EHT Capability element, EHT Operation element, EHT Extended capabilities element, etc.).

According to an embodiment, the indication (or whether there is an indication or not) for the non-STR PSM (for example, power-saving mechanism considering non-STR MLD) may be explicitly indicated. Hereinafter, a field for transmitting information about non-STR PSM Support and/ or Mode may be proposed.

3.1. Field Configuration for Non-STR PSM Support & Mode

Non-STR PSM Support (or Non-STR PSM Support field): A field for indicating the capability of whether AP MLD or non-AP MLD supports non-STR PSM For example, if the value of Non-STR PSM Support is a first value (for example, 1), it may mean that the non-STR PSM mode is supported. As another example, if the value of Non-STR PSM Support is a second value (for example, 0), it may mean that the non-STR PSM mode is not supported.

Non-STR PSM Support (or Non-STR PSM Support field) may be defined as a sub-field such as 'non-STR PS Support' in the EHT MAC Capabilities information field.

Non-STR PSM mode (or Non-STR PSM mode field): The Non-STR PSM mode may include information on whether to enable the Non-STR PSM supported by it.

For example, if there is (or is assigned) a non-STR PSM mode value to the element (that is, Non-STR PSM mode), it may mean that non-STR PSM mode is supported. For example, when the value of the Non-STR PSM mode is a first value (for example, 1), it may mean that the non-STR PSM is activated and this function is operated. Conversely, when the value of the Non-STR PSM mode is a second value (for example, 0), it may mean that the current non-STR PSM function is deactivated.

According to an embodiment, the information on the non-STR PSM may be indicated semi-statically or dynamically.

For example, when the information on the non-STR PSM is indicated semi-statically, the Non-STR PSM mode (or the Non-STR PSM mode field) may be included in the EHT capability or EHT operation element.

For another example, when information on the non-STR PSM is dynamically indicated, non-STR PSM mode (or non-STR PSM mode field) may be piggybacked and included in the control frame or data frame.

Support Method-based Indication (SMBI): A field to distinguish whether to use a capability-based non-STR PSM or an indication-based non-STR PSM. For example, when non-AP MLD activates non-STR PSM, if it wants to use an indication-based non-STR PSM, this value may be configured as 1, if it wants to use a capability-based non-STR PSM, this value may be configured as 0. The setting for this value can be set during multi-link setup of AP MLD and non-AP MLD, and can be dynamically changed according to a request from non-AP MLD even after multi-setup. Information on this field may be indicated semi-statically or dynamically. In the case of semi-static, it can be included in EHT capability or EHT operation element. In the case of dynamic indication, it can be included by piggybacking in the control frame or data frame.

Simplified Option for Method-based Capability (SOMC): when non-AP MLD uses non-STR PSM based on capability, as an additional detailed option that can be selected, when there is no frame transmitted to itself when DL Frame reception of other STAs of the same non-AP MLD is detected, if the STA uses the method of directly entering doze without decoding the frame (that is, the option 2 method described in Section 1), this value may be configured to 1, if the STA decodes it (that is, the option 1 method described in section 1), this value can be configured as 0. The setting for this value can be set during multi-link setup of AP MLD and non-AP MLD, and can be dynamically changed according to a request from non-AP MLD even after multi-setup. Information on this field may be indicated semi-statically or dynamically. In the case of semi-static, it can be included in EHT capability or EHT operation element. In the case of dynamic indication, it can be included by piggybacking in the control frame or data frame. This value may be meaningful only when non-AP MLD uses indication-based non-STR PSM, otherwise, this information could be omitted.

Duration_TXOP (or Duration_TXOP field): Duration_TXOP may be a field indicating length information for maintaining the doze state, when the STA enters the doze state by non-STR PSM.

For example, Duration_TXOP may be defined as 1 bit. For example, if the value of Duration_TXOP is the first value (for example, 1), the STA may enter the doze state during the TXOP period acquired by the other AP. As another example, if the value of Duration_TXOP is the second value (for example, 0), it may enter the doze state only by the length of the DL PPDU transmitted by the other AP.

According to an embodiment, information on Duration_TXOP (or Duration_TXOP field) may be indicated semi-statically or dynamically.

For example, when the information on the Duration_TXOP is indicated semi-statically, Duration_TXOP (or Duration_TXOP field) may be included in the EHT capability or EHT operation element.

For another example, when the information on the Duration_TXOP is dynamically indicated, the Duration_TXOP (or Duration_TXOP field) may be piggybacked and included in the control frame or the data frame.

According to a later discussion, a doze period of a length other than TXOP or PPDU may be considered, and in this case, an additional bit may be required to support various combinations.

UL TX Support (or UL TX Support field): In non-STR PSM, an operation may be defined separately for a case where non-AP MLD transmits UL and receives DL.

For example, the non-AP MLD (or AP MLD) may respectively activate non-STR PSM operation upon UL transmission of non-AP MLD and non-STR PSM operation upon DL reception of non-AP MLD as needed. When non-AP MLD operates as non-STR PSM, during UL transmission, if non-AP MLD wants to operate as non-STR PSM, the value of UL TX Support may be set to a first value (for example, 1). When the value of UL TX Support is the second value (for example, 0), during UL transmission, it may mean that the non-AP MLD does not operate as a non-STR PSM.

According to an embodiment, the information on the UL TX Support may be indicated semi-statically or dynamically.

For example, when the UL TX Support information is indicated semi-statically, UL TX Support (or UL TX Support field) may be included in the EHT capability or EHT operation element.

For another example, when the information on the UL TX Support is dynamically indicated, the UL TX Support (or the UL TX Support field) may be piggybacked and included in a control frame or a data frame.

DL RX Support (or, DL RX Support field): In non-STR PSM, an operation may be defined separately for a case where non-AP MLD transmits UL and receives DL.

For example, the non-AP MLD (or AP MLD) may respectively activate non-STR PSM operation during UL transmission of non-AP MLD and non-STR PSM operation upon DL reception of non-AP MLD as needed. When non-AP MLD operates as non-STR PSM, upon receiving DL, if non-AP MLD wants to operate as non-STR PSM, the value of DL RX Support may be set to a first value (for example, 1). When the value of DL RX Support is the second value (for example, 0), when receiving DL, it may mean that the non-AP MLD does not operate as a non-STR PSM.

According to an embodiment, the information on the DL RX Support may be indicated semi-statically or dynamically.

For example, when the DL RX Support information is indicated semi-statically, DL RX Support (or DL RX Support field) may be included in the EHT capability or EHT operation element.

For another example, when the information on the DL RX Support is dynamically indicated, the DL RX Support (or the DL RX Support field) may be piggybacked and included in a control frame or a data frame.

UL TX/DL RX Support (or UL TX/DL RX Support field): For non-STR PSM, if non-AP MLD wants to operate as non-STR PSM when UL transmission and DL reception are performed, a value of UL TX/DL RX Support (or UL TX/DL RX Support field) may be set to a first value (for example, 1). If the value of TX/DL RX Support is the second value (for example, 0), it may mean that the operation is not simultaneously activated, when transmitting UL and receiving DL.

According to an embodiment, the TX/DL RX Support (or UL TX/DL RX Support field) may be defined together with the above-described UL TX Support and DL RX Support fields.

According to an embodiment, the TX/DL RX Support (or UL TX/DL RX Support field) may be defined as a separate additional field different from the above-described UL TX Support and DL RX Support fields.

According to an embodiment, when the information to be transmitted in the UL TX Support and DL RX Support fields is sufficient, TX/DL RX Support may be omitted.

According to an embodiment, the information on the TX/DL RX Support may be indicated semi-statically or dynamically.

For example, when the information on the TX/DL RX Support is indicated semi-statically, TX/DL RX Support (or TX/DL RX Support field) may be included in the EHT capability or EHT operation element.

As another example, when the information on the TX/DL RX Support is dynamically indicated, the TX/DL RX Support (or the TX/DL RX Support field) may be piggybacked and included in the control frame or data frame.

In this case, if the aforementioned capability information (for example, capability information on non-STR PSM) is applied to all STAs of non-AP MLD, the aforementioned capability information may be indicated through the aforementioned information/field.

According to an embodiment, the non-AP MLD (or AP MLD) may independently activate the non-STR PSM only for some STAs. For example, the non-AP MLD (or AP MLD) may indicate capability for each STA by using a Link Identifier or STA Identifier described below. Ho However, if the frame does not include Link Identifier or STA identifier information, it may mean activating or deactivating the non-STR PSM for all STAs in the non-AP MLD.

Hereinafter, information or a field for indicating capability regarding non-STR PSM for each STA may be described.

Link Identifier: An identifier that can distinguish each Link. According to an embodiment, the non-AP MLD (for example, STA) may newly define an identifier for each Link. According to an embodiment, the non-AP MLD (for example, STA) may use an existing BSSID, BSS Color, and the like and use it as an identifier. According to an embodiment, the non-AP MLD (for example, STA) may use channel information on a Link and use it as an identifier.

For example, the new link ID is '0, 1, . . . ' can be set/defined. In other words, the new link ID may be set/defined as an integer of 0 or more.

For example, channel indication information used in an HT/VHT/HE operation element may be used as channel information. As another example, the channel information may be newly defined in the EHT standard. For example, the link channel information may be expressed as a primary channel number, center frequency, channel width, and the like.

For example, three links may be configured. Each link ID may be set to 0, 1, or 2. As an example, information on Non-STR PSM capability for each link may be transmitted such as [Non-STR PSM capability=1, Link ID=0, 1].

According to an embodiment, a link for configuring a non-STR PSM may be indicated/transmitted through a bitmap. For example, a link for which a non-STR PSM is to be configured may be set/indicated as 1 in the bitmap. Links on which non-STR PSM will not be set may be set/indicated as 0 in the bitmap. According to an embodiment, whether non-STR PSM is configured may be indicated by a separate field for each link. If the field is omitted, it may mean that it is configured for all links of non-AP MLD.

STA Identifier: An identifier that can distinguish each STA. According to an embodiment, the non-AP MLD (for example, STA) may newly define an identifier for each STA. According to an embodiment, the non-AP MLD (for example, STA) may use STA ID field information included in the existing MAC Header and use it as an identifier.

For example, the new STA ID is '0, 1, . . . ' can be set/defined. In other words, the new STA ID may be set/defined as an integer of 0 or more.

For example, the non-AP MLD may include three STAs. Each STA ID may be set to 0, 1, or 2. As an example, information on Non-STR PSM capability for each STA may be transmitted such as [Non-STR PSM capability=1, STA ID=1, 2].

According to an embodiment, the STA that will configure the non-STR PSM may be indicated/transmitted through a bitmap. For example, the STA that will configure the non-STR PSM may be set/indicated as 1 in the bitmap. An STA that will not configure the non-STR PSM may be set/indicated as 0 in the bitmap. According to an embodiment, whether non-STR PSM is configured may be indicated by a separate field for each STA. If the field is omitted, it may mean that it is configured for all STAs (or all links) of the non-AP MLD.

According to an embodiment, the inter-link STR capability of the non-AP MLD may be changed according to a channel or a link environment. Therefore, the non-AP MLD can help the operation of the AP associated with the STR capability by notifying the AP of this information. That is, in order to inform the AP of this, a field indicating whether the current STR capability is present is required. A field indicating whether STR capability is present may be set as follows.

STR capability (or STR capability field): The STR capability may indicate whether the current non-AP MLD supports the STR capability. In other words, the STR capability may include information on whether the current non-AP MLD supports the STR capability. When the value of the STR capability is the first value (for example, 1), it may mean that the operation is based on the STR capability. When the value of the STR capability is a second value (for example, 0), it may mean that the operation is based on a non-STR capability that does not support the STR capability. That is, in this case, MLD may have a constraint on simultaneous TX/RX.

3.2 Non-STR PSM Mode Control Method

According to an embodiment, each AP/STA may have a non-STR PSM Control field (for example, non-STR PSM mode field) or element for activating the non-STR PSM. For example, if the value of the element is 1, it means that the non-STR PSM mode is activated, when the value of the element is 0, it may mean that the non-STR PSM mode is deactivated.

For example, the PSM Control field or the element may be piggybacked and included in a management frame (for example, Association Request/Probe request/Beacon/Association response/Probe response, etc.). For example, the PSM Control field or the element may be transmitted in an action frame (for example, Non-STR PSM announcement frame, etc.) or a new control/data field.

When the information included in the PSM Control field or the element is piggybacked and transmitted, the information included in the PSM control field or the element may be included in the data or QoS null frame and may be transmitted using the QoS control field or the HT control field.

Additionally, the PSM Control field or the element may also be transmitted in a separate control frame or an extended control frame (for example, Non-STR PSM announcement frame, etc.).

Additionally, the PSM Control field or the element may include the above-described Link identifier or STA identifier. Based on the PSM Control field or the element, the non-AP MLD (or AP MLD) may independently activate or deactivate the power saving operation for each STA (that is, Link) of the non-AP MLD.

If Link Identifier (or Link identifier field) or STA identifier (or STA identifier field) is not included in the PSM Control field or the element, it may mean activating or deactivating the Non-STR PSM for all STAs in the non-AP MLD.

According to an embodiment, the non-STR PSM may be controlled semi-statically or dynamically.

For example, when the non-STR PSM is semi-statically controlled, whether to activate the non-STR PSM mode may be determined in a link set-up process. At this time, the determined non-STR PSM may be fixedly used. The (re) association may be required to change whether non-STR PSM is activated.

For another example, when the non-STR PSM mode is dynamically controlled, whether an STA is activated can be controlled whenever an STA is needed without a separate (re)association.

If the STR capability of non-AP MLD is determined in TXOP units (or if it is determined by channel access unit), in order to inform the AP of this information, an STR capability field may be added to the PSM control field.

For example, when the non-AP MLD deactivates the non-STR PSM because STR capability information is changed, its current STR capability information may be transmitted together with other information included in the PSM control field. Accordingly, the AP MLD (for example, AP) may support the operation of the non-AP MLD according to the STR capability based on the STR capability field (or STR capability information).

As another example, even when the non-AP MLD is changed to non-STR capability, this information may be transmitted to the AP. The AP MLD (for example, AP) may support the operation of the non-AP MLD according to the non-STR capability based on the information.

In other words, the PSM control field may further include an STR capability field. The STR capability field may include STR capability information. The STR capability information may include information on whether STR is supported. The non-AP MLD may transmit an STR capability field (or STR capability information) to the AP MLD. Accordingly, the AP MLD may identify information on whether the non-AP MLD currently supports STR.

FIG. 31 shows an example of a PSM control field.

Referring to FIG. 31, the PSM control field may be configured to control a non-STR PSM. The PSM control field may include the above-described field or element. For example, the PSM control field may include non-STR PSM mode, SMBI, SOMC, Duration TXOP, UL TX/DL RX support, UL TX support, DL RX support, and/or STR capability.

For example, the non-AP MLD (for example, STA) may use the PSM control field to control the non-STR PSM mode.

The PSM control field may be piggybacked in a transmission frame (for example, a management frame, data frame, QoS null frame, etc.) and transmitted or may be included in a separate frame (for example, control frame) and transmitted.

According to an embodiment, when the non-STR PSM mode is semi-statically controlled, information on the PSM control field may be exchanged in a multi-link setup process (for example, (re)association process).

According to an embodiment, when the non-STR PSM mode is dynamically controlled, information on the PSM control field can be exchanged at any time in the frame exchange process. A field (or information) included in the PSM control field may be omitted depending on circumstances.

According to an embodiment, the non-AP MLD (or AP MLD) may perform various settings for a non-STR PSM operation based on the above-described PSM control field.

For example, the non-AP MLD may configure a frame or a control field (for example, a PSM control field) within the frame to control the non-STR PSM mode. For example, in the example of the PSM control field described above, Non-STR PSM mode=1, SMBI=0, SOMC=1, Duration TXOP=1, ULTX/DL RX Support=0, UL TX Support=1, DL RX Support=0 can be set. In other words, the value of the non-STR PSM mode may be set to 1, the SMBI value may be set to 0, the SOMC value may be set to 1, the value of the Duration TXOP may be set to 1, and the UL TX/DL RX support A value may be set to 0, a value of UL TX support may be set to 1, and a value of DL RX support may be set to 0. The non-AP MLD may transmit the configured PSM control field to the AP MLD. At this time, when the non-AP MLD activates the non-STR PSM mode, the STR capability of the PSM control field may be omitted.

Non-STR PSM may be activated through the PSM control field set as described above. In addition, through the PSM control field set as described above, a capability-based non-STR PSM scheme may be used to further reduce power consumption. Among the two options, when some STAs of non-AP MLD receive a DL frame, the STA of the same non-AP MLD may operate in a simplified method scheme, which is option 2, which directly enters doze when there is no frame detected by the STA without separate frame decoding.

Also, the doze entry period of the STA may be set during TXOP. In addition, in the non-STR PSM operation, the STA may operate in the non-STR PSM only when UL TX. In other words, when the STA is DL RX, it does not operate as a non-STR PSM.

As another example, the non-AP MLD may set the PSM control field to Non-STR PSM mode=0, STR capability=1 and transmit it. The non-AP MLD may want to deactivate the non-STR PSM and, at the same time, inform the AP MLD that the link capability of the current non-AP MLD is the STR capability. The various information presented in FIG. 31 may be transmitted by omitting some subfields according to circumstances, and may be transmitted in various combinations as needed.

According to an embodiment, in the case of non-AP MLD supporting multi-link, non-STR PSM operation may be controlled only for some links. In this case, if the non-AP MLD transmits the link identifier to be controlled together, the control contents can be applied only to the included link identifier. For example, a link identifier for identifying a link is one bitmap, and each bit may represent an STA of each non-AP MLD. As another example, the link identifier may be represented by a different field for each link.

Figure 32:
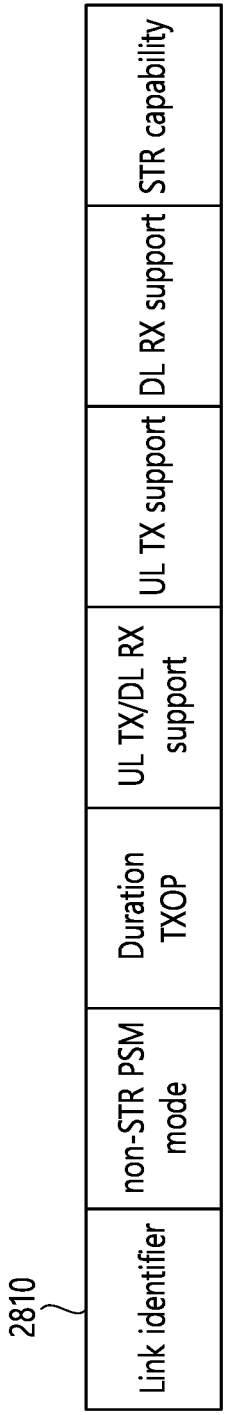
FIG. 32 shows another example of a PSM control field.

FIG. 32 shows another example of a PSM control field.

Referring to FIG. 32, the PSM control field 2800 may further include a link identifier 2810 in addition to the PSM control field shown in FIG. 31.

For example, the link identifier 2810 may be configured as a bitmap. Link identifier 2810 may be configured to correspond to the number of links. When the number of links is 3, the Link identifier 2810 may consist of 3 bits. Each bit may correspond to one link. In other words, the first link may be related/corresponding to the first bit of the Link identifier 2810. The second link may be related/corresponding to the second bit of the Link identifier 2810. The third link may be related/corresponding to the third bit of the Link identifier 2810.

When it is desired to control the operation of only some links rather than all links of the non-AP MLD, a link to be applied may be indicated as a link identifier 2810. When this is expressed in a bitmap, the link identifier 2810 is a bit value indicated for each link, such as [1, 1, 0], and whether or not the operation is set can be controlled. For example, the non-STR PSM may be controlled for the first link and the second link based on the PSM control field 2800, and may not be applied to the third link.

According to the above-described embodiment, the link having the non-STR capability may be changed based on the capability of the non-AP MLD. Therefore, by using the link identifier according to the changing situation, the non-AP MLD can change the configuration related to the non-STR PSM.

3.3. Signaling Procedure of Non-STR PSM (Signaling Procedure)

The non-AP MLD and the AP MLD may exchange information related to the non-STR PSM based on the frame exchange and set specific operations of the non-STR PSM.

Hereinafter, a specific embodiment of the signaling process of the non-STR PSM may be described.

The non-STR PSM Capability field described below may mean a non-STR PSM Support field. In addition, the non-STR Control field described below may mean a non-STR PSM mode field. However, this is for the convenience of the description, and it is not limited to the fields described above.

Hereinafter, an example of a signaling procedure for non-STR PSM between AP MLD 1 and non-AP MLD 1 may be described. AP MLD 1 may include AP 1 on link 1 and AP 2 on link 2. Non-AP MLD 1 may include STA 1 on link 1 and STA 2 on link 2. AP 1 and STA 1 may operate in link 1. AP 2 and STA 2 may operate in link 2. In other words, AP 1 and STA 1 may be connected through link 1. AP 2 and STA 2 may be connected through link 2.

Figure 33:
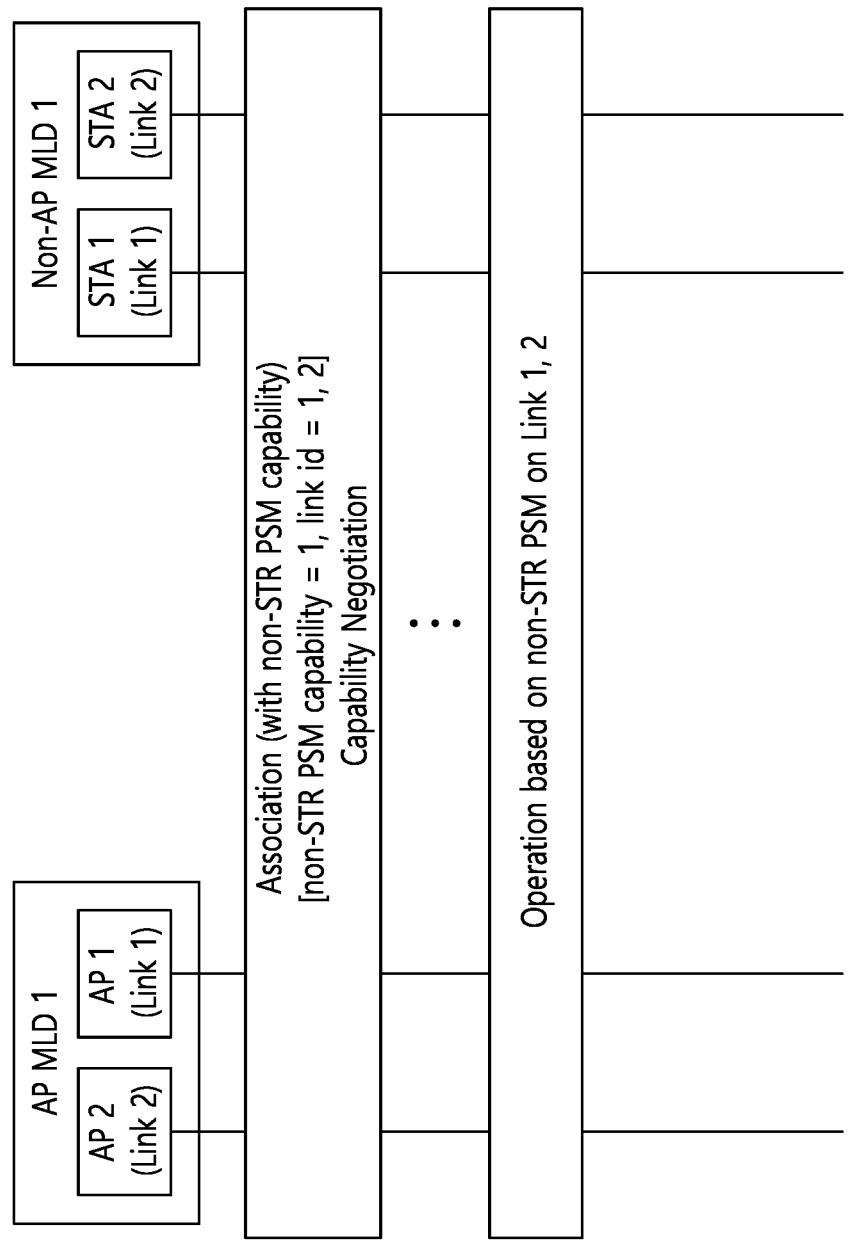
FIG. 33 shows an example of a signaling procedure for a non-STR PSM.

FIG. 33 shows an example of a signaling procedure for a non-STR PSM.

Referring to FIG. 33, AP MLD 1 and non-AP MLD 1 may perform signaling for non-STR PSM in a link setup process. That is, AP MLD 1 and non-AP MLD 1 may indicate whether to support non-STR PSM through capability negotiation in the link setup process. In other words, AP MLD 1 and non-AP MLD 1 may exchange information on whether to support non-STR PSM through capability negotiation of a link setup process.

According to one embodiment, during the link setup process, the non-AP MLD 1 may instruct the non-STR PSM-related configuration only to STAs supporting the non-STR PSM function among its multiple STAs by using the Request frame (for example, association request, and the like), and inform the AP MLD 1.

Thereafter, Non-AP MLD 1 and AP MLD 1 may perform a capability negotiation process through frame exchange. For example, non-AP MLD 1 may set the value of non-STR PSM support for activating non-STR PSM capability to 1. In addition, non-AP MLD 1 may set a Link id value as identifier information of STAs to be activated. The non-AP MLD 1 may transmit the non-STR PSM support and link ID configured as described above to the AP MLD 1 by including the link ID in the association request.

FIG. 33 shows an example in which link ID values 1 and 2 are included. That is, it may be an example in which non-STR PSM is supported in both link 1 and link 2.

Upon receiving this, AP MLD 1 may check information about it. AP MLD 1 may perform the negotiation process by responding to the association request (for example, association response) to the non-AP MLD 1.

As described above, STAs (for example, STA 1 and STA 2 in FIG. 33) agreed with AP MLD 1 (for example, AP 1 or AP 2) may then operate based on the non-STR PSM. Also, AP MLD 1 may operate as a non-STR PSM for non-AP MLD 1 in which non-STR PSM Support is set to 1.

For example, AP MLD 1 may know whether non-STR PSM of non-AP MLD 1 is supported through capability negotiation. AP MLD 1 may buffer the BU without transmitting it until the STA that entered doze by non-STR PSM operation wakes up, for STAs operating as non-STR PSM. In this case, if only the Link 1 identifier is included in the Link ID field of the Request frame, the non-STR PSM function may be activated only in STA 1. In other words, the non-AP MLD 1 may include only the Link 1 identifier in the Link ID field of the Request frame and transmit it, in order to activate the non-STR PSM function only in STA 1.

Figure 34:
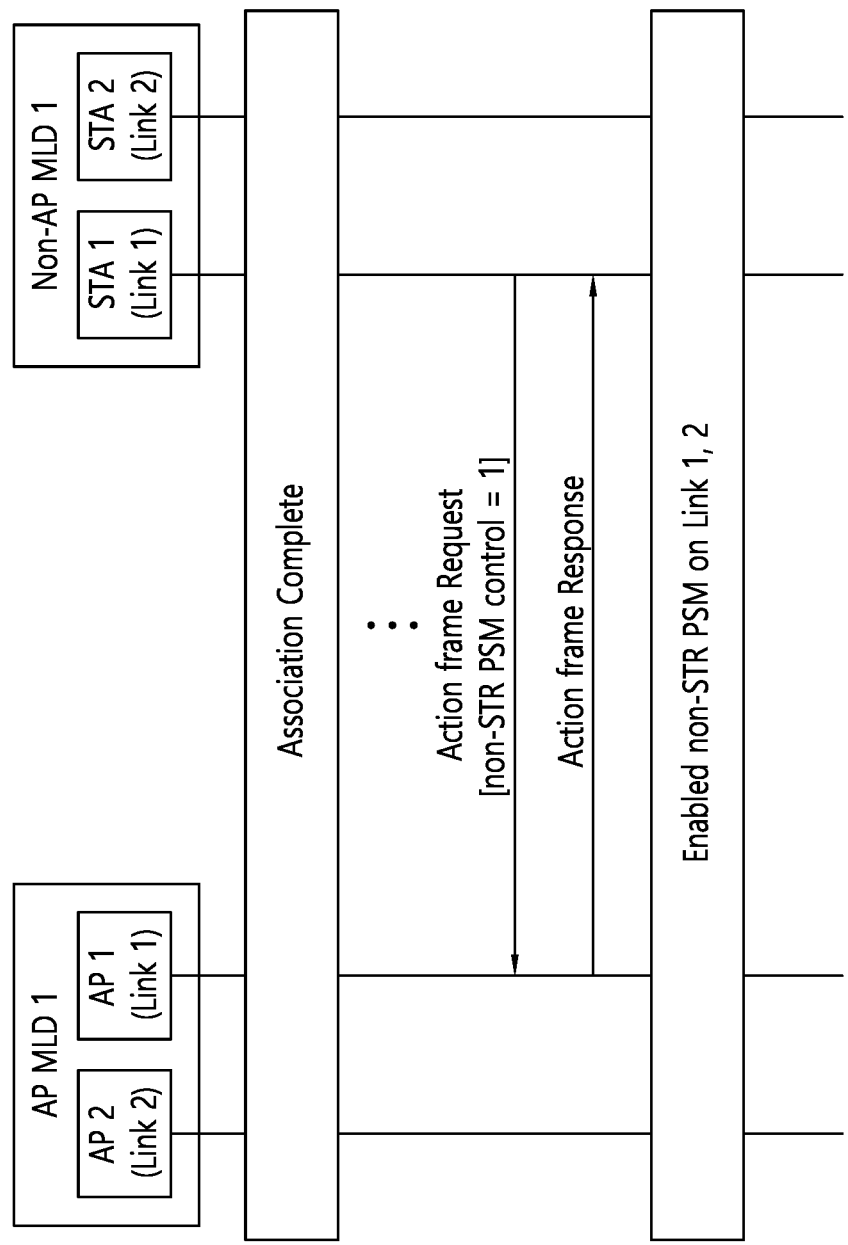
FIG. 34 shows another example of a signaling procedure for a non-STR PSM.

FIG. 34 shows another example of a signaling procedure for a non-STR PSM.

Referring to FIG. 34, AP MLD 1 and non-AP MLD 1 may perform signaling for non-STR PSM after a link setup process. That is, AP MLD 1 and non-AP MLD 1 may indicate whether non-STR PSM is supported after the link setup process. In other words, AP MLD 1 and non-AP MLD 1 may exchange information on whether to support non-STR PSM through capability negotiation after the link setup process.

For example, after the link setup process, STA 1 may indicate the non-STR PSM function by including the non-STR PSM mode field in the request frame (transmission frame (for example, a management frame, data frame, or QoS null frame, etc.) or separate frame (for example, control frame)).

Even after link setup, the non-AP MLD 1 (for example, STA 1) may instruct the AP MLD 1 on various non-STR PSM-related operations along with whether to activate or deactivate the non-STR PSM function, according to the situation by using the Control field.

In addition, non-AP MLD 1 (for example, STA 1) may indicate whether the non-STR PSM function is activated for each STA independently by including link or STA identifier information to be activated in the Link identifier or STA identifier field.

For example, when STA 1 wants to activate non-STR PSM for all STAs in non-AP MLD 1, STA 1 may transmit to AP 1 a Request frame (Action frame or Action frame request) including only non-STR PSM control field/information without Link identifier or STA identifier information.

At this time, when the non-AP MLD 1 receives the Response frame for the grant, STA 1 and STA 2 may activate the non-STR PSM function based on the Link identifier or STA identifier information included in the Response frame (or the request frame).

According to an embodiment, when link identifier information is not included in the request frame or response frame, this may mean that non-STR PSM activation is configured for all links (or all STAs) of non-AP MLD 1.

According to an embodiment, when the STA wants to reduce power consumption by entering a low power mode, the non-AP MLD 1 (for example, STA 1) may request the AP MLD 1 (for example, AP 1) to activate the non-STR PSM function as shown in FIG. 30.

According to one embodiment, unlike shown in FIG. 30, the non-AP MLD 1 (for example, STA 1) may request the non-STR PSM function deactivation from the AP MLD 1 (for example, AP 1). For example, the capability of STA 1 may be changed from non-STR capability to STR capability. Therefore, in cases such as when the non-STR PSM function is no longer required, the non-AP MLD 1 (for example, STA 1) may request the non-STR PSM function deactivation from the AP MLD 1 (for example, AP 1). The above-described embodiment may be specifically described with reference to FIG. 31.

Figure 35:
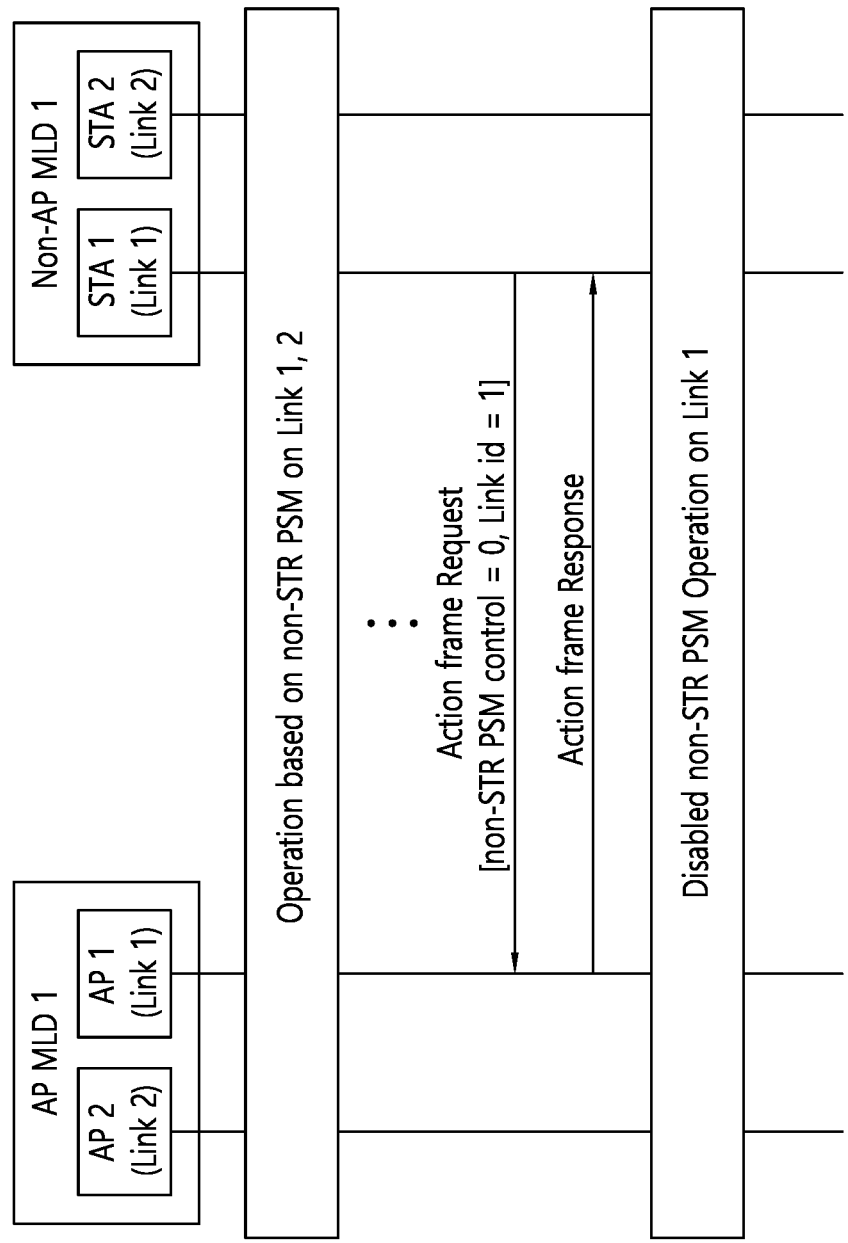
FIG. 35 shows another example of a signaling procedure for a non-STR PSM.

FIG. 35 shows another example of a signaling procedure for a non-STR PSM.

Referring to FIG. 35, AP MLD 1 and non-AP MLD 1 may perform signaling for non-STR PSM after a link setup process.

For example, after the link setup process, STA 1 may deactivate the non-STR PSM function by including the non-STR PSM mode field in the request frame (Transmission frame (for example, management frame, data frame, or QoS null frame, and the like) or separate frame (for example, control frame)).

When STA 1 independently wants to deactivate the non-STR PSM only for its STA, STA 1 may transmit to AP 1 a request frame including only its own identifier information and non-STR PSM control field information in link identifier or STA identifier information. A value of non-STR PSM control field information may be set to 0.

After receiving the Request frame, AP 1 may respond with a Response frame after checking the information included in the Request frame. At this time, when non-AP MLD 1 receives a response frame for approval, the non-AP MLD 1 may deactivate the non-STR PSM function of STA 1 based on the Link identifier or STA identifier information included in the Response frame (or request frame). When there is no link identification information in the Response frame (or the request frame), non-AP MLD 1 may deactivate non-STR PSM for all non-AP MLD links.

Figure 36:
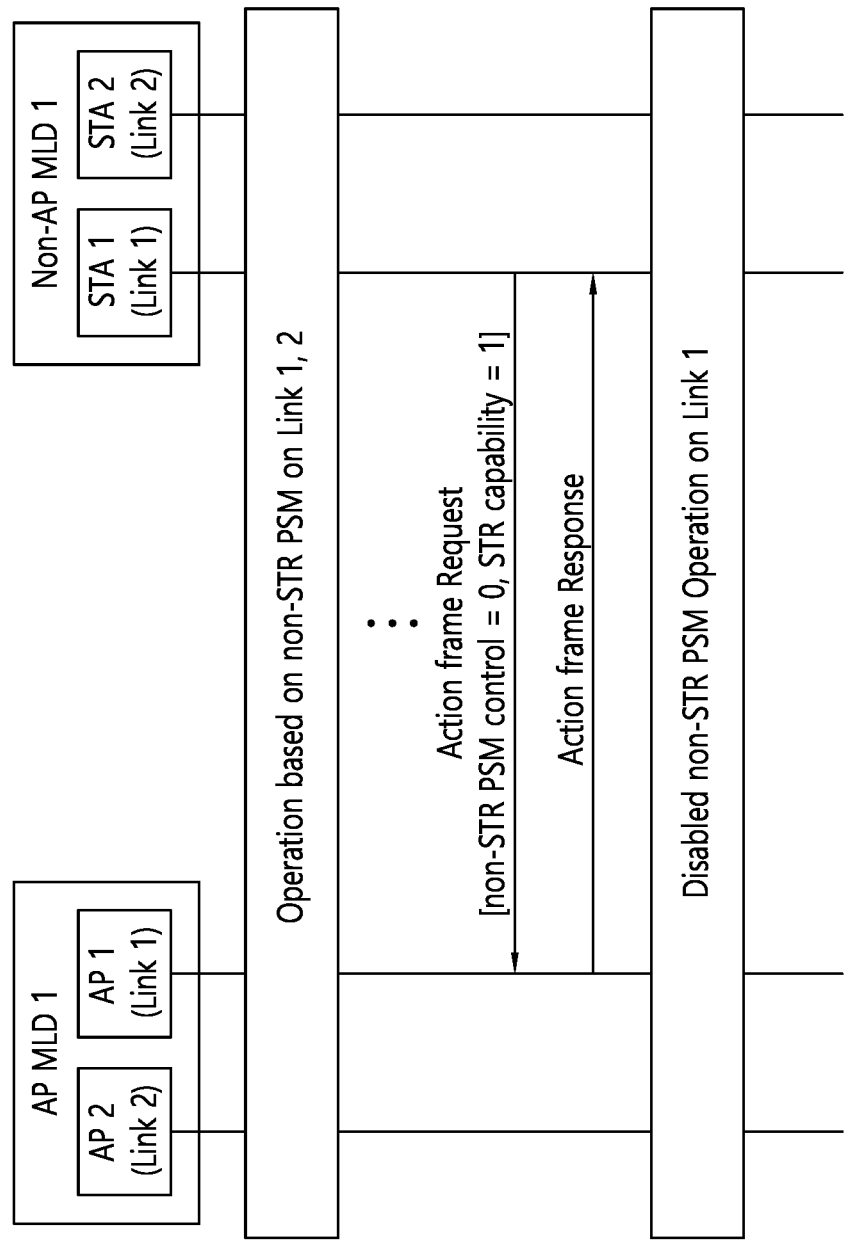
FIG. 36 shows another example of a signaling procedure for a non-STR PSM.

FIG. 36 shows another example of a signaling procedure for a non-STR PSM.

Referring to FIG. 36, AP MLD 1 and non-AP MLD 1 may indicate non-STR PSM deactivation based on a control field. In addition, the control field may include STR capability information.

When the STR capability of the non-AP MLD is determined in units of TXOPs (or when determined for each STR capability Channel access), the non-AP MLD may inform the AP MLD (for example, AP 1) of this information along with whether the non-STR PSM is activated.

For example, it is assumed that the existing non-AP MLD 1 does not support the STR capability and operates based on the non-STR PSM. In this case, based on the link environment change of the non-AP MLD 1, the non-AP MLD 1 may support STR capability. The non-AP MLD 1 may transmit information about the STR capability to the AP MLD 1 together with a request to deactivate the currently operating non-STR PSM.

Non-AP MLD 1 (for example, STA 1) sets the non-STR PSM Control field to 0 in the Request frame (or action frame request), after configuring the STR capability field to 1, it can transmit the Request frame. In other words, non-AP MLD 1 may set the non-STR PSM Control field to 0 in order to deactivate the non-STR PSM. In addition, non-AP MLD 1 may set the STR capability field to 1 to indicate that the current state of the non-AP MLD is a state supporting STR capability.

The non-AP MLD 1 may know that the current state of the non-AP MLD 1 supports the STR capability based on the Request frame. If the non-AP MLD 1 accepts the request, the non-AP MLD 1 may deactivate the non-STR PSM operation. In addition, since the non-AP MLD 1 now supports the STR capability, the AP MLD 1 may indicate the subsequent operation according to the support of the STR capability.

The above-described embodiment can be equally applied to the opposite case, where the STR capability of the non-AP MLD is changed to the non-STR capability to activate the non-STR PSM.

Figure 37:
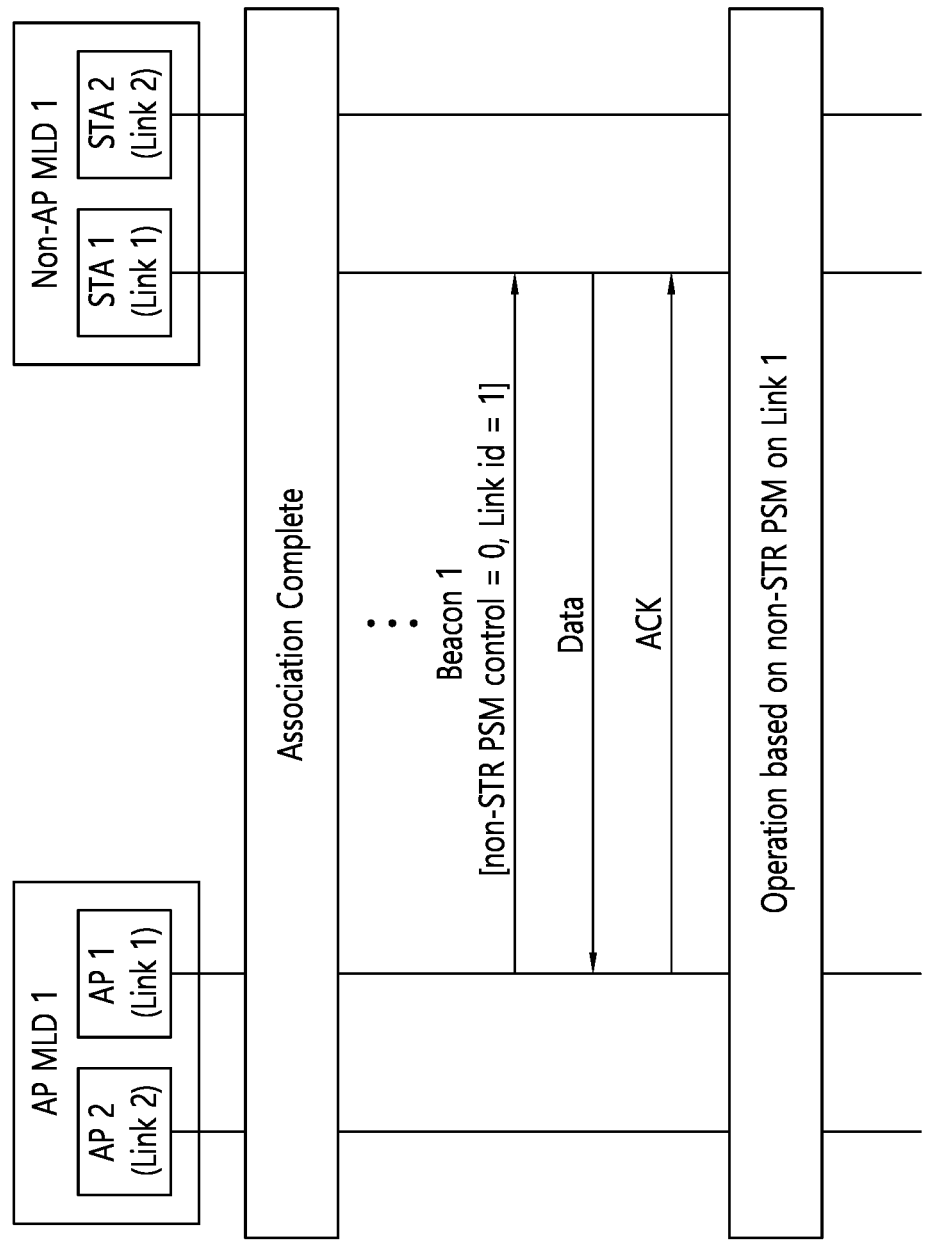
FIG. 37 shows another example of a signaling procedure for a non-STR PSM.

FIG. 37 shows another example of a signaling procedure for a non-STR PSM.

Referring to FIG. 37, AP MLD 1 (or non-AP MLD 1) may indicate whether to activate the non-STR PSM based on a beacon frame (for example, beacon 1) after the link setup process.

The example shown in FIG. 37 shows an example in which non-STR PSM activation is indicated based on the beacon frame, but is not limited thereto. According to an embodiment, it may be applied not only to the beacon frame, but also to various management frames or action frames including the aforementioned control field.

For example, AP MLD 1 may indicate whether to activate the non-STR PSM based on the non-STR PSM mode field. In addition, AP MLD 1 may independently activate the non-STR PSM function for each STA by including link identifier or STA identifier information to be activated in the link identifier or STA identifier field.

As an example, AP 1 may indicate whether to activate the non-STR PSM for a link connected to the non-AP MLD 1 through one beacon using the characteristics of the MLD. That is, by setting the value of the non-STR PSM mode field to 1, it is possible to indicate whether to activate the non-STR PSM for the corresponding link.

The embodiment of FIG. 37 is an embodiment in which AP 1 activates the non-STR PSM only in link 1. After the frame exchange is completed based on the above-described embodiment, only Link 1 (that is, STA 1) may operate based on the non-STR PSM.

Figure 38:
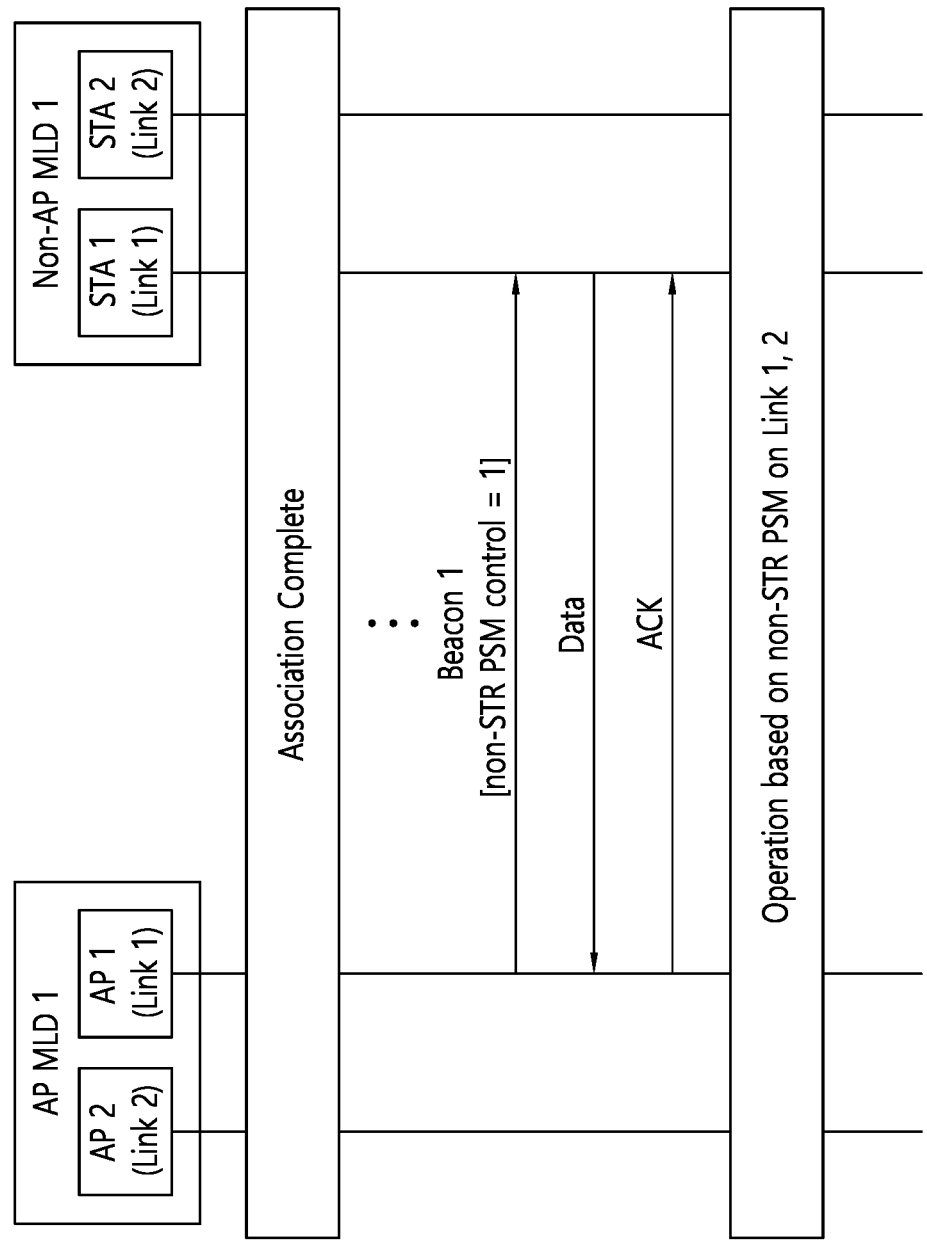
FIG. 38 shows another example of a signaling procedure for a non-STR PSM.

FIG. 38 shows another example of a signaling procedure for a non-STR PSM.

Referring to FIG. 38, AP MLD 1 (or non-AP MLD 1) may indicate whether to activate the non-STR PSM based on the beacon frame (for example, beacon 1) after the link setup process (or association process).

AP MLD 1 may indicate whether non-STR PSM is activated by indicating whether non-STR PSM is activated in the non-STR PSM mode field. Unlike the embodiment of FIG. 37, Link identifier field information may not be included in the Beacon frame transmitted by AP MLD 1.

When non-STR PSM activation is indicated by including only non-STR PSM mode field information without a Link identifier field in the Beacon frame, whether to activate non-STR PSM may be indicated to all STAs in non-AP MLD 1 (for example, STAs 1 and 2). After the frame exchange is completed based on the above-described embodiment, both Link 1 and Link 2 may operate based on non-STR PSM.

Figure 39:
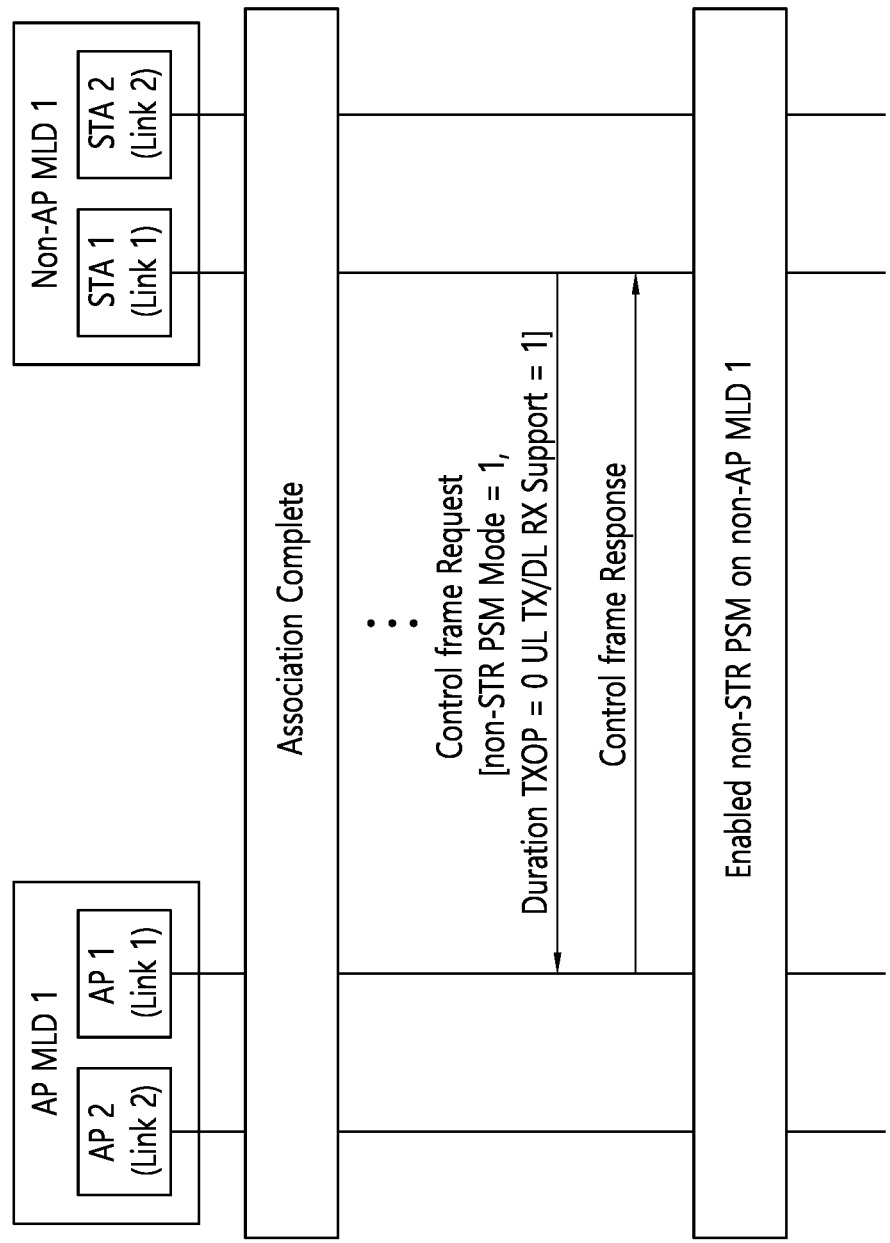
FIG. 39 shows another example of a signaling procedure for a non-STR PSM.

FIG. 39 shows another example of a signaling procedure for a non-STR PSM.

Referring to FIG. 39, the non-AP MLD 1 may dynamically change whether to activate its non-STR PSM mode and other settings based on a separate control frame.

Non-AP MLD 1 (for example, STA 1) may activate non-STR PSM. Specifically, non-AP MLD 1 may enter the doze during the PPDU Duration period during non-STR PSM operation to activate non-STR PSM for both UL TX and DL RX. Upon receiving the acknowledgment response frame from AP MLD 1, non-AP MLD 1 may operate according to its requested mechanism operation (non-STR PSM activation). If the non-AP MLD 1 receives a rejection response message, it may operate as an existing operation.

Figure 40:
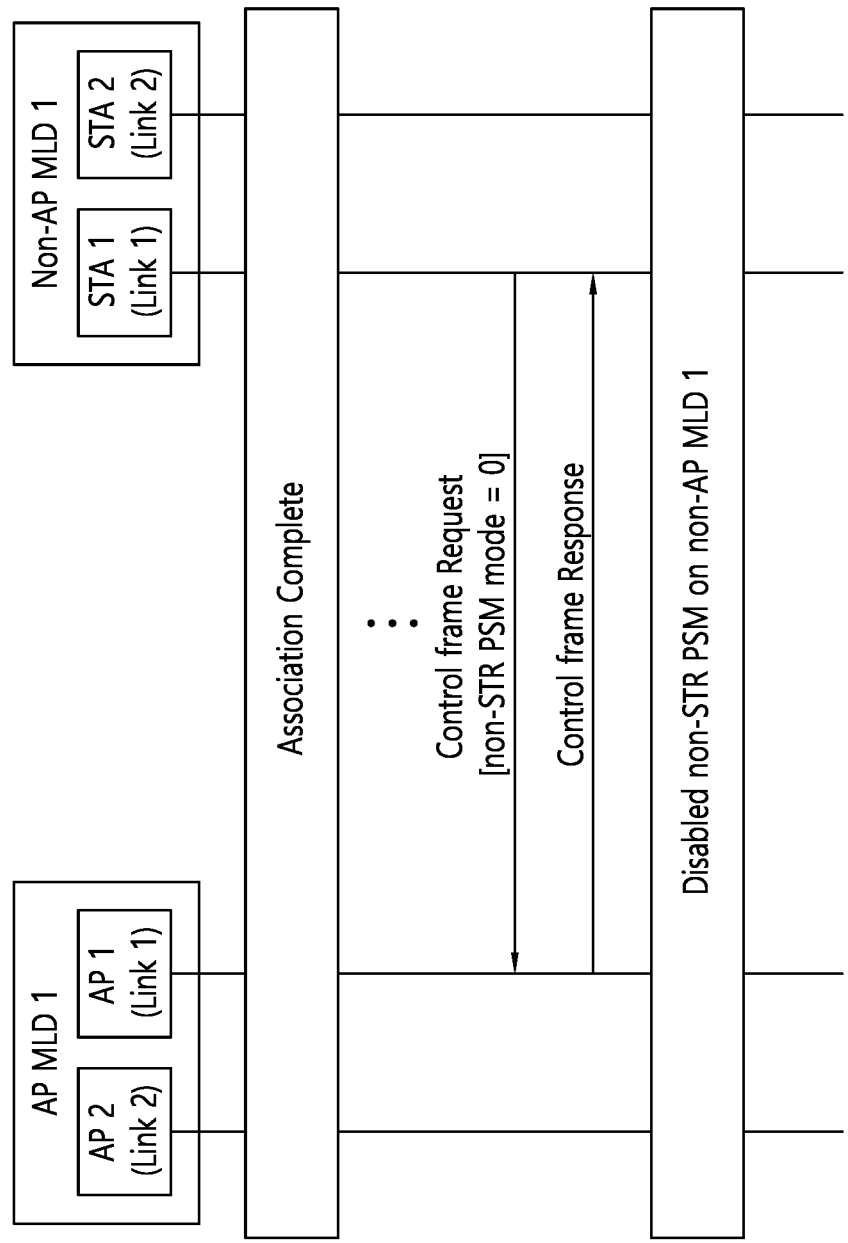
FIG. 40 shows another example of a signaling procedure for a non-STR PSM.

FIG. 40 shows another example of a signaling procedure for a non-STR PSM.

Referring to FIG. 40, the non-AP MLD 1 may dynamically change whether to activate its non-STR PSM mode and other settings based on a separate control frame.

The non-AP MLD 1 (for example, STA 1) may deactivate the non-STR PSM. Specifically, the non-AP MLD 1 receiving the grant response frame from the AP MLD 1 may operate according to its requested mechanism operation (non-STR PSM deactivation). If the non-AP MLD 1 receives a rejection response message, it may operate as an existing operation (non-STR PSM activation).

Through the above-described various embodiments, the AP/STA may request a non-STR power-saving mechanism indication.

4. Example of NAV Sharing for STAs Operating in Power Saving (Power Save Mode)

According to an embodiment, in various situations, only some STAs (that is, links) of the MLD may enter the doze state.

In the case of a conventional single-link device, the STA operating in the power save mode cannot receive the updated NAV information of the AP when it enters the doze state. If the STA does not know the updated NAV information as described above, after the STA awakes from the doze state, the STA should perform a probe delay for a certain period to prevent data collision.

Unlike the above-described single-link device, the multi-link device may transmit updated information of the AP connected to the STA entering the doze state through another link. Hereinafter, a method for transmitting updated information of an AP connected to an STA entering a doze state through another link may be proposed.

According to an embodiment, a multi-link device (MLD) may operate in a power save mode independently for each link. In other words, some STAs (for example, the first STA) of the MLD may operate in a doze state and a link may operate in a disable state due to the power save mode. Some other STAs (for example, the second STA) may operate in the awake state of the power save mode or the non-power save mode. For example, some other STAs (for example, the second STA) may operate in an available state, and a link may operate in an enable state.

The above-described operation of the MLD may be described with reference to FIG. 41.

Figure 41:
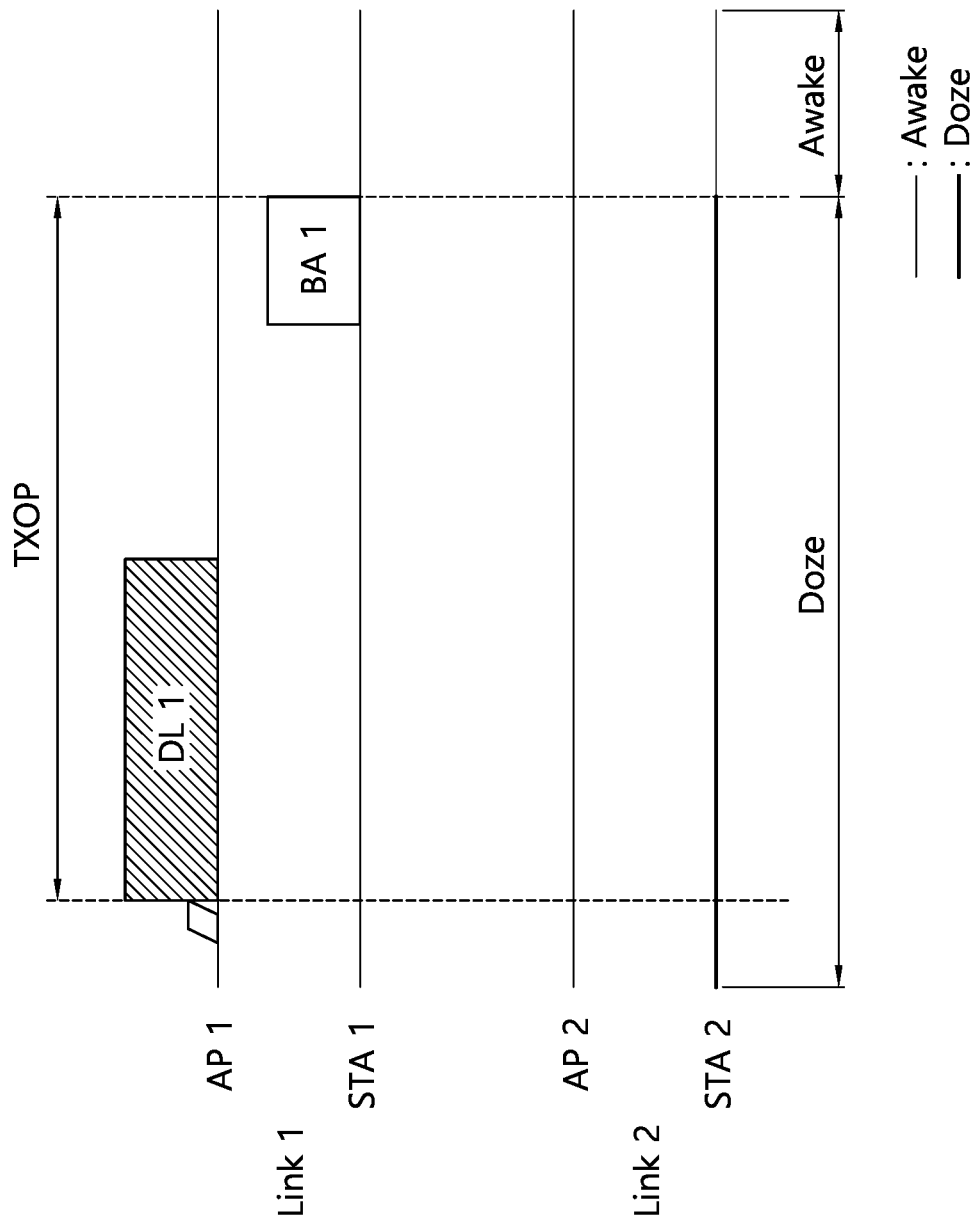
FIG. 41 shows another example of the operation of a non-AP MLD and an AP MLD.

FIG. 41 shows another example of the operation of a non-AP MLD and an AP MLD.

Referring to FIG. 41, the non-AP MLD may be connected to the AP MLD through two links. In this case, only STA 2 may enter the doze state.

For example, Link 1 has an enable state, and Link 2 has a disable state. In other words, Link 1 may operate in an enable state, and Link 2 may operate in a disabled state. In other words, communication through link 1 may be possible, and communication through link 2 may not be possible.

In FIG. 41, it may be assumed that STA 2 wakes up at the end of DL TXOP of AP 1. FIG. 41 shows that STA 2 operates in a doze state before TXOP. However, STA 2 may change from an awake state to a doze state at the start time of the TXOP period as in the above-described embodiments.

According to the conventional standard, when STA 2 wakes up, since STA 2 did not acquire any information during the doze state, it is not possible to know whether AP 2 is currently transmitting data to another STA (for example, NAV information). Therefore, in this case, after awake, STA 2 should perform CCA until it detects a frame in which NAV can be set or until the same time as the probe delay expires. If the NAV of AP 2 is not set, performing CCA until the probe delay period expires may be overhead.

Therefore, in the following specification, when some STAs of MLD (for example, non-AP MLD) enter the doze state, a method of transmitting NAV information of an AP connected to an STA entering a doze state through a link in an enable state may be proposed. Specifically, an embodiment in which the presence or absence of NAV information is indicated and an embodiment in which the NAV information is indicated by time may be sequentially described.

4.1. An Embodiment in which NAV Information is Indicated as the Presence or Absence of NAV Information According to one embodiment, when STA 2 of non-AP MLD wakes up, it may be indicated whether AP 2 of AP MLD has data to transmit to STAs different from STA 2 of non-AP MLD. For example, whether or not to set the NAV of AP 2 may be indicated through 1 bit. Referring to FIG. 41, AP 1 may transmit whether or not the NAV of AP 2 is set to STA 1 through 1 bit.

For the above-described embodiment, a new element or field may be proposed as follows. The name of a new element or field to be described below may be set in various ways and may be changed.

NAV indication (field/element): Whether or not the NAV is set based on the time when the STA to which the AP is connected wakes up.

For example, if the value of the NAV indication (field/element) is a first value (for example, 1), the NAV indication may indicate that the NAV is set to transmit data to another STA at the time when the connected STA wakes up.

For another example, if the value of the NAV indication (field/element) is a second value (for example, 0), the NAV indication may indicate that the NAV is not set in order to transmit data to another STA at the time when the connected STA wakes up.

According to one embodiment, the value of the NAV indication (field/element) may be used together with a Link identifier (for example, Link ID), in this case, NAV information may be indicated for each STA in the MLD.

According to an embodiment, the first AP of the MLD operating in a plurality of links may transmit information about the second AP through a link connected to the first AP. Through the technical feature, the updated NAV information of the AP 2 may be transmitted for the STA 2 entering the doze state through the link in the awake state. A specific operation related thereto may be described with reference to FIGS. 42 and 43.

Figure 42:
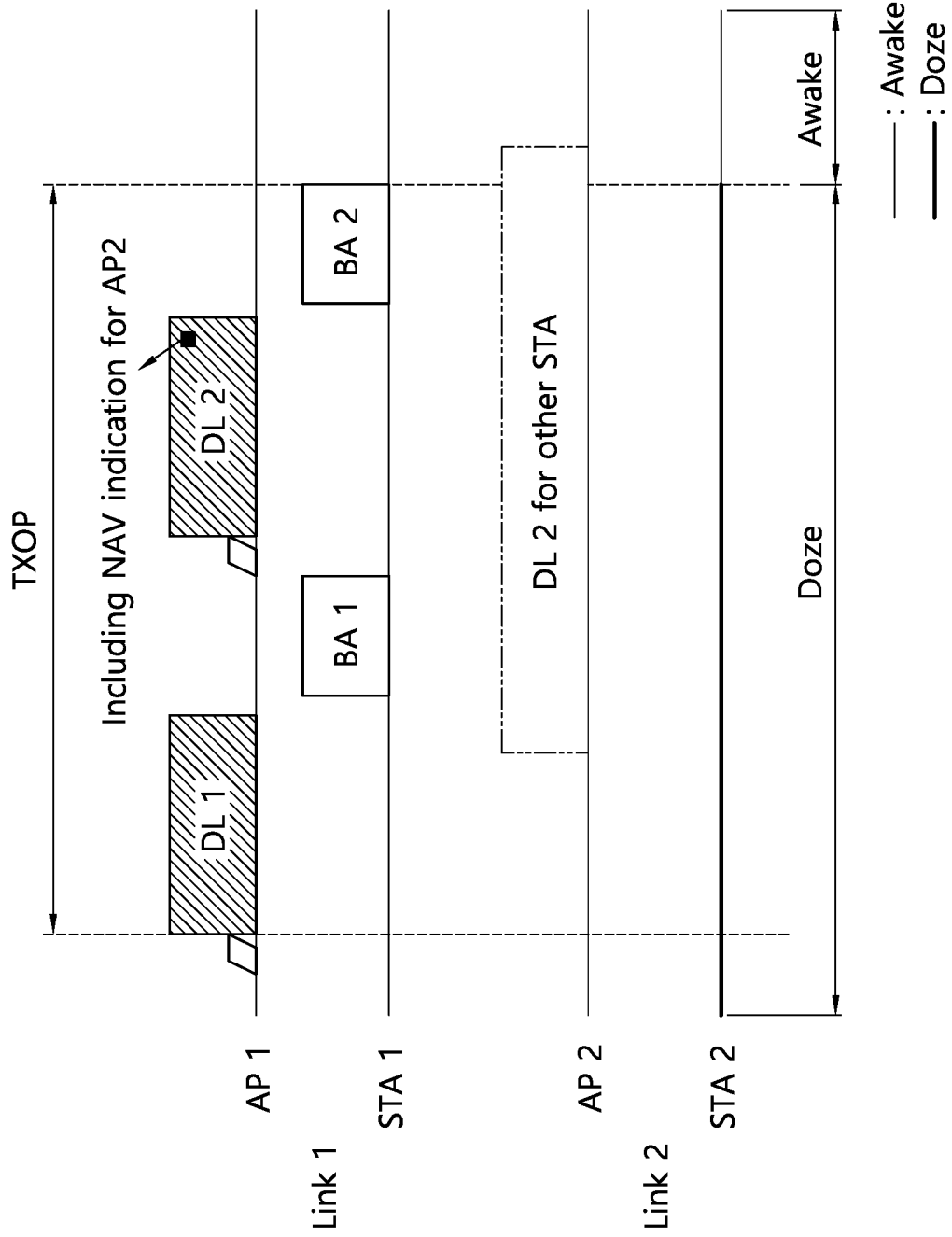
FIG. 42 shows another example of the operation of a non-AP MLD and an AP MLD.

FIG. 42 shows another example of the operation of a non-AP MLD and an AP MLD.

Referring to FIG. 42, only STA 2 of the non-AP MLD may operate in a doze state, and STA 1 may operate in an awake state. Whether or not the NAV setting of the AP 2 at the awake time of the STA 2 may be indicated through the NAV indication information through the DL 2 frame received by the STA 1 through Link 1.

The non-AP MLD having obtained the NAV indication information through DL 2 transmitted by AP 1 to STA 1 may share the NAV indication information with STA 2 through internal sharing. However, the AP MLD (or AP 1) should know when the STA 2 wakes up, so that it can inform whether the NAV of the connected AP 2 is set at the time when the STA wakes up.

For example, when the STA 2 wakes up, since the AP 2 is in a state where NAV for another STA is set, the value of the NAV indication (Field/element) may be set to 1 and transmitted. After awake, STA 2 may perform CCA until it detects a frame in which NAV can be set or until the same time as the probe delay expires.

Figure 43:
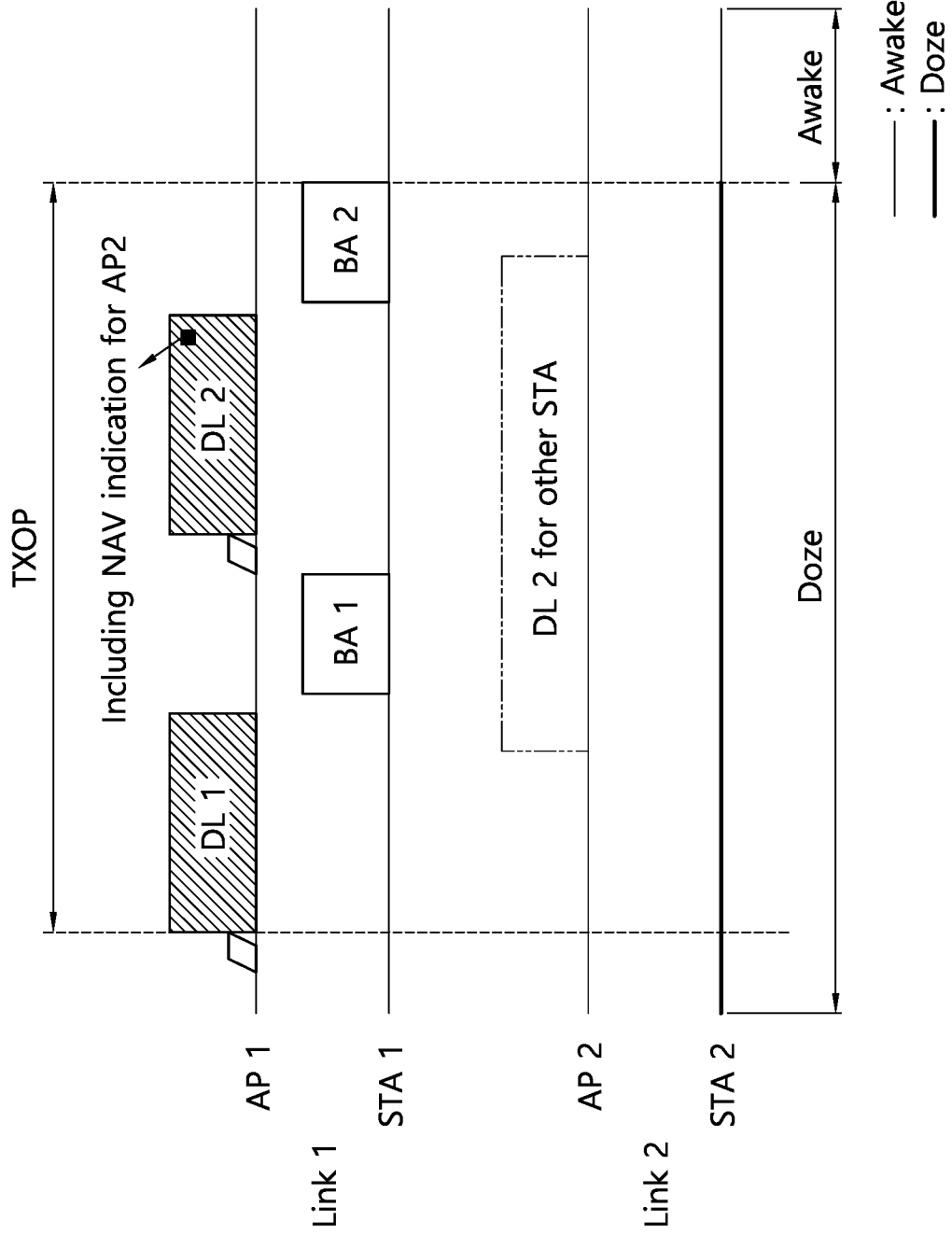
FIG. 43 shows another example of the operation of a non-AP MLD and an AP MLD.

FIG. 43 shows another example of the operation of a non-AP MLD and an AP MLD.

Referring to FIG. 43, there may be no NAV set by AP 2 at the time when STA 2 wakes up. Information indicating that the NAV set by the AP 2 does not exist may be transmitted while being included in the DL 2 transmitted by the AP 1.

The value of the NAV indication (field/element) in DL 2 may be set to 0 and transmitted to STA 1. Upon receiving this, STA 1 may share NAV indication information with STA 2 through sharing of internal information of non-AP MLD.

STA 2 may know that there is no TXOP (or NAV) configured by AP 2 for another STA at the time when STA 2 wakes up. Accordingly, STA 2 does not need to perform CCA until the probe delay expires.

According to an embodiment, the NAV indication information may not be included in the DL transmitted by the AP, but may be transmitted in a separate frame as in the above-described embodiment. A specific operation related thereto may be described with reference to FIG. 44.

Figure 44:
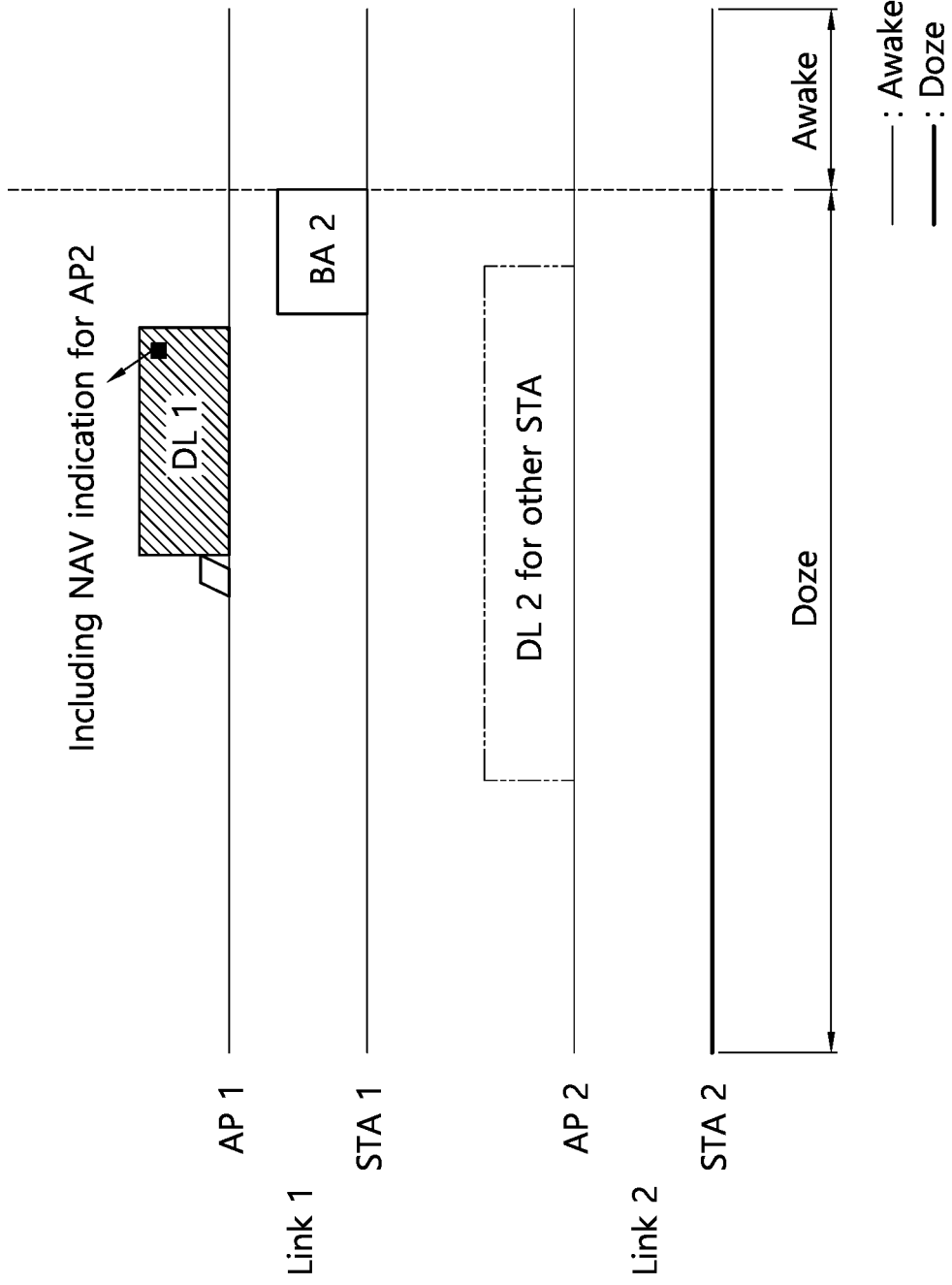
FIG. 44 shows another example of the operation of a non-AP MLD and an AP MLD.

FIG. 44 shows another example of the operation of a non-AP MLD and an AP MLD.

Referring to FIG. 44, AP 1 may transmit a separate message to inform STA 2 of the updated NAV information of AP 2 instead of a DL frame transmitted to STA 1. A separate message may be used when there is no DL frame that AP 1 transmits to STA 1. Since the DL frame can be transmitted regardless of whether the AP 1 transmits the DL frame, there is the effect that information can be more flexibly informed to the STA 2. However, frame overhead may occur.

4.2. An Embodiment in which NAV Information is Indicated by NAV Time

According to an embodiment in which the NAV information is indicated by the presence or absence of NAV, the presence or absence of the NAV setting of the AP is simply indicated through 1 or 0. Although the above-described embodiment has the effect of reducing overhead, accuracy may be reduced. Therefore, hereinafter, an embodiment for notifying the STA of the NAV setting time of the connected AP may be proposed. A new element or field may be proposed to inform the STA of the NAV setting time of the connected AP. The name of a new element or field to be described below may be set in various ways and may be changed.

NAV time (field/element): NAV time set based on the awake time of the STA to which the AP is currently connected.

For example, NAV time (field/element) may be expressed as NAV remaining time or NAV end time. In other words, the NAV time (field/element) may include information about the remaining NAV time or the NAV end time. Upon receiving the NAV time (field/element), the STA may predict (or check) the presence or absence of the NAV setting and the remaining time of the connected AP at the time when the STA wakes up.

According to an embodiment, the value of NAV time (field/element) may be used together with a Link identifier (for example, Link ID). In this case, NAV information may be indicated for each STA in the MLD. According to an embodiment, the NAV time (field/element) may be transmitted together with the above-described NAV indication (field/element).

According to an embodiment, the NAV time (field/element) may be transmitted while being included in a DL frame to be transmitted to the STA through the link in the awake state. As another example, the NAV time (field/element) may be transmitted through a separate message through a link in an awake state. A specific operation related thereto may be described with reference to FIGS. 45 and 46.

Figure 45:
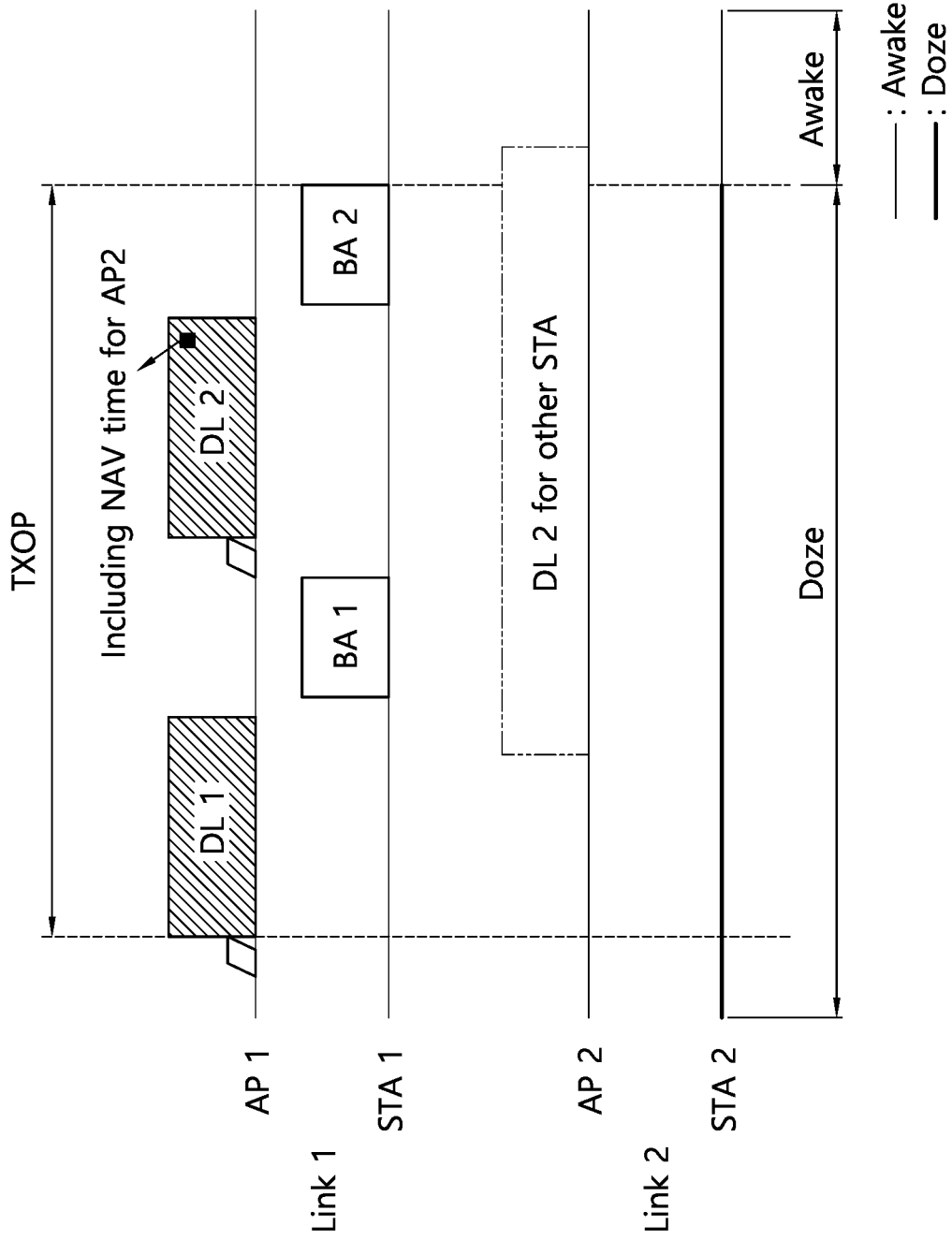
FIG. 45 shows another example of the operation of a non-AP MLD and an AP MLD.

FIG. 45 shows another example of the operation of a non-AP MLD and an AP MLD.

Referring to FIG. 45, when STA 2 is in a doze state, STA 2 may acquire NAV setting time information of the current AP 2 through a DL frame received by STA 1 in an awake state. For example, STA 1 of non-AP MLD may acquire NAV configuration time information of AP 2 through a DL frame. The non-AP MLD may share (or transmit) NAV setup time information of AP 2 obtained from STA 1 to STA 2 based on an internal information-sharing process.

For example, AP 1 may transmit NAV time information of AP 2 by including the NAV time field in a DL frame that it transmits to STA 1. As an example, the NAV time information of AP 2 may include information about the remaining NAV time or the NAV end time.

In the example of FIG. 45, when STA 2 awakes, since TXOP (or NAV) for another STA is set, STA 2 may operate based on the acquired NAV time information. In other words, when the state of the STA 2 is changed to the awake state, the AP 2 may be in a situation in which the TXOP for the other STA is obtained. Accordingly, STA 2 may set the NAV based on the acquired NAV time information.

According to an embodiment, after the STA 2 changes the state to the awake state, the STA 2 may set the NAV based on the acquired NAV time information.

According to an embodiment, the STA 2 may maintain the doze state without changing to the awake state based on the acquired NAV time information.

Figure 46:
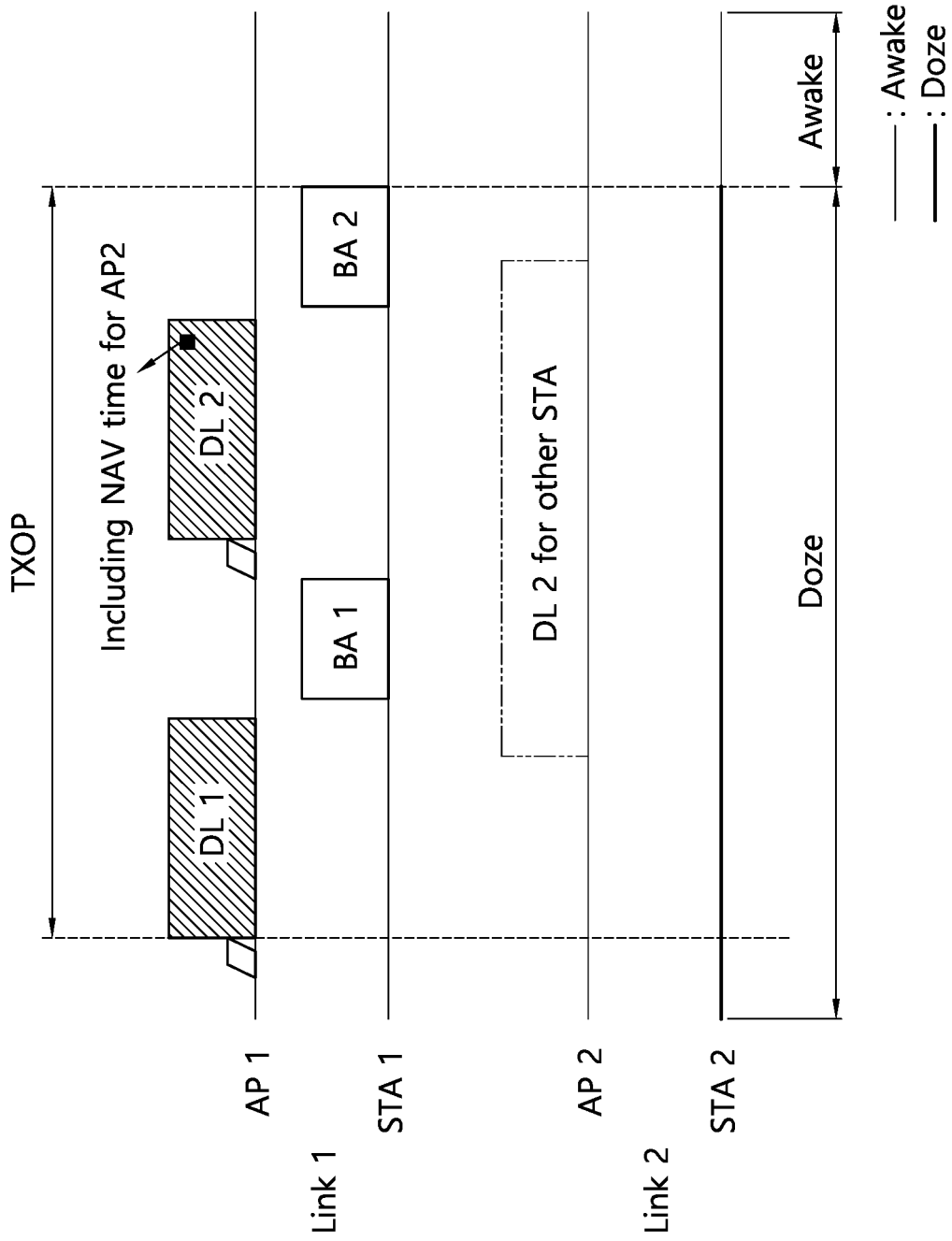
FIG. 46 shows another example of the operation of a non-AP MLD and an AP MLD.

FIG. 46 shows another example of the operation of a non-AP MLD and an AP MLD.

Referring to FIG. 46, when STA 2 is in a doze state, STA 2 may obtain NAV setting time information of the current AP 2 through a DL frame 'DL 2' received by STA 1 in an awake state.

Unlike FIG. 45, the NAV setting time of the AP 2 may end before the time when the STA 2 wakes up. In this case, AP 1 may set the NAV time field value included in DL 2 to 0 and transmit it. Upon receiving this, STA 1 may share NAV time information with STA 2 through sharing of internal information of non-AP MLD.

STA 2 may know that there is no TXOP (or NAV) configured by AP 2 for another STA at the time when STA 2 wakes up. Accordingly, STA 2 does not need to perform CCA until the probe delay expires.

The NAV time information proposed in this specification may not be included in the DL transmitted by the AP, but may be transmitted in a separate frame as in the above-described embodiment. A specific operation related thereto may be described with reference to FIG. 47.

Figure 47:
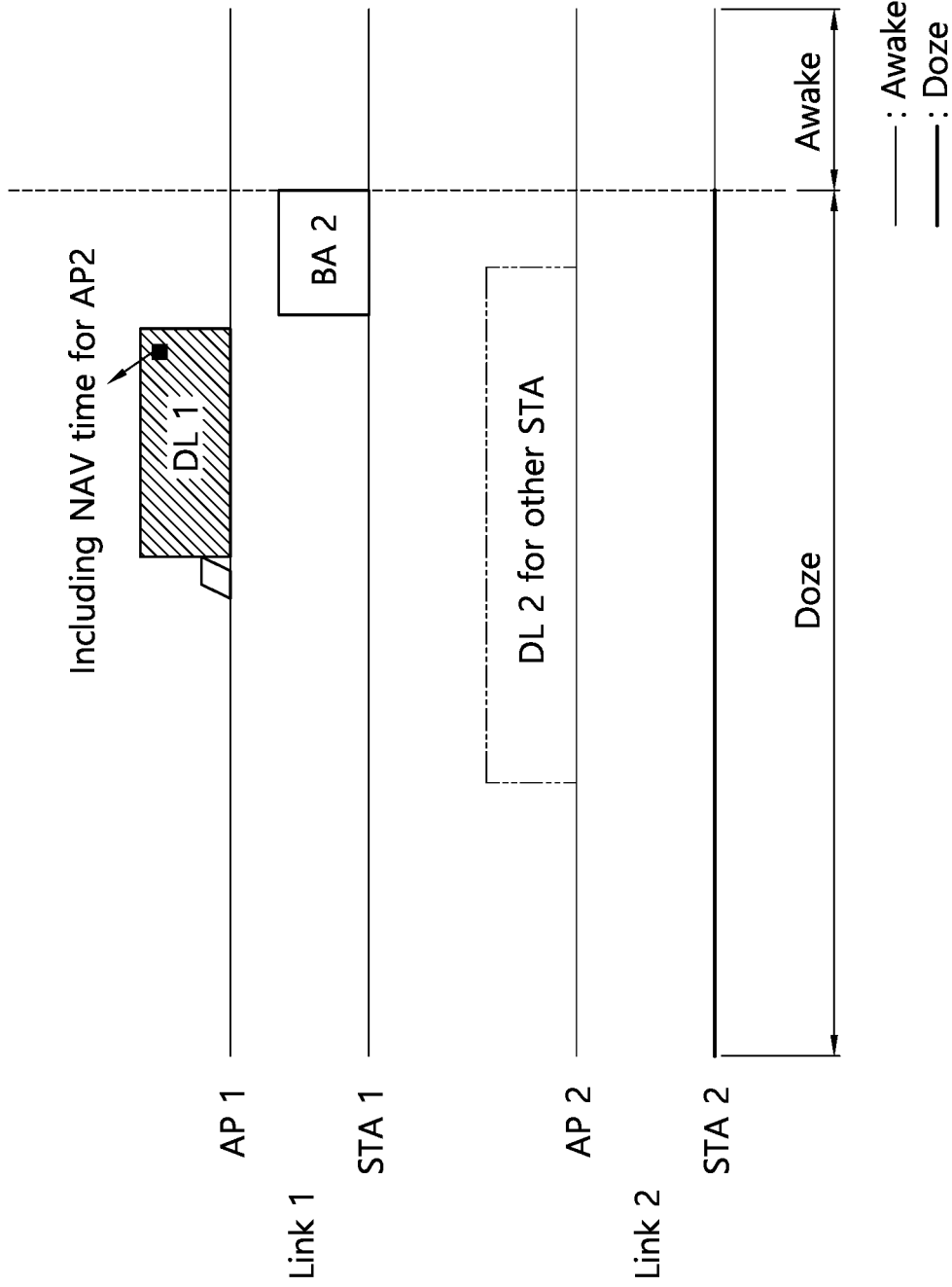
FIG. 47 shows another example of the operation of a non-AP MLD and an AP MLD.

FIG. 47 shows another example of the operation of a non-AP MLD and an AP MLD.

Referring to FIG. 47, AP 1 may transmit a separate message to inform STA 2 of the updated NAV information of AP 2 instead of a DL frame transmitted to STA 1. A separate message may be used when there is no DL frame that AP 1 transmits to STA 1. Since the DL frame can be transmitted regardless of whether the AP 1 transmits the DL frame, there is the effect that information can be more flexibly informed to the STA 2. However, frame overhead may occur.

In the present specification, it is assumed that STA 2 awakes according to the TXOP end time of STA 1, but the awake timing may be changed. In this case, the AP MLD may know that STA 2 operates as a power-saving mechanism, and may also know information on when STA 2 wakes up.

According to the above-described embodiment, there is the effect of solving the limitation that the STA cannot share the updated NAV configuration information of the AP due to the existing power saving. In addition, according to the above-described embodiment, there is the effect of reducing the scanning time of the STA waking in the doze state to detect the NAV of the connected AP.

Figure 48:
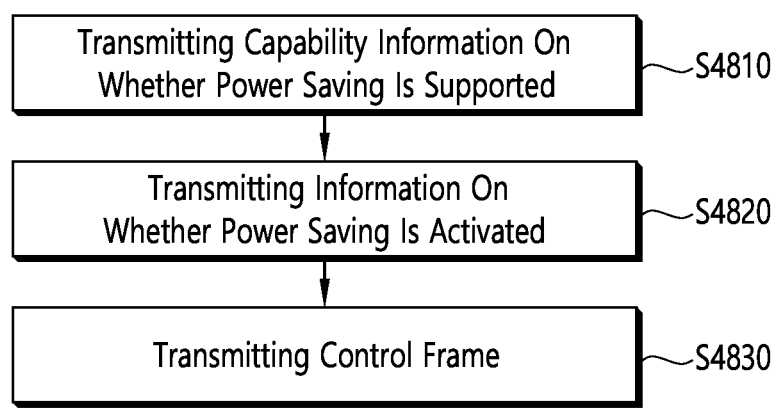
FIG. 48 is a diagram illustrating an embodiment of a method of operating a transmitting MLD.

FIG. 48 is a diagram illustrating an embodiment of a method of operating a transmitting MLD.

Referring to FIG. 48, the transmitting MLD may include a first station (STA) and a second STA, the first STA may operate on a first link, and the second STA may operate on a second link.

The transmitting MLD may transmit capability information related to whether power saving is supported (S4810). For example, the transmitting MLD may transmit capability information related to whether power saving is supported by the receiving MLD. For example, the power saving may be performed by one of the first to third power-saving methods.

For example, the first power-saving method may be a method in which the first STA enters a doze state, based on that the second STA decodes a first downlink (DL) frame as a receiver. The second power-saving method may be a method in which the first STA enters a doze state, based on that the second STA is in the middle of receiving a second DL frame and the energy of the signal received by the first STA is not detected by the first STA. The third power-saving method may be a method in which the first STA enters a doze state based on information related to buffer data to be transmitted to the first STA included in a DL frame received by the second STA.

For example, the first power-saving method may be the first option among the capability-based non-STR PSM methods. The second power-saving method may be the second option among the capability-based non-STR PSM methods. The third power-saving method may be an indication-based non-STR PSM method.

For example, the first STA and the second STA may be in a non-simultaneous transmission and reception (NSTR) relationship.

The transmitting MLD may transmit information related to whether power saving is activated (S4820). For example, the transmitting MLD may transmit information related to whether the power-saving method is activated to the receiving MLD.

The transmitting MLD may transmit a control frame (S4830). For example, the transmitting MLD may transmit, to the receiving MLD, a control frame including method information related to which method among the first to third power-saving methods to be used.

For example, the method information may include a first field related to whether to use the third power-saving method. For example, the first field may be the SMBI field below.

Support Method-based Indication (SMBI): A field to distinguish whether to use a capability-based non-STR PSM or an indication-based non-STR PSM. For example, when non-AP MLD activates non-STR PSM, if it wants to use an indication-based non-STR PSM, this value may be configured as 1, if it wants to use a capability-based non-STR PSM, this value may be configured as 0. The setting for this value can be set during multi-link setup of AP MLD and non-AP MLD, and can be dynamically changed according to a request from non-AP MLD even after multi-setup. Information on this field may be indicated semi-statically or dynamically. In the case of semi-static, it can be included in EHT capability or EHT operation element. In the case of dynamic indication, it can be included by piggybacking in the control frame or data frame.

For example, the method information may further include a second field related to which method to use, either the first power-saving method or the second power-saving method. For example, the second field may be the SOMC field below.

Simplified Option for Method-based Capability (SOMC): when non-AP MLD uses non-STR PSM based on capability, as an additional detailed option that can be selected, when there is no frame transmitted to itself when DL Frame reception of other STAs of the same non-AP MLD is detected, if the STA uses the method of directly entering doze without decoding the frame (that is, the option 2 method described in Section 1), this value may be configured to 1, if the STA decodes it (that is, the option 1 method described in section 1), this value can be configured as 0. The setting for this value can be set during multi-link setup of AP MLD and non-AP MLD, and can be dynamically changed according to a request from non-AP MLD even after multi-setup. Information on this field may be indicated semi-statically or dynamically. In the case of semi-static, it can be included in EHT capability or EHT operation element. In the case of dynamic indication, it can be included by piggybacking in the control frame or data frame. This value may be meaningful only when non-AP MLD uses indication-based non-STR PSM, otherwise, this information could be omitted.

For example, the control frame further includes information regarding whether simultaneous transmission and reception (STR) is supported.

Figure 49:
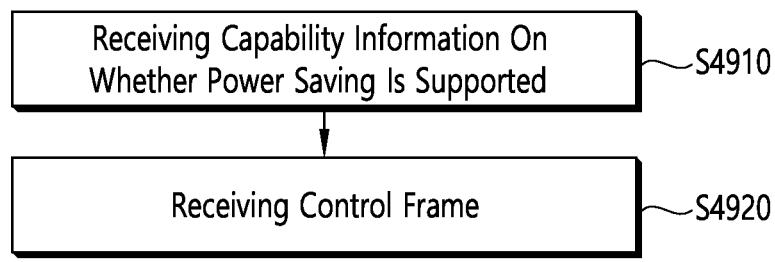
FIG. 49 is a diagram illustrating an embodiment of a receiving MLD operation method.

FIG. 49 is a diagram illustrating an embodiment of a receiving MLD operation method.

Referring to FIG. 49, the receiving MLD may receive capability information related to whether power saving is supported (S4910). For example, the receiving MLD may receive, from the transmitting MLD, capability information related to whether power saving is supported. For example, the power saving may be performed by one of the first to third power-saving methods.

For example, the first power-saving method may be a method in which the first STA enters a doze state, based on that the second STA decodes a first downlink (DL) frame as a receiver. The second power-saving method may be a method in which the first STA enters a doze state, based on that the second STA is in the middle of receiving a second DL frame and the energy of the signal received by the first STA is not detected by the first STA. The third power-saving method may be a method in which the first STA enters a doze state based on information related to buffer data to be transmitted to the first STA included in a DL frame received by the second STA.

For example, the first STA and the second STA may be in a non-simultaneous transmission and reception (NSTR) relationship.

The receiving MLD may receive the control frame (S4920). For example, the receiving MLD may receive, from the transmitting MLD, a control frame including method information related to which method among the first to third power-saving methods to be used.

For example, the method information may include a first field related to whether to use the third power-saving method. For example, the first field may be the SMBI field below.

Support Method-based Indication (SMBI): A field to distinguish whether to use a capability-based non-STR PSM or an indication-based non-STR PSM. For example, when non-AP MLD activates non-STR PSM, if it wants to use an indication-based non-STR PSM, this value may be configured as 1, if it wants to use a capability-based non-STR PSM, this value may be configured as 0. The setting for this value can be set during multi-link setup of AP MLD and non-AP MLD, and can be dynamically changed according to a request from non-AP MLD even after multi-setup. Information on this field may be indicated semi-statically or dynamically. In the case of semi-static, it can be included in EHT capability or EHT operation element. In the case of dynamic indication, it can be included by piggybacking in the control frame or data frame.

For example, the method information may further include a second field related to which method to use, either the first power-saving method or the second power-saving method. For example, the second field may be the SOMC field below.

Simplified Option for Method-based Capability (SOMC): when non-AP MLD uses non-STR PSM based on capability, as an additional detailed option that can be selected, when there is no frame transmitted to itself when DL Frame reception of other STAs of the same non-AP MLD is detected, if the STA uses the method of directly entering doze without decoding the frame (that is, the option 2 method described in Section 1), this value may be configured to 1, if the STA decodes it (that is, the option 1 method described in section 1), this value can be configured as 0. The setting for this value can be set during multi-link setup of AP MLD and non-AP MLD, and can be dynamically changed according to a request from non-AP MLD even after multi-setup. Information on this field may be indicated semi-statically or dynamically. In the case of semi-static, it can be included in EHT capability or EHT operation element. In the case of dynamic indication, it can be included by piggybacking in the control frame or data frame. This value may be meaningful only when non-AP MLD uses indication-based non-STR PSM, otherwise, this information could be omitted.

For example, the control frame may further include information related to whether simultaneous transmit and receive (STR) is supported.

Some of the detailed steps shown in the example of FIGS. 48 and 49 may be omitted. In addition to the steps shown in FIGS. 48 and 49, other steps may be added, and the order of the steps may vary. Some of the above steps may have their own technical meaning.

The technical features of the present disclosure described above may be applied to various devices and methods. For example, the above-described technical features of the present disclosure may be performed/supported through the apparatus of FIGS. 1 and/or 5. For example, the above-described technical features of the present disclosure may be applied only to a part of FIGS. 1 and/or 5. For example, the technical features of the present disclosure described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 5. For example, the apparatus of the present disclosure includes a processor and a memory coupled to the processor. The processor may be adapted to transmit, to a receiving MLD, capability information regarding whether power saving is supported, wherein the power saving is performed by one method among first to third power-saving methods; and transmit, to the receiving MLD, a control frame including method information regarding which method among the first to third power-saving methods is to be used.

The technical features of the present disclosure may be implemented based on a computer readable medium (CRM). For example, CRM proposed by the present specification may store instructions which, based on being executed by at least one processor of a transmitting multi-link device (MLD) in a wireless local area network system, perform operations, wherein the transmitting MLD includes a first station (STA) and a second STA, wherein the first STA operates on a first link, and the second STA operates on a second link, the operations including: transmitting, to a receiving MLD, capability information regarding whether power saving is supported, wherein the power saving is performed by one method among first to third power-saving methods; and transmitting, to the receiving MLD, a control frame including method information regarding which method among the first to third power-saving methods is to be used.

The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 5. Meanwhile, the CRM of the present disclosure may be the memories 112 and 122 of FIG. 1, the memory 620 of FIG. 5, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a non-Access Point (non-AP) Multi-link Device (MLD) in a wireless local area network (WLAN) system, the method comprising:
    transmitting, by a first non-AP station (STA) affiliated with the non-AP MLD, a management frame including capability information regarding whether power saving is supported, wherein the first non-AP STA operates on a first link and a second non-AP STA operating on a second link is further affiliated with the non-AP MLD, wherein the power saving is performed by one method among first to third power-saving methods,
    wherein the management frame further includes non-simultaneous transmission and reception (NSTR) information related to whether the first link and the second link form an NSTR link pair, wherein the management frame further includes information related to a maximum number of links to be supported by the non-AP MLD, wherein the first power-saving method is a method in which the first non-AP STA enters a doze state, based on that the second non-AP STA decodes a first downlink (DL) frame as a receiver, wherein the second power-saving method is a method in which the first non-AP STA enters a doze state, based on that the second non-AP STA is in the middle of receiving a second DL frame and the energy of the signal received by the first non-AP STA is not detected by the first non-AP STA, and wherein the third power-saving method is a method in which the first non-AP STA enters a doze state based on information related to buffer data to be transmitted to the first non-AP STA included in a DL frame received by the second non-AP STA; and transmitting, by the first non-AP STA, a control frame including method information regarding which method among the first to third power-saving methods is to be used.

2. The method of claim 1, wherein the method further comprising:

transmitting information regarding whether the power-saving method is activated.

3. The method of claim 1, wherein the method information includes a first field regarding whether to use the third power-saving method.

4. The method of claim 3, wherein the method information includes a second field related to which method of the first power-saving method and the second power-saving method to be used.

5. A non-Access Point (non-AP) Multi-link Device (MLD) in a wireless local area network (WLAN) system, the non-AP MLD comprising:

at least one transceiver;

at least one processor coupled to the at least one transceiver; and at least one computer memory operatively connected to the at least one processor and storing instructions that, based on being executed by the at least one processor, perform operations comprising:

transmitting, by a first non-AP station (STA) affiliated with the non-AP MLD, a management frame including capability information regarding whether power saving is supported, wherein the first non-AP STA operates on a first link and a second non-AP STA operating on a second link is further affiliated with the non-AP MLD, wherein the power saving is performed by one method among first to third power-saving methods, wherein the management frame further includes non-simultaneous transmission and reception (NSTR) information related to whether the first link and the second link form an NSTR link pair, wherein the management frame further includes information related to a maximum number of links to be supported by the non-AP MLD, wherein the first power-saving method is a method in which the first non-AP STA enters a doze state, based on that the second non-AP STA decodes a first downlink (DL) frame as a receiver, wherein the second power-saving method is a method in which the first non-AP STA enters a doze state, based on that the second non-AP STA is in the middle of receiving a second DL frame and the energy of the signal received by the first non-AP STA is not detected by the first non-AP STA, and wherein the third power-saving method is a method in which the first non-AP STA enters a doze state based on information related to buffer data to be transmitted to the first non-AP STA included in a DL frame received by the second non-AP STA; and transmitting, by the first non-AP STA, a control frame including method information regarding which method among the first to third power-saving methods is to be used.

6. The non-AP MLD of claim 5, wherein the at least one computer memory is further perform operations comprising:

transmitting information regarding whether the power-saving method is activated.

7. The transmitting non-AP MLD of claim 5, wherein the method information includes a first field regarding whether to use the third power-saving method.

8. The non-AP MLD of claim 7, wherein the method information includes a second field related to which method of the first power-saving method and the second power-saving method to be used.

* * * * *